US011917718B2

(12) United States Patent
Zhu et al.

(10) Patent No.: US 11,917,718 B2
(45) Date of Patent: Feb. 27, 2024

(54) LOCAL AREA NETWORK COMMUNICATION MANAGEMENT METHOD AND APPARATUS

(71) Applicant: Huawei Technologies Co., Ltd., Shenzhen (CN)

(72) Inventors: Qianghua Zhu, Beijing (CN); Qi Yao, Beijing (CN); Yanping Zhang, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/172,358

(22) Filed: Feb. 10, 2021

(65) Prior Publication Data

US 2021/0211859 A1 Jul. 8, 2021

Related U.S. Application Data

(63) Continuation of application No. PCT/CN2019/100278, filed on Aug. 12, 2019.

(30) Foreign Application Priority Data

Aug. 13, 2018 (CN) ......................... 201810918122.7

(51) Int. Cl.
*H04W 8/02* (2009.01)
*H04W 60/00* (2009.01)
(Continued)

(52) U.S. Cl.
CPC ............... *H04W 8/02* (2013.01); *H04W 8/18* (2013.01); *H04W 8/26* (2013.01); *H04W 48/16* (2013.01); *H04W 60/00* (2013.01)

(58) Field of Classification Search
CPC ......... H04W 8/02; H04W 8/26; H04W 60/00; H04W 8/18; H04W 48/16
See application file for complete search history.

(56) References Cited

U.S. PATENT DOCUMENTS 10,616,850 B2 * 4/2020 Chen ..................... H04W 76/27
2007/0054687 A1 3/2007 Akita et al.
(Continued)

FOREIGN PATENT DOCUMENTS

CN 101938705 A 1/2011
CN 103636257 A 3/2014
(Continued)

OTHER PUBLICATIONS

Huawei et al., "The mechanism for the SGS to configure service restriction for a particula 5GLAN group", 3GPP TSG-SA WG2 Meeting #128bis S2-188298, Aug. 20-24, 2018, 4 pages.
(Continued)

*Primary Examiner* — Khawar Iqbal
(74) *Attorney, Agent, or Firm* — Conley Rose, P.C.

(57) ABSTRACT

A local area network (LAN) communication management method includes obtaining, by an access and mobility management function (AMF) network element, registration area information of the terminal, the LAN identifier (ID) of the terminal, and the service area information corresponding to the LAN ID, determining, by the AMF network element, LAN communication area information of the terminal based on the registration area information of the terminal and the service area information corresponding to the LAN ID, sending, by the AMF network element, LAN information of the terminal to the terminal, where the LAN information of the terminal includes the LAN ID and the LAN communi-
(Continued)

cation area information of the terminal, and managing, by the terminal, LAN communication of the terminal based on the LAN information.

16 Claims, 37 Drawing Sheets

(51) Int. Cl.

| | |
|---|---|
| ***H04W 8/18*** | (2009.01) |
| ***H04W 8/26*** | (2009.01) |
| ***H04W 48/16*** | (2009.01) |

(56) References Cited

U.S. PATENT DOCUMENTS

| | | | | |
|---|---|---|---|---|
| 2013/0003697 | A1 | 1/2013 | Adjakple et al. | |
| 2014/0247806 | A1 | 9/2014 | Fujimoto et al. | |
| 2015/0245191 | A1 | 8/2015 | Xu | |
| 2017/0034749 | A1 | 2/2017 | Chandramouli et al. | |
| 2019/0075511 | A1* | 3/2019 | Ryu | H04W 68/005 |
| 2019/0174405 | A1 | 6/2019 | Yang et al. | |
| 2019/0342851 | A1* | 11/2019 | Shan | H04W 76/11 |
| 2020/0337093 | A1* | 10/2020 | Kim | H04W 64/00 |
| 2021/0084569 | A1* | 3/2021 | Kim | H04W 48/08 |
| 2021/0168695 | A1* | 6/2021 | Ryu | H04W 8/14 |
| 2021/0185598 | A1* | 6/2021 | Kim | H04W 48/16 |
| 2021/0211859 | A1* | 7/2021 | Zhu | H04W 60/00 |
| 2021/0258718 | A1* | 8/2021 | Kim | H04W 60/02 |
| 2021/0274571 | A1* | 9/2021 | Kawasaki | H04W 60/00 |
| 2021/0314899 | A1* | 10/2021 | Shan | H04W 60/04 |
| 2022/0287148 | A1* | 9/2022 | Kim | H04W 76/38 |
| 2022/0408305 | A1* | 12/2022 | Jin | H04W 28/02 |

FOREIGN PATENT DOCUMENTS

| | | | |
|---|---|---|---|
| CN | 103929792 | A | 7/2014 |
| CN | 104994078 | A | 10/2015 |
| CN | 106465080 | A | 2/2017 |
| CN | 107786488 | A | 3/2018 |
| CN | 107786946 | A | 3/2018 |
| CN | 108323245 | A | 7/2018 |
| EP | 3142065 | A1 | 3/2017 |

OTHER PUBLICATIONS

3GPP TR 23.716 V0.5.0, "3rd Generation Partnership Project; Technical Specification Group Services and System Aspects; Study on the Wireless and Wireline Convergence for the 5G system architecture (Release 16)," Jun. 2018, 85 pages.

3GPP TR 22.821 V16.1.0 "3rd Generation Partnership Project; Technical Specification Group Services and System Aspects; Feasibility Study on LAN Support in 5G (Release 16)," Jun. 2018, 52 pages.

S2-186165, Huawei, et al., "How Peer CP NF sends notification to target/new AMF after AMF planned removal," 3GPP TSG-SA WG2 Meeting #127bis, May 28-Jun. 1, 2018, Newport Beach, USA, 4 pages.

* cited by examiner

LOCAL AREA NETWORK COMMUNICATION MANAGEMENT METHOD AND APPARATUS

CROSS-REFERENCE TO RELATED APPLICATIONS

This application is a continuation of International Patent Application No. PCT/CN2019/100278 filed on Aug. 12, 2019, which claims priority to Chinese Patent Application No. 201810918122.7 filed on Aug. 13, 2018. The disclosures of the aforementioned applications are hereby incorporated by reference in their entireties.

TECHNICAL FIELD

This application relates to the field of communications technologies, and in particular, to a local area network communication management method and apparatus.

BACKGROUND

A 5th generation (5G) local area network (LAN) service is a service provided in a 5G network, and can provide private communication of an Internet Protocol (IP) type or a non-IP type for terminals belonging to a same LAN group. The 5G LAN service is mainly used in scenarios such as home communication, an enterprise office, factory manufacturing, Internet of vehicles (IoV), and power grid reconstruction. A terminal may join a LAN group based on a service requirement or a dedicated attribute, and terminals belonging to the LAN group may perform LAN communication with each other.

For example, devices in a factory constitute a LAN group, and the devices belonging to the LAN group send an Ethernet data packet to each other. For another example, office devices (such as a mobile phone, a computer, and a notebook computer) of employees of an enterprise constitute a LAN group, and the office devices belonging to the LAN group may send an IP data packet to each other.

However, the 5G LAN service is area-restricted, and the terminals in the LAN group can perform LAN communication only in some specific areas. How to manage LAN communication of the terminal in the LAN group is an urgent problem to be resolved.

SUMMARY

Embodiments of this application provide a local area network communication management method and apparatus, to manage LAN communication of a terminal in a LAN group.

According to a first aspect, an embodiment of this application provides a local area network communication management method. The method includes the following steps. An access and mobility management function (AMF) network element obtains registration area information of a terminal, a LAN identifier (ID) of the terminal, and service area information corresponding to the LAN ID, the AMF network element determines LAN communication area information of the terminal based on the registration area information and the service area information corresponding to the LAN ID, and the AMF network element sends LAN information of the terminal to the terminal, where the LAN information of the terminal includes the LAN ID and the LAN communication area information of the terminal.

According to the foregoing method, the AMF network element may determine the LAN communication area information of the terminal based on the registration area information of the terminal and the service area information corresponding to the LAN ID. Then, the AMF network element may send the determined LAN information of the terminal to the terminal such that the terminal can manage LAN communication of the terminal based on the LAN information of the terminal.

In a possible design, before an AMF network element obtains registration area information of a terminal, a LAN ID of the terminal, and service area information corresponding to the LAN ID, the method further includes that the that the AMF network element receives a first configuration parameter sent by a LAN management function (LSMF) network element, where the first configuration parameter includes the LAN ID and the service area information corresponding to the LAN ID.

According to the foregoing method, the LSMF network element may directly send the first configuration parameter to the AMF network element such that the AMF network element uses the first configuration parameter when determining the LAN information of the terminal.

In addition, before the AMF network element determines the LAN information of the terminal, the LSMF network element may send a second configuration parameter to a unified data management (UDM) network element, where the second configuration parameter includes the LAN ID and an ID of the terminal. When the AMF network element needs to determine the LAN information of the terminal, the UDM network element may configure the second configuration parameter for the AMF network element using different messages. Based on the implementation in which the LSMF network element sends the first configuration parameter to the AMF network element and sends the second configuration parameter to the UDM network element, the AMF network element obtains, in three manners, the registration area information of the terminal, the LAN ID of the terminal, and the service area information corresponding to the LAN ID.

Manner 1:

That an AMF network element obtains registration area information of a terminal, a LAN ID of the terminal, and service area information corresponding to the LAN ID includes that the AMF network element receives a fourth subscription data update notification sent by the UDM network element, where the fourth subscription data update notification includes the LAN ID and the ID of the terminal, the AMF obtains the registration area information of the terminal based on the ID of the terminal, and the AMF network element obtains the LAN ID carried in the fourth subscription data update notification, and obtains, based on the first configuration parameter, the service area information corresponding to the LAN ID. That the AMF network element sends LAN information of the terminal to the terminal includes that the AMF network element sends a third configuration update message to the terminal, where the third configuration update message includes the LAN information of the terminal.

According to the foregoing method, when the terminal has registered, the AMF network element may obtain, according to the fourth subscription data update notification sent by the UDM network element and the first configuration parameter, the registration area information of the terminal, the LAN ID of the terminal, and the service area information corresponding to the LAN ID.

Manner 2:

That an AMF network element obtains registration area information of a terminal, a LAN ID of the terminal, and service area information corresponding to the LAN ID includes that the AMF network element receives a third registration request message sent by the terminal, where the third registration request message carries the ID of the terminal, the AMF network element sends a fourth subscription data request message to the UDM network element, where the fourth subscription data request message carries the ID of the terminal, the AMF network element receives a fourth subscription data response message sent by the UDM network element, where the fourth subscription data response message carries the LAN ID, the AMF generates the registration area information of the terminal, and the AMF network element obtains the LAN ID carried in the fourth subscription data response message, and obtains, based on the first configuration parameter, the service area information corresponding to the LAN ID. That the AMF network element sends LAN information of the terminal to the terminal includes that the AMF network element sends a third registration response message to the terminal, where the third registration response message carries the LAN information of the terminal.

According to the foregoing method, when the unregistered terminal sends the third registration request message, the AMF network element may trigger an operation of determining the LAN information of the terminal, and the AMF network element may obtain, according to the fourth subscription data response message and the first configuration parameter, the registration area information of the terminal, the LAN ID of the terminal, and the service area information corresponding to the LAN ID.

Manner 3:

That an AMF network element obtains registration area information of a terminal, a LAN ID of the terminal, and service area information corresponding to the LAN ID includes that the AMF network element receives a first protocol data unit (PDU) session management request sent by the terminal, where the first PDU session management request carries the LAN ID, the AMF network element obtains the registration area information of the terminal from a context of the terminal, and the AMF network element obtains the LAN ID carried in the first PDU session management request, and obtains, based on the first configuration parameter, the service area information corresponding to the LAN ID. That the AMF network element sends LAN information of the terminal to the terminal includes that the AMF network element sends a first PDU session management response to the terminal, where the first PDU session management response carries the LAN information of the terminal.

According to the foregoing method, when receiving the first PDU session management request, the AMF network element may trigger an operation of determining the LAN information of the terminal, and the AMF network element may obtain, according to the first PDU session management response and based on the first configuration parameter, the registration area information of the terminal, the LAN ID of the terminal, and the service area information corresponding to the LAN ID.

In addition, before the AMF network element determines the LAN information of the terminal, the LSMF network element may send a second configuration parameter to a UDM network element, where the second configuration parameter includes the LAN ID and an ID of the terminal. When the AMF network element needs to determine the LAN information of the terminal, the UDM network element may configure the second configuration parameter for the AMF network element using different messages. There may be three specific manners:

Manner 1:

That an AMF network element obtains registration area information of a terminal, a LAN ID of the terminal, and service area information corresponding to the LAN ID includes that the AMF network element receives a first subscription data update notification sent by the UDM network element, where the first subscription data update notification includes the LAN ID and the ID of the terminal, the AMF obtains the registration area information of the terminal based on the ID of the terminal, the AMF network element sends a first request message to the LSMF network element, where the first request message carries the LAN ID, and the first request message is used to request to obtain the service area information corresponding to the LAN ID, and the AMF network element receives a first response message sent by the LSMF network element, where the first response message carries the service area information corresponding to the LAN ID. That the AMF network element sends LAN information of the terminal to the terminal includes that the AMF network element sends a first configuration update message to the terminal, where the first configuration update message includes the LAN information of the terminal.

According to the foregoing method, when the terminal has registered, the AMF network element may obtain, according to the first subscription data update notification sent by the UDM network element and the second configuration parameter, the registration area information of the terminal, the LAN ID of the terminal, and the service area information corresponding to the LAN ID.

Manner 2:

That an AMF network element obtains registration area information of a terminal, a LAN ID of the terminal, and service area information corresponding to the LAN ID includes that the AMF network element receives a first registration request message sent by the terminal, where the first registration request message carries the ID of the terminal, the AMF network element sends a first subscription data request message to the UDM network element, where the first subscription data request message carries the ID of the terminal, the AMF network element receives a first subscription data response message sent by the UDM network element, where the first subscription data response message carries the LAN ID, the AMF generates the registration area information of the terminal, the AMF network element sends a second request message to the LSMF network element, where the second request message carries the LAN ID, and the second request message is used to request to obtain the service area information corresponding to the LAN ID, and the AMF network element receives a second response message sent by the LSMF network element, where the second response message carries the service area information corresponding to the LAN ID. That the AMF network element sends LAN information of the terminal to the terminal includes that the AMF network element sends a first registration response message to the terminal, where the first registration response message carries the LAN information of the terminal.

According to the foregoing method, when the unregistered terminal sends the first registration request message, the AMF network element may trigger an operation of determining the LAN information of the terminal, and the AMF network element may obtain, according to the first subscription data response message and based on the second configuration parameter, the registration area information of the terminal, the LAN ID of the terminal, and the service area information corresponding to the LAN ID.

Manner 3:

That an AMF network element obtains registration area information of a terminal, a LAN ID of the terminal, and service area information corresponding to the LAN ID includes that the AMF network element receives a second PDU session management request sent by the terminal, where the second PDU session management request carries the LAN ID, the AMF network element obtains the registration area information of the terminal from a context of the terminal, the AMF network element sends a fourth request message to the LSMF network element, where the fourth request message carries the LAN ID, and the fourth request message is used to request to obtain the service area information corresponding to the LAN ID, the AMF network element receives a fourth response message sent by the LSMF network element, where the fourth response message carries the service area information corresponding to the LAN ID, and the AMF network element obtains the LAN ID carried in the second PDU session management request, and obtains, according to the fourth response message, the service area information corresponding to the LAN ID. That the AMF network element sends LAN information of the terminal to the terminal includes that the AMF network element sends a second PDU session management response to the terminal, where the second PDU session management response carries the LAN information of the terminal.

According to the foregoing method, when receiving the second PDU session management request, the AMF network element may trigger an operation of determining the LAN information of the terminal, and the AMF network element may obtain, according to the second PDU session management response and based on the second configuration parameter, the registration area information of the terminal, the LAN ID of the terminal, and the service area information corresponding to the LAN ID.

In addition, before the AMF network element determines the LAN information of the terminal, the LSMF network element may send a second configuration parameter to a UDM network element, where the second configuration parameter includes the LAN ID, an ID of the terminal, and the service area information corresponding to the LAN ID, or the LSMF network element may store a second configuration parameter, where the second configuration parameter includes the LAN ID, an ID of the terminal, and the service area information corresponding to the LAN ID. When the AMF network element needs to determine the LAN information of the terminal, the UDM network element or the LSMF network element may send the information to the AMF network element.

Manner 1:

That an AMF network element obtains registration area information of a terminal, a LAN ID of the terminal, and service area information corresponding to the LAN ID includes that the AMF network element receives a second subscription data update notification sent by the UDM network element or the LSMF network element, where the second subscription data update notification includes the LAN ID, the service area information corresponding to the LAN ID, and the ID of the terminal, the AMF obtains the registration area information of the terminal based on the ID of the terminal that is carried in the second subscription data update notification, and the AMF network element obtains the LAN ID and the service area information corresponding to the LAN ID that are carried in the second subscription data update notification. That the AMF network element sends LAN information of the terminal to the terminal includes that the AMF network element sends a second configuration update message to the terminal, where the second configuration update message includes the LAN information of the terminal.

According to the foregoing method, when the terminal has registered, the AMF network element may obtain, according to the second subscription data update notification sent by the UDM network element or the LSMF network element, the registration area information of the terminal, the LAN ID of the terminal, and the service area information corresponding to the LAN ID.

Manner 2:

That an AMF network element obtains registration area information of a terminal, a LAN ID of the terminal, and service area information corresponding to the LAN ID includes that the AMF network element receives a second registration request message sent by the terminal, where the second registration request message carries the ID of the terminal, the AMF network element sends a second subscription data request message to the UDM network element or the LSMF network element, where the second subscription data request message carries the ID of the terminal, the AMF network element receives a second subscription data response message sent by the UDM network element or the LSMF network element, where the second subscription data response message carries the LAN ID and the service area information corresponding to the LAN ID, the AMF generates the registration area information of the terminal, and the AMF network element obtains the LAN ID and the service area information corresponding to the LAN ID that are carried in the second subscription data response message. That the AMF network element sends LAN information of the terminal to the terminal includes that the AMF network element sends a second registration response message to the terminal, where the second registration response message includes the LAN information of the terminal.

According to the foregoing method, when the unregistered terminal sends the second registration request message, the AMF network element may trigger an operation of determining the LAN information of the terminal, and the AMF network element may obtain, according to the second subscription data response message, the registration area information of the terminal, the LAN ID of the terminal, and the service area information corresponding to the LAN ID.

In addition, before the AMF network element sends a second subscription data request message to the LSMF network element, the method further includes that the AMF network element obtains LAN indication information of the terminal or LAN subscription information of the terminal, where the LAN indication information is carried in the second registration request message, the LAN subscription information is obtained by the AMF network element from the UDM network element, and the LAN indication information or the LAN subscription information is used to indicate that the terminal needs to use a LAN service indicated by the LAN ID.

Manner 3:

That an AMF network element obtains registration area information of a terminal, a LAN ID of the terminal, and service area information corresponding to the LAN ID includes that the AMF network element receives a third PDU session management request sent by the terminal, where the third PDU session management request carries the LAN ID, the AMF network element sends a seventh subscription data request message to the UDM network element or the LSMF network element, where the seventh subscription data request message carries the ID of the terminal and the LAN ID, the AMF network element receives a seventh subscription data response message sent by the UDM network element or the LSMF network element, where the seventh subscription data response message carries the service area information corresponding to the LAN ID, the AMF network element obtains the registration area information of the terminal from a context of the terminal, and the AMF network element obtains the LAN ID carried in the third PDU session management request, and obtains the service area information that corresponds to the LAN ID and that is carried in the seventh subscription data response message. That the AMF network element sends LAN information of the terminal to the terminal includes that the AMF network element sends a third PDU session management response to the terminal, where the third PDU session management response includes the LAN information of the terminal.

According to the foregoing method, when receiving the third PDU session management request, the AMF network element may trigger an operation of determining the LAN information of the terminal, and the AMF network element may obtain, according to the third PDU session management response, the registration area information of the terminal, the LAN ID of the terminal, and the service area information corresponding to the LAN ID.

In a possible design, after the AMF network element sends LAN information of the terminal to the terminal, the method further includes that the AMF network element receives a first LAN communication request sent by the terminal, where the first LAN communication request carries the LAN ID, the AMF determines the LAN information of the terminal based on the LAN ID and the ID of the terminal, and in a case in which the terminal is not located in a LAN communication area, the AMF network element reports, to an SMF network element, the case in which the terminal is not located in the LAN communication area such that the SMF network element processes the first LAN communication request.

According to the foregoing method, the AMF network element can manage local area network communication of the terminal based on the LAN information of the terminal.

According to a second aspect, an embodiment of this application provides a local area network communication management method. The method includes the following steps. An LSMF network element receives a group management request sent by a communications device, and the LSMF network element obtains, according to the group management request, an ID of a terminal, a LAN ID of the terminal, and service area information corresponding to the LAN ID.

In a possible design, after the LSMF network element obtains, according to the group management request, an ID of a terminal, a LAN ID of the terminal, and service area information corresponding to the LAN ID, the method further includes that the LSMF network element selects a UDM network element based on the service area information corresponding to the LAN ID, and the LSMF network element sends a second configuration parameter to the UDM network element, where the second configuration parameter includes the LAN ID and the ID of the terminal.

In a possible design, after the LSMF network element obtains an ID of a terminal, a LAN ID of the terminal, and service area information corresponding to the LAN ID, the method further includes that the LSMF network element selects an AMF network element based on the service area information corresponding to the LAN ID, and the LSMF network element sends a first configuration parameter to the AMF network element, where the first configuration parameter includes the LAN ID and the service area information corresponding to the LAN ID.

In a possible design, after the LSMF network element sends a second configuration parameter to the UDM network element, the method further includes that the LSMF network element receives a third request message sent by the AMF network element, where the third request message carries the LAN ID, and the third request message is used to request to obtain the service area information corresponding to the LAN ID, and the LSMF network element sends a third response message to the AMF network element, where the third response message carries the service area information corresponding to the LAN ID.

The third request message may be any one of the foregoing first request message, the foregoing second request message, and the foregoing fourth request message. The third response message may be any one of the foregoing first response message, the foregoing second response message, and the foregoing fourth response message.

In a possible design, the second configuration parameter further includes the service area information corresponding to the LAN ID.

In a possible design, after the LSMF network element obtains, according to the group management request, an ID of a terminal, a LAN ID of the terminal, and service area information corresponding to the LAN ID, the method further includes that the LSMF network element receives a third subscription data request message sent by an AMF network element, where the third subscription data request message carries the ID of the terminal, and the third subscription data request message is used to request to obtain the LAN ID of the terminal and the service area information corresponding to the LAN ID, and the LSMF network element sends a third subscription data response message to the AMF network element, where the third subscription data response message carries the LAN ID and the service area information corresponding to the LAN ID.

The third subscription data request message may be the foregoing second subscription data request message or the foregoing seventh subscription data request message. The third subscription data response message may be the foregoing second subscription data response message or the foregoing seventh subscription data response message.

In a possible design, after the LSMF network element obtains, according to the group management request, an ID of a terminal, a LAN ID of the terminal, and service area information corresponding to the LAN ID, the method further includes that the LSMF network element sends a second subscription data update notification to the AMF network element, where the second subscription data update notification includes the LAN ID, the service area information corresponding to the LAN ID, and the ID of the terminal.

In a possible design, the group management request is a group creation request, where the group creation request is used to request to create a group in which LAN communication is to be performed, and the group creation request carries service area information corresponding to the group and an ID of a terminal, and that the LSMF network element obtains, according to the group management request, an ID of a terminal, a LAN ID of the terminal, and service area information corresponding to the LAN ID includes that the LSMF network element allocates the LAN ID to the group, and the LSMF network element determines that a service area corresponding to the LAN ID is a service area corresponding to the group.

According to the foregoing method, the LSMF network element may determine, according to the group creation request, the ID of the terminal, the LAN ID, and the service area information corresponding to the LAN ID.

In a possible design, the group management request is a first group update request, where the first group update request is used to request to update a group corresponding to the LAN ID, and the first group update request carries the LAN ID and the service area information corresponding to the LAN ID, and that the LSMF network element obtains, according to the group management request, an ID of a terminal, a LAN ID of the terminal, and service area information corresponding to the LAN ID includes that the LSMF network element determines the ID of the terminal based on the LAN ID. Alternatively, the group management request is a second group update request, where the second group update request is used to request to update a group corresponding to the LAN ID, and the second group update request carries the ID of the terminal and the LAN ID of the terminal, and that the LSMF network element obtains, according to the group management request, an ID of a terminal, a LAN ID of the terminal, and service area information corresponding to the LAN ID includes that the LSMF network element determines, based on the LAN ID, the service area information corresponding to the LAN ID.

According to the foregoing method, the LSMF network element may determine, according to the group update request, the ID of the terminal, the LAN ID, and the service area information corresponding to the LAN ID.

In a possible design, the communications device is any one of an application function (AF) network element, an operation, administration and maintenance (OAM) entity, and a designated terminal.

According to a third aspect, an embodiment of this application further provides a local area network communication management method. The method includes the following steps. A UDM network element receives a second configuration parameter sent by an LSMF network element, where the second configuration parameter includes a LAN ID of a terminal and an ID of the terminal.

In a possible design, the second configuration parameter further includes service area information corresponding to the LAN ID.

In a possible design, after a UDM network element receives a second configuration parameter sent by an LSMF network element, the method further includes the following.

The UDM network element sends a third subscription data update notification to an AMF network element, where the third subscription data update notification carries the second configuration parameter.

The third subscription data update notification may be any one of the foregoing fourth subscription data update notification, the foregoing first subscription data update notification, or the foregoing second subscription data update notification.

In a possible design, after a UDM network element receives a second configuration parameter sent by an LSMF network element, the method further includes that the UDM network element receives a third subscription data request message sent by an AMF network element, where the third subscription data request message carries the ID of the terminal, and the UDM network element sends a third subscription data response message to the AMF network element, where the third subscription data response message carries the LAN ID.

The third subscription data request message may be any one of the foregoing fourth subscription data request message, the foregoing fifth subscription data request message, or the foregoing first subscription data request message. The third subscription data response message may be any one of the foregoing fourth subscription data response message, the foregoing fifth subscription data response message, or the foregoing first subscription data response message.

In a possible design, the third subscription data response message further carries service the area information corresponding to the LAN ID.

The third subscription data request message may be the foregoing first subscription data request message.

In a possible design, after a UDM network element receives a second configuration parameter sent by an LSMF network element, the method further includes that the UDM network element receives an eighth subscription data request message sent by an AMF network element, where the eighth subscription data request message carries the ID of the terminal and the LAN ID, and the UDM network element sends an eighth subscription data response message to the AMF network element.

In a possible design, the eighth subscription data response message carries the service area information corresponding to the LAN ID.

The eighth subscription data request message may be considered as the foregoing seventh subscription data request message, and the eighth subscription data response message may be considered as the foregoing seventh subscription data response message.

According to a fourth aspect, an embodiment of this application further provides a local area network communication management method. The method includes the following steps. A terminal receives LAN information sent by an AMF network element, where the LAN information of the terminal includes a LAN ID of the terminal and LAN communication area information of the terminal, and the terminal manages LAN communication of the terminal based on the LAN information.

In a possible design, that the terminal manages local area network communication of the terminal based on the LAN information includes that when the terminal is not located in a LAN communication area, the terminal is forbidden to initiate a second LAN communication request.

In a possible design, that a terminal receives LAN information sent by an AMF network element includes that the terminal receives a first message sent by the AMF network element, where the first message carries the LAN information of the terminal, and the first message is any one of a configuration update message, a registration response message, and a PDU session management response message.

According to the foregoing method, the terminal can manage local area network communication of the terminal based on the LAN information of the terminal.

According to a fifth aspect, an embodiment of this application further provides a local area network communication management method. The method includes an LSMF network element obtains registration area information of a terminal, an ID of the terminal, a LAN ID of the terminal, and service area information corresponding to the LAN ID, the LSMF network element determines LAN communication area information of the terminal based on the registration area information and the service area information corresponding to the LAN ID, and the LSMF network element sends LAN information of the terminal to an AMF network element, where the LAN information of the terminal includes the LAN ID and the LAN communication area information of the terminal.

According to the foregoing method, the AMF network element may determine the LAN communication area information of the terminal based on the registration area information of the terminal and the service area information corresponding to the LAN ID. Then, the AMF network element may send the determined LAN information of the terminal to the terminal such that the terminal can manage LAN communication of the terminal based on the LAN information of the terminal.

In a possible design, that an LSMF network element obtains an ID of the terminal, a LAN ID of the terminal, and service area information corresponding to the LAN ID includes that the LSMF network element receives a group creation request sent by a communications device, where the group creation request is used to request to create a group in which local area network communication is to be performed, and the group creation request carries service area information corresponding to the group and an ID of a terminal, the LSMF network element allocates the LAN ID to the group, and the LSMF network element determines that a service area corresponding to the LAN ID is a service area corresponding to the group.

According to the foregoing method, the LSMF network element may determine, according to the group creation request, the ID of the terminal, the LAN ID, and the service area information corresponding to the LAN ID.

In a possible design, that an LSMF network element obtains an ID of the terminal, a LAN ID of the terminal, and service area information corresponding to the LAN ID includes that the LSMF network element receives a first group update request sent by a communications device, where the first group update request is used to request to update a group corresponding to the LAN ID, and the first group update request carries the LAN ID and the service area information corresponding to the LAN ID, and the LSMF network element determines the ID of the terminal based on the LAN ID, or the LSMF network element receives a second group update request sent by a communications device, where the second group update request is used to request to update a group corresponding to the LAN ID, and the second group update request carries the ID of the terminal and the LAN ID of the terminal, and the LSMF network element determines, based on the LAN ID, the service area information corresponding to the LAN ID.

According to the foregoing method, the LSMF network element may determine, according to the group update request, the ID of the terminal, the LAN ID, and the service area information corresponding to the LAN ID.

In a possible design, before the LSMF network element determines LAN communication area information of the terminal based on the registration area information and the service area information corresponding to the LAN ID, the method further includes that the LSMF network element receives a LAN information obtaining request sent by the AMF network element, where the LAN information obtaining request is used to request to obtain the LAN information of the terminal, and the LAN information obtaining request carries the LAN ID, the ID of the terminal, and the registration area information of the terminal. That the LSMF network element sends LAN information of the terminal to an AMF network element includes that the LSMF network element sends a LAN information obtaining response to the AMF network element, where the LAN information obtaining response carries the LAN information of the terminal.

According to the foregoing method, the LSMF network element may send the LAN information of the terminal to the terminal according to a request of the terminal.

In a possible design, the communications device is any one of an AF network element, an OAM entity, and a designated terminal.

According to a sixth aspect, an embodiment of this application provides a local area network communication management method. The method includes the following steps. An AMF network element receives LAN information of a terminal that is sent by an LSMF network element, where the LAN information of the terminal includes a LAN ID of the terminal and LAN communication area information of the terminal, and the AMF network element sends the LAN information of the terminal to the terminal.

According to the foregoing method, the AMF network element may send the LAN information of the terminal to the terminal such that the terminal can manage LAN communication of the terminal based on the LAN information of the terminal.

In a possible design, before an AMF network element receives LAN information of a terminal that is sent by an LSMF network element, the method further includes that the AMF network element sends a LAN information obtaining request to the LSMF network element, where the LAN information obtaining request is used to request to obtain the LAN information of the terminal, and the LAN information obtaining request carries the LAN ID, an ID of the terminal, and registration area information of the terminal. That an AMF network element receives LAN information of a terminal that is sent by an LSMF network element includes that the AMF network element receives a LAN information obtaining response sent by the LSMF network element, where the LAN information obtaining response carries the LAN information of the terminal.

According to the foregoing method, when the AMF network element needs to send the LAN information of the terminal to the terminal, the AMF network element requests the LAN information of the terminal from the LSMF network element.

In the method provided in the sixth aspect, the AMF network element may trigger, in different cases, an operation of obtaining the LAN information of the terminal, and request to obtain the LAN information of the terminal from the LSMF network element.

Manner 1:

Before the AMF network element sends a LAN information obtaining request to the LSMF network element, the method further includes that the AMF network element receives a subscription data update notification sent by the LSMF network element, where the subscription data update notification includes the LAN ID and the ID of the terminal, and the AMF network element determines that the terminal has registered in a group corresponding to the LAN ID. That the AMF network element sends the LAN information of the terminal to the terminal includes that the AMF network element sends a configuration update message to the terminal, where the configuration update message carries the LAN information of the terminal.

According to the foregoing method, when receiving the subscription data update notification, the AMF network element may determine that the terminal has registered, then request to obtain the LAN information of the terminal from the LSMF network element, and send the LAN information of the terminal to the terminal using the configuration update message.

Manner 2:

Before the AMF network element sends a LAN information obtaining request to the LSMF network element, the method further includes that the AMF network element receives a registration request message sent by the terminal, where the registration request message carries LAN indication information of the terminal or LAN subscription information of the terminal, the registration request message further carries the ID of the terminal, and the LAN indication information or the LAN subscription information is used to indicate that the terminal needs to use a LAN service indicated by the LAN ID. That the AMF network element sends the LAN information of the terminal to the terminal includes that the AMF network element sends a registration response message to the terminal, where the registration response message carries the LAN information of the terminal.

According to the foregoing method, when receiving the registration request message sent by the terminal, the AMF network element may request to obtain the LAN information of the terminal from the LSMF network element, and send the LAN information of the terminal to the terminal using the registration response message.

Manner 3:

Before the AMF network element sends a LAN information obtaining request to the LSMF network element, the method further includes that the AMF network element receives a PDU session management request sent by the terminal, where the PDU session management request carries the LAN ID, and the AMF network element determines the ID of the terminal according to the PDU session management request. That the AMF network element sends the LAN information of the terminal to the terminal includes that the AMF network element sends a PDU session management response message to the terminal, where the PDU session management response message carries the LAN information of the terminal.

According to the foregoing method, when receiving the PDU session management request sent by the terminal, the AMF network element may request to obtain the LAN information of the terminal from the LSMF network element, and send the LAN information of the terminal to the terminal using the PDU session management response message.

In a possible design, after the AMF network element sends the LAN information of the terminal to the terminal, the method further includes that the AMF network element receives a first LAN communication request sent by the terminal, where the first LAN communication request carries the LAN ID, the AMF determines the LAN information of the terminal based on the LAN ID and the ID of the terminal, and in a case in which the terminal is not located in a LAN communication area, the AMF network element reports, to an SMF network element, the case in which the terminal is not located in the LAN communication area such that the SMF network element processes the first LAN communication request.

According to the foregoing method, the AMF network element can manage local area network communication of the terminal based on the LAN information of the terminal.

According to a seventh aspect, an embodiment of this application provides a local area network communication management method. The method includes that a terminal receives LAN information sent by an AMF network element, where the LAN information of the terminal includes a LAN ID of the terminal and LAN communication area information of the terminal, and the terminal manages LAN communication of the terminal based on the LAN information.

According to the foregoing method, the terminal can manage local area network communication of the terminal based on the LAN information of the terminal.

In a possible design, that the terminal manages LAN communication of the terminal based on the LAN information includes that when the terminal is not located in a LAN communication area, the terminal is forbidden to initiate a second LAN communication request.

In a possible design, that a terminal receives LAN information sent by an AMF network element includes that the terminal receives a first message sent by the AMF network element, where the first message carries the LAN information of the terminal, and the first message is any one of a configuration update message, a registration response message, and a PDU session management response message.

According to an eighth aspect, an embodiment of this application provides a local area network communication management apparatus, including a processing unit configured to obtain registration area information of a terminal, a LAN ID of the terminal, and service area information corresponding to the LAN ID, where the processing unit is further configured to determine LAN communication area information of the terminal based on the registration area information and the service area information corresponding to the LAN ID, and a sending unit configured to send LAN information of the terminal to the terminal, where the LAN information of the terminal includes the LAN ID and the LAN communication area information of the terminal.

In addition, the local area network communication management apparatus provided in the eighth aspect may be configured to perform the method corresponding to the first aspect. For an implementation that is not described in detail for the local area network communication management apparatus provided in the eighth aspect, refer to the foregoing embodiment. Details are not described herein again.

According to a ninth aspect, an embodiment of this application provides a local area network communication management apparatus, including a receiving unit configured to receive a group management request sent by a communications device, and a processing unit configured to obtain, according to the group management request, an ID of a terminal, a LAN ID of the terminal, and service area information corresponding to the LAN ID.

In addition, the local area network communication management apparatus provided in the ninth aspect may be configured to perform the method corresponding to the second aspect. For an implementation that is not described in detail for the local area network communication management apparatus provided in the ninth aspect, refer to the foregoing embodiment. Details are not described herein again.

According to a tenth aspect, an embodiment of this application provides a local area network communication management apparatus, including a receiving unit configured to receive a second configuration parameter sent by an LSMF network element, where the second configuration parameter includes a LAN ID of a terminal and an ID of the terminal.

In addition, the local area network communication management apparatus provided in the tenth aspect may be configured to perform the method corresponding to the third aspect. For an implementation that is not described in detail for the local area network communication management apparatus provided in the tenth aspect, refer to the foregoing embodiment. Details are not described herein again.

According to an eleventh aspect, an embodiment of this application further provides a local area network communication management apparatus, including a receiving unit configured to receive LAN information sent by an AMF network element, where the LAN information of a terminal includes a LAN ID of the terminal and LAN communication area information of the terminal, and a processing unit configured to manage LAN communication of the terminal based on the LAN information.

In addition, the local area network communication management apparatus provided in the eleventh aspect may be configured to perform the method corresponding to the fourth aspect. For an implementation that is not described in detail for the local area network communication management apparatus provided in the eleventh aspect, refer to the foregoing embodiment. Details are not described herein again.

According to a twelfth aspect, an embodiment of this application further provides a local area network communication management apparatus, including a processing unit configured to obtain registration area information of a terminal, an ID of the terminal, a LAN ID of the terminal, and service area information corresponding to the LAN ID, where the processing unit is further configured to determine LAN communication area information of the terminal based on the registration area information and the service area information corresponding to the LAN ID, and a sending unit configured to send LAN information of the terminal to an AMF network element, where the LAN information of the terminal includes the LAN ID and the LAN communication area information of the terminal.

In addition, the local area network communication management apparatus provided in the twelfth aspect may be configured to perform the method corresponding to the fifth aspect. For an implementation that is not described in detail for the local area network communication management apparatus provided in the twelfth aspect, refer to the foregoing embodiment. Details are not described herein again.

According to a thirteenth aspect, an embodiment of this application further provides a local area network communication management apparatus, including a receiving unit configured to receive LAN information of a terminal that is sent by an LSMF network element, where the LAN information of the terminal includes a LAN ID of the terminal and LAN communication area information of the terminal, and a sending unit configured to send the LAN information of the terminal to the terminal.

In addition, the local area network communication management apparatus provided in the thirteenth aspect may be configured to perform the method corresponding to the sixth aspect. For an implementation that is not described in detail for the local area network communication management apparatus provided in the thirteenth aspect, refer to the foregoing embodiment. Details are not described herein again.

According to a fourteenth aspect, an embodiment of this application further provides a local area network communication management apparatus, including a receiving unit configured to receive LAN information sent by an AMF network element, where the LAN information of a terminal includes a LAN ID of the terminal and LAN communication area information of the terminal, and a processing unit configured to manage LAN communication of the terminal based on the LAN information.

In addition, the local area network communication management apparatus provided in the fourteenth aspect may be configured to perform the method corresponding to the seventh aspect. For an implementation that is not described in detail for the local area network communication management apparatus provided in the fourteenth aspect, refer to the foregoing embodiment. Details are not described herein again.

According to a fifteenth aspect, an embodiment of this application further provides a local area network communication management apparatus. A structure of the apparatus includes a processor and a memory. The processor is configured to support a terminal to perform a corresponding function in the method provided in any one of the first aspect to the seventh aspect or the designs of the first aspect to the seventh aspect. The memory is coupled to the processor, and the memory stores a program instruction and data that are necessary for the apparatus. The structure of the apparatus further includes a communications interface configured to communicate with another device.

According to a sixteenth aspect, an embodiment of this application further provides a communications system. The communications system includes an AMF network element and an LSMF network element.

In a possible implementation, the LSMF network element is configured to receive a group management request sent by a communications device, and obtain, according to the group management request, an ID of a terminal, a LAN ID of the terminal, and service area information corresponding to the LAN ID. The LSMF network element is further configured to, when the terminal has registered, send a subscription data update notification to the AMF network element, where the subscription data update notification carries the ID of the terminal, the LAN ID of the terminal, and the service area information corresponding to the LAN ID.

The AMF network element is configured to determine LAN communication area information of the terminal based on registration area information of the terminal and the service area information corresponding to the LAN ID, and send LAN information of the terminal to the terminal. The LAN information of the terminal includes the LAN ID and the LAN communication area information of the terminal. The terminal manages LAN communication of the terminal based on the LAN information.

In another possible implementation, the LSMF network element is configured to receive a group management request sent by a communications device, and obtain, according to the group management request, an ID of a terminal, a LAN ID of the terminal, and service area information corresponding to the LAN ID.

The AMF network element is configured to, when the terminal sends a registration request message, send a subscription data request message to the LSMF network element, where the subscription data request message carries the ID of the terminal.

The LSMF network element is further configured to send a subscription data response message to the AMF network element, where the subscription data response message carries the LAN ID of the terminal and the service area information corresponding to the LAN ID.

The AMF network element is further configured to determine LAN communication area information of the terminal based on registration area information of the terminal and the service area information corresponding to the LAN ID, and send LAN information of the terminal to the terminal. The LAN information of the terminal includes the LAN ID and the LAN communication area information of the terminal. The terminal manages LAN communication of the terminal based on the LAN information.

According to a seventeenth aspect, this application further provides a computer-readable storage medium. The computer-readable storage medium stores an instruction. When the instruction is run on a computer, the computer is enabled to perform the method in each of the foregoing aspects.

According to an eighteenth aspect, this application further provides a computer program product including an instruction. When the computer program product runs on a computer, the computer is enabled to perform the method in each of the foregoing aspects.

According to a nineteenth aspect, this application further provides a computer chip. The chip is connected to a memory. The chip is configured to read and execute a software program stored in the memory, to perform the method in each of the foregoing aspects.

DESCRIPTION OF EMBODIMENTS

To make the objectives, technical solutions, and advantages of this application clearer, the following further describes this application in detail with reference to the accompanying drawings. A specific operation method in method embodiments may also be used in an apparatus embodiment or a system embodiment.

Figure 1:
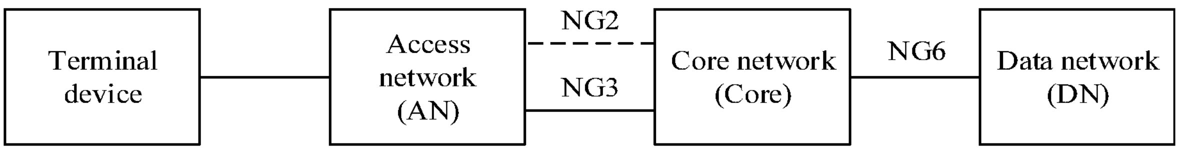
FIG. 1 is a schematic structural diagram of a network architecture according to an embodiment of this application.

FIG. 1 is a schematic diagram of a possible network architecture used in this application. The network architecture is a 5G network architecture. Network elements in the network architecture include a terminal, an access network (AN), a core network, and a data network (DN). The access network may be a radio access network (RAN). In the network architecture, the terminal, the AN, and the core are main parts of the network architecture. Network elements in the AN and the core may be logically divided into two parts: a user plane and a control plane. The control plane is responsible for managing a mobile network, and the user plane is responsible for transmitting service data. For example, in the network architecture shown in FIG. 1, an NG2 reference point is located between a RAN control plane and a core control plane, an NG3 reference point is located between a RAN user plane and a core user plane, and an NG6 reference point is located between a core user plane and the DN.

In the network architecture shown in FIG. 1, the terminal is a device that has a wireless transceiver function, and is an interface used by a mobile user to interact with a network. The terminal can provide a basic computing capability and a storage capability, display a service window to the user, and receive an operation input of the user. In a 5G communications system, the terminal establishes a signal connection and a data connection to the AN using a new radio technology, to transmit a control signal and service data to a network.

Further, the terminal may be deployed on land, including an indoor or outdoor device, a handheld device, or a vehicle-mounted device, or may be deployed on a water surface (for example, on a ship), or may be deployed in the air (for example, on an aircraft, a balloon, or a satellite). The terminal may be a mobile phone, a tablet computer, a computer having a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like.

In the network architecture shown in FIG. 1, the AN is similar to a base station in a conventional communications network, is deployed at a position close to the terminal, provides a network access function for an authorized user in a specific area, and can determine transmission tunnels with different quality based on a user type, a service requirement, and the like, to transmit user data. The AN can manage and properly use resources of the AN and provide an access service for the terminal as required, and is responsible for forwarding a control signal and service data between the terminal and the core.

In the network architecture shown in FIG. 1, the core is responsible for maintaining subscription data of a mobile network, managing a network element in the mobile network, and providing functions such as session management, mobility management, policy management, and security authentication for the terminal. For example, when the terminal is attached to the mobile network, the core provides network access authentication for the terminal, when the terminal has a service request, the core allocates a network resource to the terminal, when the terminal moves, the core updates a network resource for the terminal, when the terminal is idle, the core provides a fast resume mechanism for the terminal, when the terminal is detached from the mobile network, the core releases a network resource for the terminal, and when the terminal has service data, the core provides a data routing function for the terminal, for example, forwards uplink data to the DN, or receives downlink data from the DN and forwards the downlink data to the AN.

In the network architecture shown in FIG. 1, the DN is a data network that provides a service for a user. In an actual communication process, a client is usually located on the terminal, and a server is usually located in the DN. The DN may be a private network, for example, a local area network, or may be an external network that is not controlled by an operator, for example, the internet, or may be a dedicated network jointly deployed by operators, for example, a network that provides an IP multimedia network subsystem (IMS) service.

Figure 2:
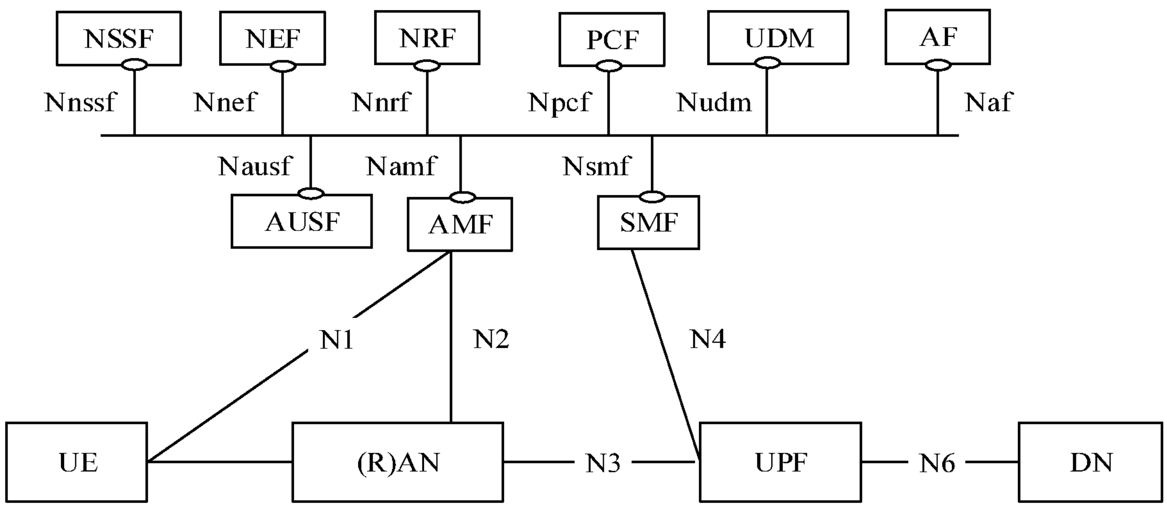
FIG. 2 is a schematic structural diagram of another network architecture according to an embodiment of this application.

FIG. 2 is a schematic diagram of a specific network architecture used in this application. The network architecture is a 5G network architecture. Network elements in the 5G architecture include a terminal, a radio access network (RAN), and a DN. In FIG. 2, for example, the terminal is user equipment (UE). In addition, the network architecture further includes core network elements, and the core network elements include a user plane function (UPF) network element and control plane function network elements. Further, the control plane function network elements include but are not limited to an AMF network element, a session management function (SMF) network element, an authentication server function (AUSF) network element, an application function (AF) network element, a UDM network element, a policy control function (PCF) network element, a network exposure function (NEF) network element, an NF repository function (NRF) network element, and a network slice selection function (NSSF) network element.

Optionally, in the network architecture, the control plane function network element may further include an LSMF.

In actual application, the LSMF network element may be used as an independent physical functional entity, or may be used as a logical functional entity deployed in another network element (for example, the NEF network element, the PCF network element, or the UDM network element).

It should be noted that, in a conventional core network architecture, point-to-point communication is performed between control plane function network elements. To be specific, a set of specific messages are used for communication through an interface between the control plane function network elements. The control plane function network elements at two ends of the interface can communicate with each other using only the set of specific messages. However, in a 5G core network architecture, a control plane uses a service-based architecture. To be specific, interaction between control plane function network elements is performed in a service invoking manner, and a control plane function network element opens a service to another control plane function network element such that the other control plane function network element can invoke the service.

Functions of the network elements in the network architecture shown in FIG. 2 are described in detail below. Because functions of the UE, the RAN, and the DN have been described in related descriptions of the network architecture shown in FIG. 1, the following mainly describes functions of the core network elements.

The UPF network element is a function network element on a user plane, and is mainly responsible for connecting to an external network. The UPF network element performs related functions of a serving gateway (SGW) and a packet data network (PDN) gateway (PGW) in Long-Term Evolution (LTE). Further, the UPF may forward a user data packet according to a routing rule of the SMF, for example, send uplink data to the DN or another UPF, or forward downlink data to another UPF or the RAN.

The AMF network element is responsible for access management and mobility management of the UE, for example, responsible for maintaining a UE status, managing reachability of the UE, forwarding a mobility management (MM) non-access-stratum (NAS) message, and forwarding a session management (SM) N2 message. In actual application, the AMF network element may implement a mobility management function of a mobility management entity (MME) in an LTE network framework, and may further implement an access management function.

The SMF network element is responsible for session management, and allocates a resource or releases a resource for a session of the UE. The resource includes session quality of service (QoS), a session path, a forwarding rule, and the like.

The AUSF network element is configured to perform security authentication on the UE.

The AF network element may be a third-party application control platform, or may be a device of an operator. The AF network element may provide services for a plurality of application servers.

The UDM network element may store subscription information of the UE.

The PCF network element is configured to perform user policy management, and is similar to a policy and charging rules function (PCRF) network element in LTE. The PCF network element is mainly responsible for policy authorization, quality of service, and generation of a charging rule, and delivering a corresponding rule to the UPF network element through the SMF network element, to complete installation of a corresponding policy and rule.

The NEF network element is configured to expose a network function to a third party through a northbound application programming interface (API).

The NRF network element is configured to provide functions of storing and selecting network functional entity information for another network element.

The NSSF network element is configured to select a network slice for the UE.

The network architecture shown in FIG. 2 may further include the LSMF network element. The LSMF network element is used to manage a LAN service area. Further, when a LAN group is defined, a service area of the group is configured on the LSMF, or when a LAN group is updated, a service area of the group is updated on the LSMF network element. Service area information stored on the LSMF may be sent to another network element (for example, the AMF network element or the UDM network element), and the other network element may manage local area network communication of UE in the group based on the service area information.

In the network architecture shown in FIG. 2, network elements related to this application mainly include the UE, the AMF, the UDM, the LSMF, the NEF, and the AF.

The following explains basic concepts related to the embodiments of this application. It should be noted that these explanations are intended to make this application more easily understood, but should not be considered as a limitation on the protection scope claimed in this application.

1. LAN ID:

The LAN ID may be understood as an identifier of a LAN group. That is, the LAN ID may be used to identify a LAN group or a specific LAN service. Terminals identified by a same LAN ID belong to a same LAN group, and may use a LAN service corresponding to the LAN ID. To be specific, the terminals identified by the same LAN ID may perform LAN communication with each other.

Further, from a perspective of a format, the LAN ID may be a special domain name (such as DN name (DNN)), a character string, an internal group identifier, an external group identifier, or a serial number. In addition, the LAN ID may alternatively use some special formats. For example, the LAN ID may further include provider information, operator information, network information, and domain information.

In the embodiments of this application, a concept of "a LAN ID of a terminal" is further provided. A terminal may belong to one or more LAN groups or use one or more LAN services. A terminal may alternatively subscribe to one or more LAN groups or LAN services. In the embodiments of this application, a LAN ID of any LAN group or LAN service to which a terminal subscribes may be understood as a LAN ID of the terminal. A terminal may alternatively be associated with or correspond to one or more LAN groups or LAN services. In the embodiments of this application, a LAN ID of any LAN group or LAN service associated with or corresponding to a terminal may be understood as a LAN ID of the terminal.

2. Service Area Information Corresponding to a LAN ID:

As described above, a LAN service is area-restricted. For example, office devices of employees of an enterprise constitute a LAN group, and a LAN can provide a LAN service for the office devices in the LAN group only in an office area of the enterprise (that is, the office devices in the LAN group can communicate with each other only in the office area of the enterprise). If an office device of an employee is not located in the office area, the LAN no longer provides a LAN service for the office device. For another example, devices in a factory constitute a LAN group, and a LAN can provide a LAN service for the devices in the LAN group only in a workshop of the factory (that is, the devices in the LAN group can perform LAN communication with each other only in the workshop). If a device is not located in the workshop, the LAN no longer provides a LAN service for the device. The LAN can provide a LAN service for the device only when the device moves to the workshop again.

The foregoing area in which a LAN service can be provided for a terminal in a LAN group may be understood as a service area of the LAN group. Because a LAN group may be identified by a LAN ID, a service area of the LAN group may also be referred to as a service area corresponding to the LAN ID. In the embodiments of this application, information used to indicate the service area corresponding to the LAN ID is referred to as service area information corresponding to the LAN ID.

It should be noted that, in the embodiments of this application, the service area information corresponding to the LAN ID is a concept at a LAN granularity. To be specific, the service area information corresponding to the LAN ID is applicable to all terminals in the LAN group identified by the LAN ID, and the service area information corresponding to the LAN ID is related only to the LAN group, and may be unrelated to configuration information and the like of the terminals included in the LAN group. A LAN may provide a LAN service for a terminal in the LAN group in the service area corresponding to the LAN ID. However, that a terminal is located in the service area corresponding to the LAN ID does not mean that the terminal can definitely perform LAN communication with another terminal in the LAN group. Whether the terminal can perform LAN communication with another terminal in the LAN group is further related to configuration information (for example, a registration area of the terminal) such as subscription data of the terminal. Related content is to be described subsequently, and details are not described herein.

From a perspective of a representation manner, the service area information corresponding to the LAN ID includes but is not limited to three representation manners: a tracking area identity list (TA list) (or a TAL), a cell list, and geographical position information. Optionally, when the service area information corresponding to the LAN ID is represented using the geographical position information, the geographical position information may also be converted into a representation manner of the TA list or the cell list.

For example, the service area corresponding to the LAN ID may include N tracking areas, where $N \geq 1$. In this case, the service area information corresponding to the LAN ID may be represented by a TA list including N tracking area identities.

3. Registration Area Information of a Terminal:

When the terminal registers with a 3rd Generation Partnership Project (3GPP) network, the AMF network element allocates a TAL to the terminal. The TAL includes a set of identities of a group of tracking areas, and the group of tracking areas may be considered as a registration area of the terminal. When the AMF network element allocates the registration area to the terminal, the following factors are considered, including but not limited to a mobility mode (for example, mobility statistics data of the terminal), a mobility restriction (for example, an access-forbidden area), a current position of the terminal, and the like.

The registration area of the terminal may be understood as an area in which the terminal can establish a signaling connection to a network. Further, when the terminal is in an idle mode, but the network needs to send data and signaling to the terminal, if the terminal is located in the registration area, the network may page the terminal to ensure that the terminal is reachable (the network sends paging signaling to all base stations in the registration area).

For example, when there is no signaling connection between the terminal and the network (to be specific, the terminal is in the idle mode), the network may send the paging signaling to the terminal in the registration area of the terminal. In this case, if the terminal is located in the registration area, the terminal establishes a signaling connection to the network, and the terminal switches to a connected mode, or if the terminal moves out of the registration area, the network cannot page the terminal, and therefore the terminal cannot establish a signaling connection to the network.

The registration area information of the terminal may be generated in a registration procedure initiated by the terminal. Further, after receiving a registration request message (carrying an ID of the terminal) sent by the terminal, the AMF network element dynamically generates the registration area information of the terminal, and stores the ID of the terminal and the registration area information of the terminal in a corresponding local context, and another network element in the core network may query the AMF for the registration area information of the terminal based on the ID of the terminal.

It should be noted that the AMF network element may generate the local context for the terminal in the registration procedure of the terminal. The local context of the terminal not only includes the ID of the terminal and the registration area information of the terminal, but also includes other information. The registration procedure of the terminal belongs to the other approaches. Therefore, to implement the embodiments of this application, the ID of the terminal and the registration area information of the terminal need to be obtained from the local context, and other information included in the local context is not described in detail in the embodiments of this application.

For example, the registration area of the terminal may include M tracking areas, where M≥1. In this case, the registration area information of the terminal may be represented by a TA list including M tracking area identities.

4. Restriction Information Corresponding to a LAN ID:

The restriction information corresponding to the LAN ID may be understood as restriction information of LAN communication to be performed by all terminals in a LAN group identified by the LAN ID.

In the embodiments of this application, the restriction information corresponding to the LAN ID may be represented in a plurality of manners. The restriction information corresponding to the LAN ID may include one or more of communication forbidden area information and communication restricted area information. The communication forbidden area information is used to indicate an area in which LAN communication is forbidden, and all the terminals in the LAN group are not allowed to perform any type of communication in the area. The communication restricted area information is used to indicate an area in which restricted LAN communication is performed, and all the terminals in the LAN group are allowed to perform only a specific type of communication in the area. For example, all the terminals are allowed to only respond to paging signaling in the area.

In addition, the restriction information corresponding to the LAN ID may further include one or more of available public land mobile network (PLMN) information, forbidden PLMN information, available radio access technology (RAT) information, forbidden RAT information, available access type information, forbidden access type information, available core type information, and forbidden core type information.

The available PLMN information is used to indicate a PLMN identifier of a PLMN, for a LAN group, in which LAN communication can be performed. A terminal in the LAN group can perform LAN communication only when a PLMN identifier corresponding to the terminal is the same as the PLMN identifier indicated in the available PLMN information. The forbidden PLMN information is used to indicate a PLMN identifier of a PLMN, for a LAN group, in which LAN communication cannot be performed. A terminal in the LAN group cannot perform LAN communication when a PLMN identifier corresponding to the terminal is the same as the PLMN identifier indicated in the forbidden PLMN information.

For explanations of the available RAT information, the forbidden RAT information, the available access type information, the forbidden access type information, the available core type information, and the forbidden core type information, refer to the related explanations of the available PLMN information and the forbidden PLMN information. Details are not described herein.

It is easily understood from the foregoing descriptions that the restriction information corresponding to the LAN ID may be understood as a supplement to service area information corresponding to the LAN ID. That a terminal is located in a service area corresponding to the LAN ID does not mean that a LAN can definitely provide a LAN service for the terminal. The LAN can provide the LAN service for the terminal only when the terminal meets a condition that is indicated in the restriction information corresponding to the LAN ID and that indicates that LAN communication can be performed.

For example, a terminal in the LAN group identified by the LAN ID is located in the service area corresponding to the LAN ID, the restriction information corresponding to the LAN ID includes the forbidden PLMN information (for example, a PLMN A), and a PLMN identifier corresponding to the terminal is a PLMN B. In this case, the LAN can provide a LAN service for the terminal.

For another example, a terminal in the LAN group identified by the LAN ID is located in the service area corresponding to the LAN ID, the restriction information corresponding to the LAN ID includes the available access type information (for example, an access type C), and an access type corresponding to the terminal is an access type D. In this case, because the terminal uses the access type D to access a network, the terminal is restricted to performing LAN communication in the LAN, and the LAN cannot provide a LAN service for the terminal.

It should be noted that, in the embodiments of this application, the restriction information corresponding to the LAN ID is a concept at a LAN granularity. To be specific, the restriction information corresponding to the LAN ID is applicable to all the terminals in the LAN group identified by the LAN ID, and the restriction information corresponding to the LAN ID is related only to the LAN group, and is unrelated to configuration information and the like of the terminals included in the LAN group.

5. Restriction Information of a Terminal:

The restriction information of the terminal may be understood as restriction information of LAN communication to be performed by the terminal. In the embodiments of this application, the restriction information of the terminal may be represented in a plurality of manners. The restriction information of the terminal may include one or more of communication forbidden area information, communication allowed area information, and communication restricted area information. The communication forbidden area information is used to indicate an area in which the terminal is forbidden to perform LAN communication. The communication allowed area information is used to indicate an area in which the terminal is allowed to perform LAN communication. The communication restricted area information is used to indicate an area in which the terminal is restricted to performing LAN communication, and the terminal is allowed to perform only a specific type of communication in the area. For example, the terminal is allowed to only respond to paging signaling in the area.

In addition, the restriction information of the terminal may further include one or more of available PLMN information, forbidden PLMN information, available RAT information, forbidden RAT information, available access type information, forbidden access type information, available core type information, and forbidden core type information.

The available PLMN information is used to indicate a PLMN identifier of a PLMN in which LAN communication can be performed. A terminal can perform LAN communication only when a PLMN identifier corresponding to the terminal is the same as the PLMN identifier indicated in the available PLMN information. The forbidden PLMN information is used to indicate a PLMN identifier of a PLMN in which LAN communication cannot be performed. A terminal cannot perform LAN communication when a PLMN identifier corresponding to the terminal is the same as the PLMN identifier indicated in the forbidden PLMN information.

For explanations of the available RAT information, the forbidden RAT information, the available access type information, the forbidden access type information, the available core type information, and the forbidden core type information, refer to the related explanations of the available PLMN information and the forbidden PLMN information. Details are not described herein.

As described above, the LAN can provide a LAN service for a terminal in the LAN group in the service area corresponding to the LAN ID. However, that a terminal is located in the service area corresponding to the LAN ID does not mean that the terminal can definitely perform LAN communication with another terminal in the LAN group. Whether the terminal can perform LAN communication with another terminal in the LAN group is further related to a registration area of the terminal. If the terminal is located in the service area corresponding to the LAN ID, but the terminal is not located in the registration area of the terminal, the terminal cannot perform LAN communication with another terminal in the LAN group.

It should be noted that, in the embodiments of this application, the restriction information of the terminal is a concept at a UE granularity. To be specific, the restriction information of the terminal is applicable only to the terminal, and the restriction information of the terminal is not applicable to another terminal in a LAN group to which the terminal belongs.

6. LAN Communication Area Information of a Terminal:

It is easily understood from the foregoing descriptions that, a condition that a terminal performs LAN communication with another terminal in a LAN group to which the terminal belongs includes at least the following. The terminal is located in a service area corresponding to an ID (LAN ID) of the LAN group, and the terminal is located in a registration area of the terminal. To be specific, when the terminal is located in an intersection area of the service area corresponding to the LAN ID and the registration area of the terminal, the terminal can perform LAN communication with another terminal in the LAN group to which the terminal belongs. In the embodiments of this application, indication information of the intersection area is referred to as LAN communication area information of the terminal. That is, the LAN communication area information of the terminal may be understood as an intersection of service area information corresponding to the LAN ID and registration area information of the terminal. In addition, if restriction information of the terminal includes communication allowed area information, the LAN communication area information of the terminal may be understood as an intersection of the service area information corresponding to the LAN ID, the registration area information of the terminal, and the communication allowed area information of the terminal.

In the embodiments of this application, the LAN communication area information of the terminal is used to indicate an area in which the terminal can perform LAN communication with another terminal in the LAN group to which the terminal belongs.

It should be noted that the LAN communication area information is an expression used in the embodiments of this application, or may be replaced with another expression, provided that the expression is used to indicate an area in which a terminal can perform LAN communication with another terminal in a LAN group to which the terminal belongs. For example, LAN communication area information of a terminal may be replaced with any one of LAN service area information of a terminal, LAN service area information corresponding to a terminal, LAN service area information related to a terminal, LAN service area information associated with a terminal, LAN available area information of a terminal, LAN available area information corresponding to a terminal, LAN available area information related to a terminal, LAN available area information associated with a terminal, service area information of a LAN for a terminal, service area information corresponding to a LAN for a terminal, service area information related to a LAN for a terminal, service area information associated with a LAN for a terminal, available area information of a LAN for a terminal, available area information corresponding to a LAN for a terminal, available area information related to a LAN for a terminal, and available area information associated with a LAN for a terminal.

Figure 3:
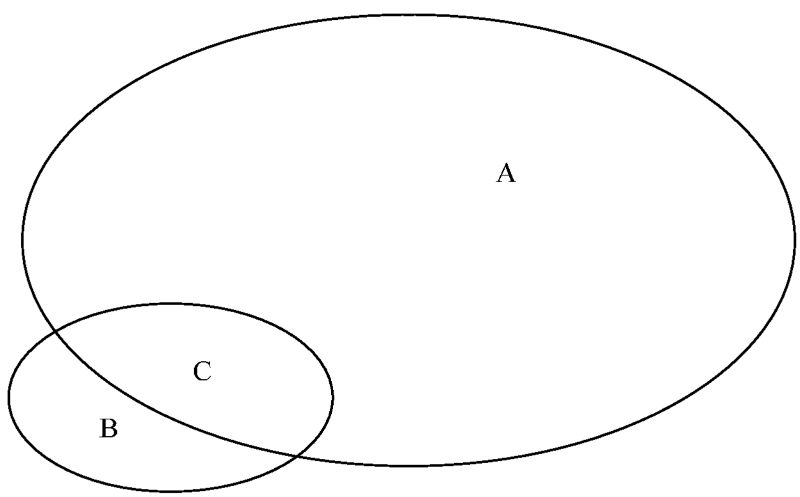
FIG. 3 is a schematic diagram of a LAN communication area of a terminal according to an embodiment of this application.

For example, as shown in FIG. 3, it is assumed that a registration area of a terminal is A, and a service area corresponding to an ID (that is, a LAN ID) of a LAN group to which the terminal belongs is B. In this case, a LAN communication area corresponding to the terminal may be an area C.

From a perspective of a representation manner, LAN communication area information of the terminal includes but is not limited to three representation manners: a TA list, a cell list, and geographical position information. Optionally, when the LAN communication area information of the terminal is represented using the geographical position information, the geographical position information may also be converted into a representation manner of the TA list or the cell list.

For example, the LAN communication area of the terminal may include P tracking areas, where P≥1. In this case, the LAN communication area information of the terminal may be represented by a TA list including P tracking area identities.

For example, the LAN communication area of the terminal may include Q cells, where Q≥1. In this case, the LAN communication area information of the terminal may be represented by a cell list including Q cell identifiers.

7. Lan Information:

In the embodiments of this application, the LAN information includes a LAN ID and LAN communication area information of a terminal, and the LAN information may be used to manage local area network communication of the terminal. Further, the terminal or a network element (for example, the AMF network element, the SMF network element, the UDM network element, or the LSMF network element) may manage local area network communication of the terminal based on the LAN information of the terminal.

As described above, the LAN communication area information of the terminal may be understood as an intersection of service area information corresponding to the LAN ID and registration area information of the terminal. If restriction information of the terminal includes communication allowed area information, the LAN communication area information of the terminal may be understood as an intersection of the service area information corresponding to the LAN ID, the registration area information of the terminal, and the communication allowed area information of the terminal. Particularly, when the restriction information of the terminal includes the communication allowed area information, the LAN communication area information of the terminal may also be referred to as service restriction information of the terminal.

Further, a manner in which the terminal manages local area network communication of the terminal based on the LAN information of the terminal may be as follows. Before the terminal initiates a local area network communication request, the terminal may obtain a bound LAN ID according to a UE route selection policy (URSP) and check a position of the terminal, and the terminal checks, based on the LAN ID and the position of the terminal, whether the terminal is located in a LAN communication area. If the terminal is located in the LAN communication area, the terminal can initiate the local area network communication request (for example, a session establishment/modification request), and then send data. If the terminal is not located in the LAN communication area, the terminal cannot initiate the LAN communication request.

In addition, a network element (for example, the AMF network element, the SMF network element, the UDM network element, or the LSMF network element) may also manage local area network communication of the terminal based on the LAN information of the terminal. The AMF network element is used as an example. That the AMF network element manages local area network communication of the terminal based on the LAN information of the terminal may be implemented in the following manner. After receiving a local area network communication request (for example, a session establishment/modification request) sent by the terminal, the AMF network element checks a position of the terminal, and searches for the LAN information of the terminal based on a LAN ID in session signaling and an ID of the terminal. If the terminal is not located in a LAN communication area, the AMF notifies the SMF network element, and the SMF network element performs corresponding processing. For example, the SMF network element rejects to establish/modify a session for the terminal. For another example, if the SMF network element has established a session for the terminal when receiving a notification from the AMF network element, the SMF network element may deactivate or release the related session.

A manner in which another network element manages local area network communication of the terminal based on the LAN information of the terminal is similar to the manner in which the AMF network element manages local area network communication of the terminal based on the LAN information of the terminal. Details are not described herein.

Optionally, when the LAN information of the terminal is determined, restriction information corresponding to the LAN ID and the restriction information of the terminal may further be considered. That is, the LAN information of the terminal may further include the restriction information corresponding to the LAN ID and the restriction information of the terminal.

When managing local area network communication of the terminal based on the LAN information of the terminal, the terminal further needs to consider the restriction information corresponding to the LAN ID and the restriction information of the terminal. The terminal can initiate local area network communication only when the terminal meets a condition that is indicated in the restriction information and that indicates that local area network communication can be performed.

When managing local area network communication of the terminal based on the LAN information of the terminal, a network element (for example, the AMF network element, the SMF network element, the UDM network element, or the LSMF network element) also needs to consider the restriction information corresponding to the LAN ID and the restriction information of the terminal. A network element (for example, the AMF network element, the SMF network element, the UDM network element, or the LSMF network element) may allow the terminal to initiate local area network communication only when the terminal meets a condition that is indicated in the restriction information and that indicates that local area network communication can be performed.

For example, in addition to the LAN ID and the LAN communication area information of the terminal, the LAN information of the terminal includes the restriction information corresponding to the LAN ID. The restriction information corresponding to the LAN ID includes communication forbidden area information. In this case, when the terminal manages local area network communication of the terminal based on the LAN information of the terminal, if the terminal is located in a communication forbidden area indicated in the restriction information corresponding to the LAN ID, the terminal is forbidden to initiate the local area network communication request.

8. Group Creation/Group Update:

As described above, terminals belonging to a same LAN group can perform LAN communication with each other. Related information about the LAN group (for example, a service area of the LAN group, a LAN ID of the LAN group, an ID of a terminal belonging to the LAN group, and restriction information corresponding to the LAN ID) may be configured using a group creation/group update process.

In the group creation process, a communications device may send a group creation request to a network element configured to manage a group (referred to as a "group management network element" below, for example, the LSMF network element or the NEF network element), to request to create a LAN group. The group creation request carries service area information corresponding to the LAN group that is requested to be created and IDs of all terminals belonging to the LAN group. After receiving the group creation request, the group management network element may allocate the LAN ID to the LAN group. In this way, the LAN group is successfully created, and service area information corresponding to the LAN ID is the service area information carried in the group creation request.

The group update process may be classified into two types. A first type is used to update service area information corresponding to a LAN group. When a service area of the LAN group changes, a communications device may notify a group management network element using the group update process. A second type is used to update a member in a LAN group (that is, a terminal included in the LAN group). When a member in the LAN group changes, a communications device may notify a group management network element using a group update request. For example, a terminal is added to the LAN group.

The first type of group update process may be as follows. The group management network element receives a group update request sent by the communications device, where the group update request carries a LAN ID and service area information corresponding to the LAN ID, and after receiving the group update request, the group management network element may update the service area information corresponding to the LAN group identified by the LAN ID.

The second type of group update process may be as follows. The group management network element receives a group update request sent by the communications device, where the group update request carries a LAN ID and an ID of a terminal, and after receiving the group update request, the group management network element may add the terminal corresponding to the ID of the terminal to the LAN group indicated by the LAN ID.

In addition, the group update request received by the group management network element may alternatively be a group update request used to indicate to delete a member in a group corresponding to a LAN ID. After receiving a group update request used to indicate to delete a terminal, the group management network element may notify the AMF network element. After learning that the terminal has been deleted from the LAN group identified by the LAN ID, the AMF network element may delete (or set to null) LAN information that is of the terminal and that is related to the LAN ID, and notify the terminal to delete (or set to null) the LAN information related to the LAN ID. The terminal can no longer perform local area network communication with a terminal in the LAN group identified by the LAN ID.

In addition, the communications device may alternatively implement the foregoing two types of update using one group update process. For example, the group management network element receives a group update request sent by the communications device, where the group update request carries a LAN ID, service area information corresponding to the LAN ID, and an ID of a terminal. After receiving the group update request, the group management network element may add the terminal corresponding to the ID of the terminal to a LAN group indicated by the LAN ID, and update service area information corresponding to the LAN group identified by the LAN ID.

In the embodiments of this application, the communications device may request the group management network element to create a LAN group or update a LAN group, to implement creation or update of the LAN group. Further, the communications device may be the AF network element, an OAM entity, or a terminal configured to perform group creation/update.

The AF network element may be deployed by a vertical industry user. For example, the AF network element may be an application server deployed outside a 3GPP network in an enterprise network or an application server deployed outside a 3GPP network in industrial control. The AF network element may alternatively be deployed by a mobile network operator. The AF network element is mainly configured to provide request or policy information of an application server for a 3GPP system. A third-party application exchanges and transfers information with the 3GPP system through the AF network element.

The OAM entity is a configuration interface in a network management system of an operator, and is operator-oriented. The operator can directly configure a parameter on a network element in a mobile network through the OAM entity.

Based on the network architectures shown in FIG. 1 and FIG. 2, the embodiments of this application provide a local area network communication management method, to manage LAN communication of a terminal in a LAN group. The following describes, in two embodiments (that is, Embodiment 1 and Embodiment 2), the local area network communication management method provided in this application.

A main difference between Embodiment 1 and Embodiment 2 lies in that network elements for determining LAN information of the terminal are different. In Embodiment 1, an AMF network element determines the LAN information of the terminal and sends the LAN information of the terminal to the terminal. In Embodiment 2, an LSMF network element determines the LAN information of the terminal and sends the LAN information of the terminal to an AMF network element, and then the AMF network element sends the LAN information of the terminal to the terminal.

It should be noted that in the embodiments of this application, the LSMF network element may be considered as the foregoing group management network element, and configured to manage a LAN group. As described above, in actual application, the LSMF network element may be used as an independent physical functional entity, or may be used as a logical functional entity deployed in another network element (for example, the NEF network element, the PCF network element, or the UDM network element). In this case, if the LSMF network element is used as the logical functional entity deployed in the other network element (for example, the NEF network element, the PCF network element, or the UDM network element), an operation performed by the LSMF network element may be considered as an operation performed by the other network element (for example, the NEF network element, the PCF network element, or the UDM network element). In the embodiments of this application, that the LSMF performs an operation related to LAN group management is used as an example for description. In an actual implementation, an operation performed by the LSMF network element may also be performed by the other network element (for example, the NEF network element, the PCF network element, or the UDM network element). That is, in descriptions of the embodiments of this application, the LSMF network element may be replaced with the other network element, for example, the NEF network element, the PCF network element, or the UDM network element.

It should be noted that, if the LSMF network element is located in the UDM network element, interaction between the UDM network element and the LSMF network element may be considered as an internal operation in the embodiments.

Embodiment 1

Figure 4:
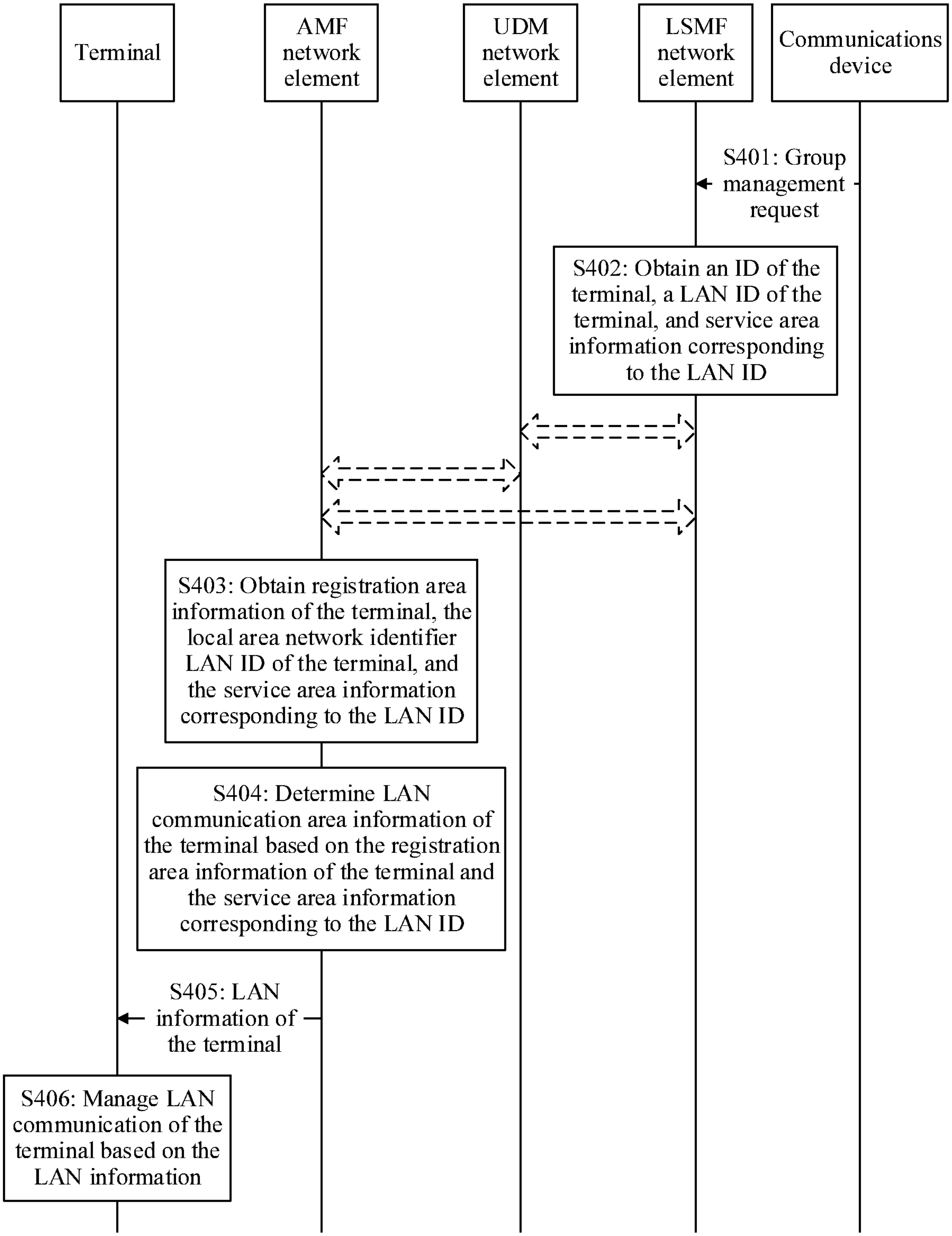
FIG. 4 is a schematic flowchart of a first local area network communication management method according to an embodiment of this application.

As shown in FIG. 4, a local area network communication management method provided in this embodiment of this application includes the following steps.

S401: An LSMF network element receives a group management request sent by a communications device.

The group management request may be a group creation request or a group update request.

The communications device may be any one of the following: an AF network element, an OAM entity, and a designated terminal. The designated terminal may be a terminal having permission to create a group or modify a group, and the designated terminal may be a group member, or a terminal that is not a group member. This is not limited in this embodiment of this application.

S402: The LSMF network element obtains, according to the group management request, an ID of a terminal, a LAN ID of the terminal, and service area information corresponding to the LAN ID.

It should be noted that the ID of the terminal that is obtained by the LSMF network element in S402 is an ID of a group member in a LAN group identified by the LAN ID, and the terminal is not necessarily the designated terminal configured to send the group management request to the LSMF network element. After receiving the group management request, the LSMF network element may obtain a terminal list (a UE list). The list includes IDs of all terminals in the LAN group identified by the LAN ID. An AMF network element may subsequently determine LAN information of a terminal in the terminal list in different scenarios. The terminal indicated by the ID of the terminal that is obtained in S401 is a terminal for which LAN information subsequently needs to be determined.

The LSMF network element may obtain, in two manners, the ID of the terminal, the LAN ID of the terminal, and the service area information corresponding to the LAN ID.

Manner 1: Obtain, using a group creation process, the ID of the terminal, the LAN ID of the terminal, and the service area information corresponding to the LAN ID.

That the LSMF network element obtains an ID of a terminal, a LAN ID of the terminal, and service area information corresponding to the LAN ID may be implemented in the following manner. The LSMF network element receives a group creation request sent by the communications device, where the group creation request is used to request to create a group in which LAN communication is to be performed, and the group creation request carries service area information corresponding to the group and an ID of a terminal, the LSMF network element allocates the LAN ID to the group, and the LSMF network element determines that a service area corresponding to the LAN ID is a service area that corresponds to the group and that is carried in the group creation request.

It should be noted that in Manner 1, the group creation request sent by the communications device carries IDs of all terminals in the group, and the IDs of all the terminals include the ID of the terminal that is obtained in S401. That is, the LSMF network element may obtain the ID of the terminal according to the group creation request.

Manner 2: Obtain, using a group update process, the ID of the terminal, the LAN ID of the terminal, and the service area information corresponding to the LAN ID.

That the LSMF network element obtains an ID of a terminal, a LAN ID of the terminal, and service area information corresponding to the LAN ID may be implemented in the following manner. The LSMF network element receives a first group update request sent by the communications device, where the first group update request is used to request to update the group corresponding to the LAN ID, and the first group update request carries the LAN ID and the service area information corresponding to the LAN ID, and the LSMF network element determines the ID of the terminal based on the LAN ID. Alternatively, the LSMF network element receives a second group update request sent by the communications device, where the second group update request is used to request to update the group corresponding to the LAN ID, and the second group update request carries the ID of the terminal and the LAN ID of the terminal, and the LSMF network element determines, based on the LAN ID, the service area information corresponding to the LAN ID.

As described above, the group update process may be classified into two types. A first type is used to update service area information corresponding to a LAN group. A second type is used to update a member in a LAN group (that is, a terminal included in the LAN group). In Manner 2, the first group update request may be considered as a group update request used to update service area information corresponding to the LAN group, and the second group update request may be considered as a group update request used to update a member in the LAN group.

After updating, according to the first group update request, the service area information corresponding to the LAN ID, the LSMF network element may obtain updated service area information corresponding to the LAN ID. The LSMF network element has obtained the LAN ID and the ID of the terminal during creation of the LAN group. In this case, after receiving the first group update request, the LSMF network element updates service area information corresponding to the group identified by the LAN ID carried in the first group update request. This is equivalent to that the LSMF network element obtains the ID of the terminal, the LAN ID of the terminal, and the service area information corresponding to the LAN ID.

After updating the member in the LAN group according to the second group update request, the LSMF network element may add the terminal to the LAN group and obtain the ID of the terminal. The LSMF network element has obtained, during creation of the LAN group, the LAN ID and the service area information corresponding to the LAN ID. In this case, after receiving the second group update request, the LSMF network element can obtain the service area information corresponding to the LAN ID of the terminal, by searching for the service area information corresponding to the LAN ID carried in the second group update request. In addition, the group update request received by the LSMF network element may alternatively be a group update request (referred to as a third group update request below) used to indicate to delete a member in a group corresponding to a LAN ID. After receiving a third group update request used to indicate to delete a terminal, the LSMF network element may notify the AMF network element. After learning that the terminal has been deleted from the LAN group identified by the LAN ID, the AMF network element may delete (or set to null) LAN information that is of the terminal and that is related to the LAN ID, and notify the terminal to delete (or set to null) the LAN information related to the LAN ID. The terminal can no longer perform local area network communication with a terminal in the LAN group identified by the LAN ID.

In addition, if restriction information corresponding to the LAN ID and restriction information of the terminal are further configured in the creation/update process for the LAN group identified by the LAN ID, the LSMF network element may further obtain the restriction information in S402.

S403: The AMF network element obtains registration area information of the terminal, the LAN ID of the terminal, and the service area information corresponding to the LAN ID.

The AMF network element obtains, in a plurality of manners, the registration area information of the terminal, the LAN ID of the terminal, and the service area information corresponding to the LAN ID. The AMF network element may obtain the information by interacting with the LSMF network element, a UDM network element, the terminal, and the like. Specific manners are respectively described in the following Embodiment A, Embodiment B, Embodiment C, and Embodiment D. Details are not described herein.

In addition, if the restriction information corresponding to the LAN ID and the restriction information of the terminal are further configured in the creation/update process for the LAN group identified by the LAN ID, the AMF network element may further obtain the restriction information in S403.

S404: The AMF network element determines LAN communication area information of the terminal based on the registration area information of the terminal and the service area information corresponding to the LAN ID.

Further, for a method for determining the LAN communication area information of the terminal, refer to the foregoing description. Details are not described herein again.

S405: The AMF network element sends LAN information of the terminal to the terminal.

The LAN information of the terminal includes the LAN ID and the LAN communication area information of the terminal.

In addition, if the AMF network element further obtains the restriction information of the terminal or the restriction information corresponding to the LAN ID in S403, the LAN information of the terminal may further include the restriction information. When managing LAN communication of the terminal based on the LAN information, the terminal or a network element (for example, the AMF network element, an SMF network element, the UDM network element, or the LSMF network element) further needs to consider the restriction information. For a specific manner, refer to the foregoing related description of the LAN information of the terminal. Details are not described herein again.

In this embodiment of this application, the AMF network element may send the LAN information of the terminal to the terminal using any one of a configuration update message, a registration response message, or a PDU session management response message. The PDU session management response message may be a PDU session establishment response, a PDU session modification response, or a PDU session release response.

S406: The terminal manages LAN communication of the terminal based on the LAN information.

Further, in S406, that the terminal manages local area network communication of the terminal based on the LAN information of the terminal may be implemented in the following manner. When the terminal is not located in a LAN communication area, the terminal is forbidden to initiate a second LAN communication request.

The second LAN communication request may be signaling or data. Further, the second LAN communication request may be a PDU session establishment request or a PDU session modification request, or may be a message used to transmit data.

Before the terminal initiates the second LAN communication request, the terminal may check a position of the terminal, and search for the LAN communication area information of the terminal based on the LAN ID corresponding to the second LAN communication request. When the terminal is not located in the communication area indicated by the LAN communication area information, the terminal is forbidden to initiate the second LAN communication request. Certainly, if the terminal is located in the communication area indicated by the LAN communication area information, the terminal can initiate the second LAN communication request.

In an actual implementation, after obtaining the LAN information, the terminal may use the LAN ID in the LAN information as a local area data network (LADN) DNN, and manage local area network communication of the terminal using a mechanism similar to an LADN mechanism, to restrict the terminal to using a 5G LAN service.

In addition, another network element in a network, for example, the SMF network element, the AMF network element, the UDM network element, or the LSMF network element, may also manage local area network communication of the terminal based on the LAN information of the terminal. The AMF network element is used as an example. That the AMF network element manages local area network communication of the terminal based on the LAN information of the terminal may be further implemented in the following manner. The AMF network element receives a first LAN communication request sent by the terminal, where the first LAN communication request carries the LAN ID, the AMF determines the LAN information of the terminal based on the LAN ID and the ID of the terminal, and in a case in which the terminal is not located in the LAN communication area, the AMF network element reports, to the SMF network element, the case in which the terminal is not located in the LAN communication area such that the SMF network element processes the first LAN communication request.

The first LAN communication request may be signaling or data. Further, the first LAN communication request may be a PDU session establishment request or a PDU session modification request, or may be a message used to transmit data.

After the AMF network element receives the first LAN communication request, the AMF network element may search a local context based on the session, to obtain the ID of the terminal. Then, the AMF network element correspondingly searches for the LAN information of the terminal based on the LAN ID carried in the first LAN communication request, to obtain the communication area information of the terminal. After checking the position of the terminal, the AMF determines whether the terminal is located in the communication area indicated by the LAN communication area information. If the terminal is not located in the communication area indicated by the LAN communication area information, the AMF network element reports, to the SMF network element, the case in which the terminal is not located in the communication area such that the SMF network element processes the first LAN communication request. Certainly, if the terminal is located in the communication area indicated by the LAN communication area information, the AMF network element may also report, to the SMF network element, the case in which the terminal is located in the communication area such that the SMF network element responds to the first LAN communication request.

Further, when the terminal is not located in the communication area indicated by the LAN communication area information, the SMF network element may process the first LAN communication request in the following manner. The SMF network element may reject the first LAN communication request initiated by the terminal, for example, reject to establish/modify a session for the terminal. If the SMF network element has established a session for the terminal when receiving a notification from the AMF network element, the SMF network element may deactivate or release the related session.

In an actual implementation, the AMF network element may also use the LAN ID as an LADN DNN, and manage local area network communication of the terminal using a mechanism similar to an LADN mechanism, to restrict the terminal to using a 5G LAN service.

It should be noted that the AMF network element is merely an expression used in the embodiments of this application. In different network standards or network environments, the AMF network element may be replaced with different network element names, provided that the network element can be used to implement a function of the AMF network element in the embodiments of this application. Likewise, the UDM network element or the LSMF network element may also be replaced with another network element that can be used to implement a same function. Details are not described herein.

It can be learned from the foregoing description of the LAN information of the terminal that the LAN information of the terminal needs to be determined based on at least the LAN ID of the terminal, the service area information corresponding to the LAN ID of the terminal, and the registration area information of the terminal. The registration area information of the terminal may be generated by the AMF network element and stored in a local context, and the service area information corresponding to the LAN ID of the terminal needs to be obtained by the AMF network element from another network element (for example, the LSMF network element or the UDM network element).

According to different approaches and manners used by the AMF to obtain the service area information corresponding to the LAN ID, Embodiment 1 may be further divided into four embodiments: Embodiment A, Embodiment B, Embodiment C, and Embodiment D.

In Embodiment A, the LSMF network element directly sends the service area information corresponding to the LAN ID to the AMF network element as a configuration parameter, and sends LAN subscription information of the terminal (for example, a LAN ID and an ID of a terminal in a LAN group identified by the LAN ID) to the UDM network element as a configuration parameter. In Embodiment B, the LSMF network element first sends LAN subscription information of the terminal to the UDM network element as a configuration parameter, then the LSMF network element sends the service area information corresponding to the LAN ID to the AMF network element according to a request of the AMF network element, and the UDM network element may directly send the LAN subscription information of the terminal to the AMF network element, or send the LAN subscription information of the terminal to the AMF network element according to a request of the AMF network element. In Embodiment C, the LSMF network element sends LAN subscription information of the terminal and the service area information corresponding to the LAN ID to the UDM network element as configuration parameters, and the UDM network element may directly send the information to the AMF network element, or send the information to the AMF network element according to a request of the AMF network element such that the AMF network element uses the information when determining the LAN information of the terminal. In Embodiment D, the LSMF network element does not send a configuration parameter to the UDM network element, but locally stores information such as LAN subscription information of the terminal and the service area information corresponding to the LAN ID, and then the LSMF network element may directly send the information to the AMF network element, or send the information to the AMF network element according to a request of the AMF network element such that the AMF network element uses the information when determining the LAN information of the terminal.

It can be easily learned that the LSMF network element sends a configuration parameter (referred to as a second configuration parameter below) to the UDM network element in Embodiment A, Embodiment B, and Embodiment C, and the LSMF network element further sends a configuration parameter (referred to as a first configuration parameter below) to the AMF network element in Embodiment A.

Parameter types included in the second configuration parameter may be different. For example, the second configuration parameter may include only the LAN ID and the ID of the terminal. For example, in addition to the LAN ID and the ID of the terminal, the second configuration parameter may include the restriction information of the terminal. For example, in addition to the LAN ID and the ID of the terminal, the second configuration parameter may include the service area information corresponding to the LAN ID. For another example, in addition to the LAN ID and the ID of the terminal, the second configuration parameter may include the restriction information corresponding to the LAN ID. Specific parameters included in the second configuration parameter in different embodiments are to be described in detail in the following Embodiment A, Embodiment B, and Embodiment C. Details are not described herein.

The following separately describes in detail the four embodiments: Embodiment A, Embodiment B, Embodiment C, and Embodiment D.

It should be noted that, in Embodiment A, Embodiment B, Embodiment C, and Embodiment D, a same manner is used to perform step S401 in which the LSMF network element receives the group management request from the communications device. Therefore, in the accompanying drawings and descriptions corresponding to Embodiment A, Embodiment B, Embodiment C, and Embodiment D, the step in which the LSMF network element receives the group management request is omitted.

Embodiment A

In Embodiment A, the LSMF network element directly sends the service area information corresponding to the LAN ID to the AMF network element as a configuration parameter, and sends LAN subscription information of the terminal (for example, a LAN ID and an ID of a terminal in a LAN group identified by the LAN ID) to the UDM network element as a configuration parameter such that the AMF network element uses the service area information corresponding to the LAN ID when determining the LAN information of the terminal.

To be specific, in Embodiment A, after obtaining the ID of the terminal, the LAN ID of the terminal, and the service area information corresponding to the LAN ID, the LSMF network element may select an AMF network element and a UDM network element based on the service area information corresponding to the LAN ID, then, the LSMF network element sends the first configuration parameter to the selected AMF network element, and sends the second configuration parameter to the selected UDM network element, where the first configuration parameter includes the LAN ID and the service area information corresponding to the LAN ID, and the second configuration parameter includes the LAN ID and the ID of the terminal.

Optionally, the first configuration parameter may further include the restriction information corresponding to the LAN ID, and the second configuration parameter may further include the restriction information of the terminal.

Figure 5A:
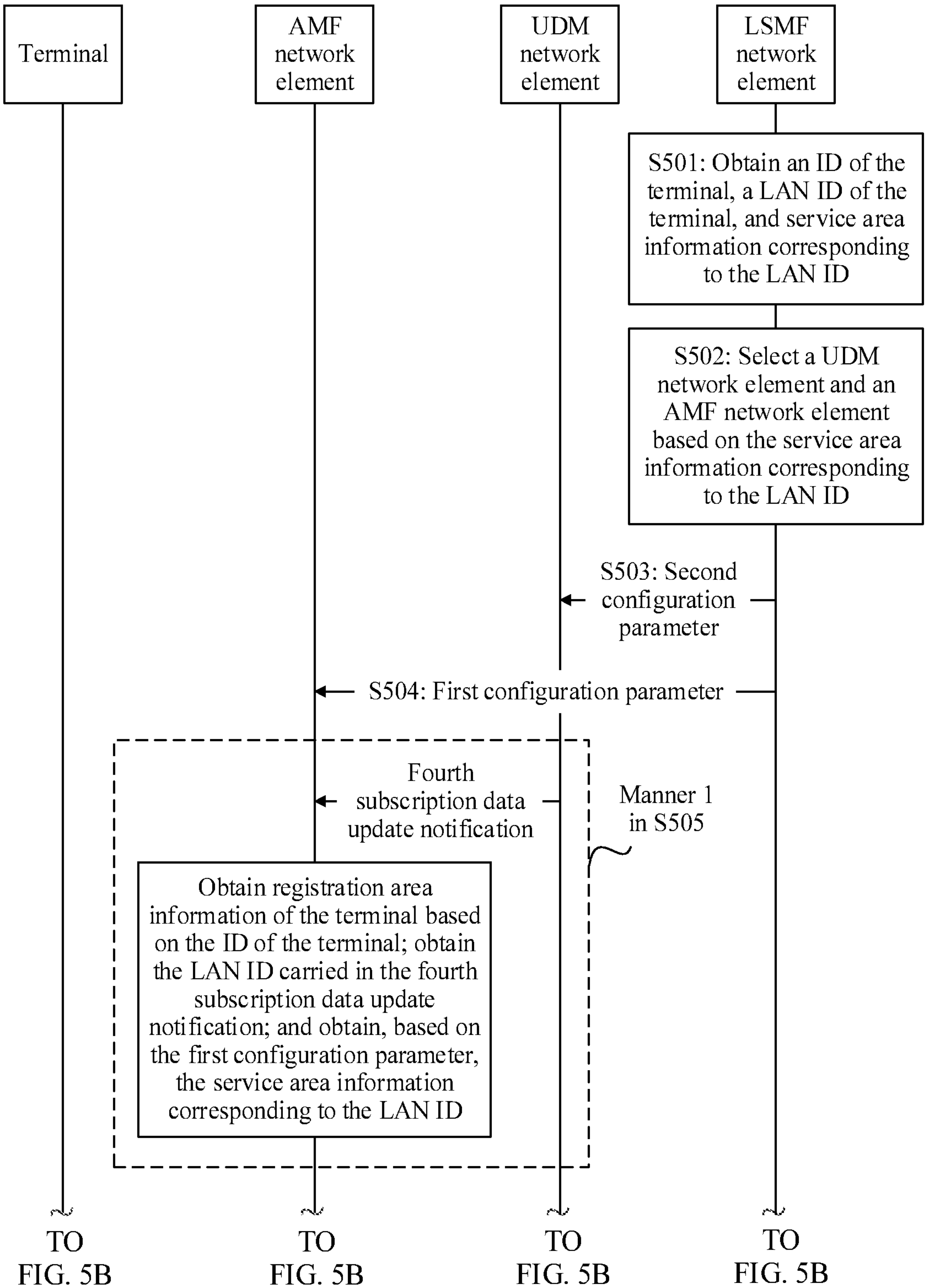
FIG. 5A, FIG. 5B, and FIG. 5C are a schematic flowchart of a second local area network communication management method according to an embodiment of this application.
Figure 5B:
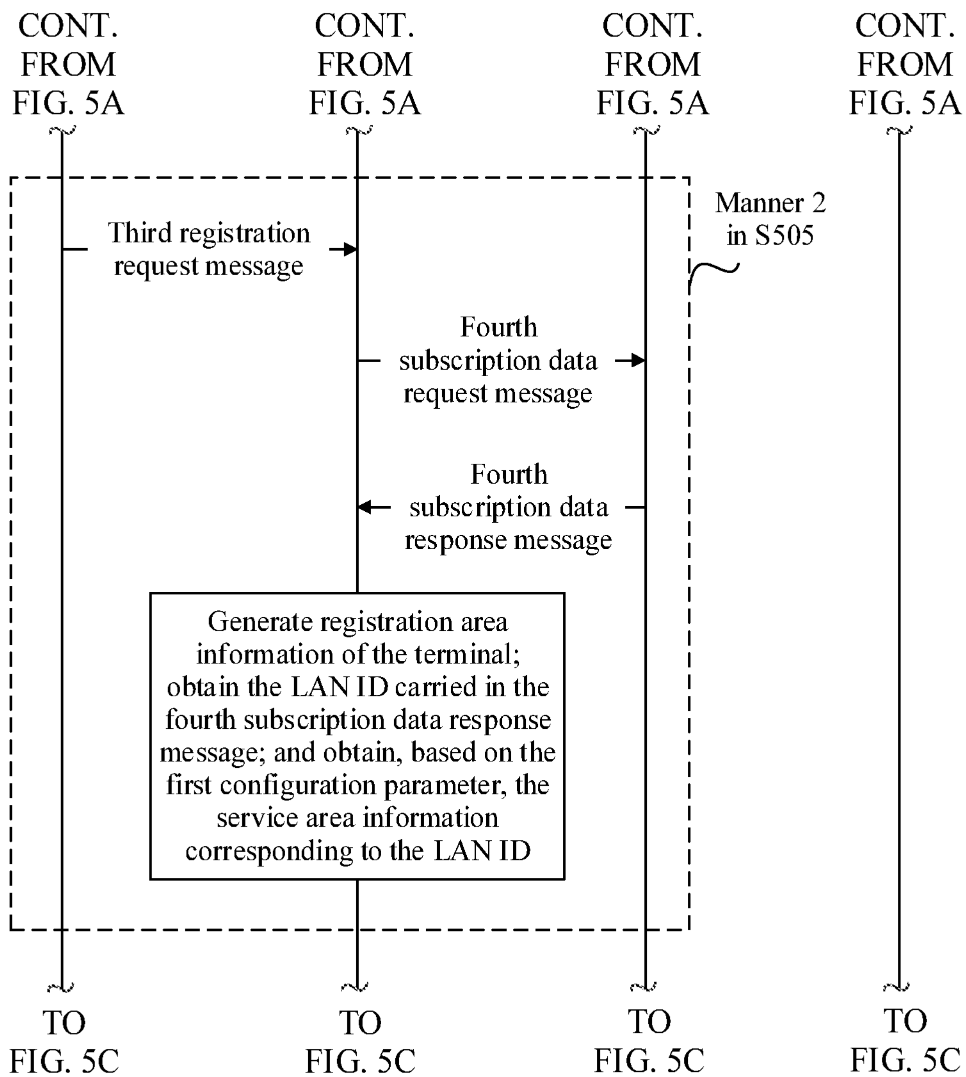
Figure 5C:
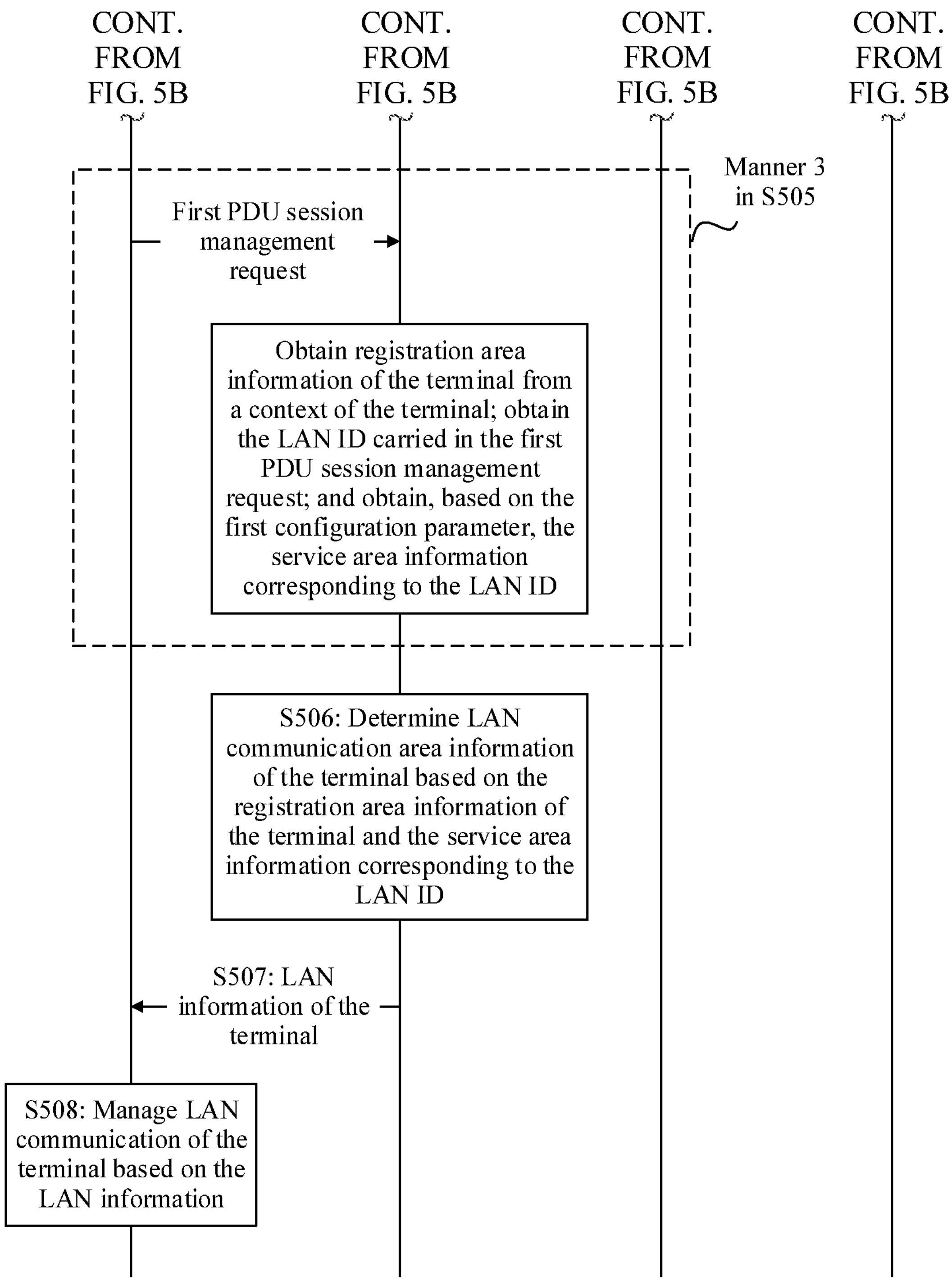
Figure 6A:
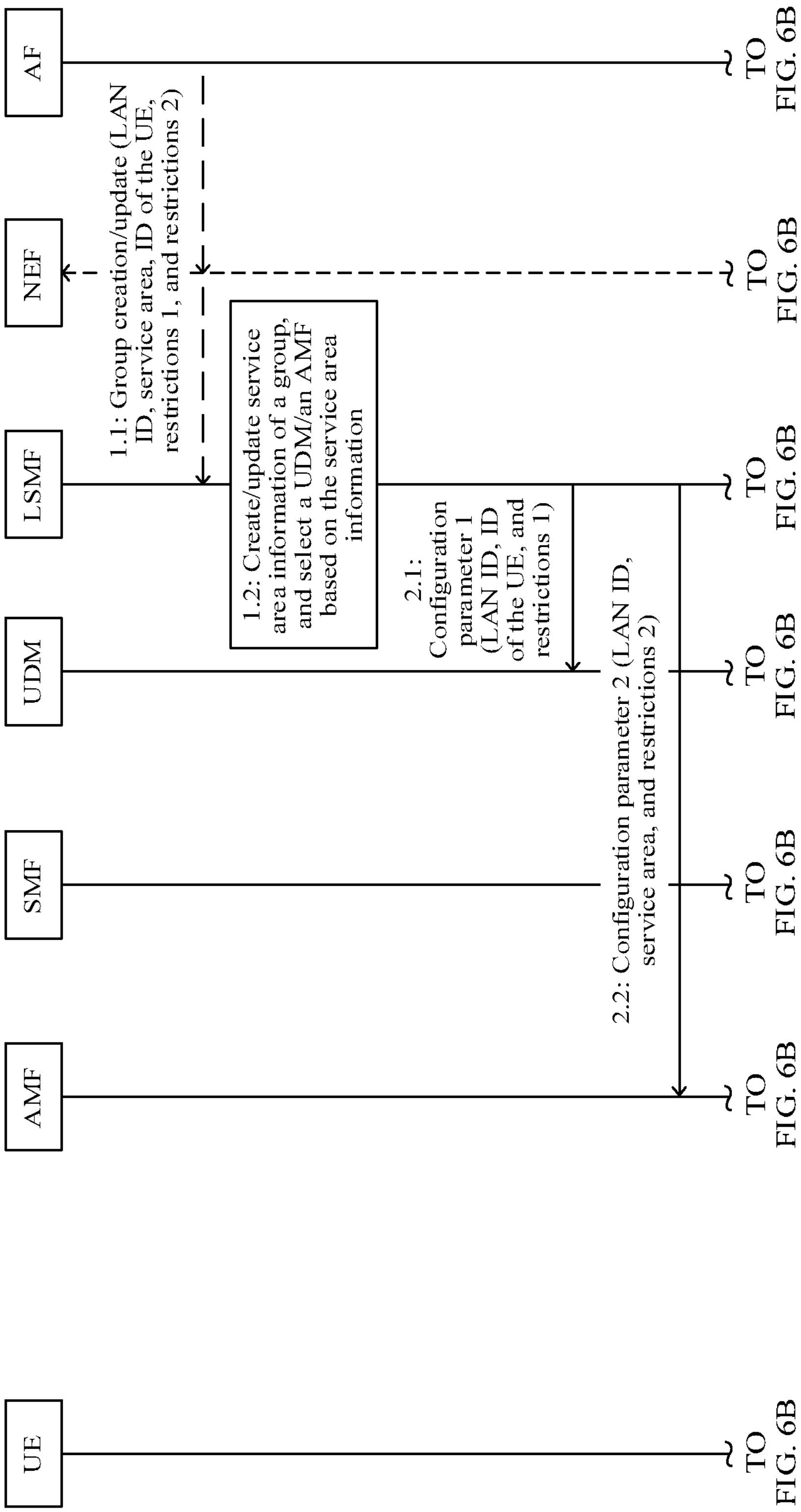
FIG. 6A, FIG. 6B, FIG. 6C, and FIG. 6D are a schematic flowchart of a third local area network communication management method according to an embodiment of this application.
Figure 6B:
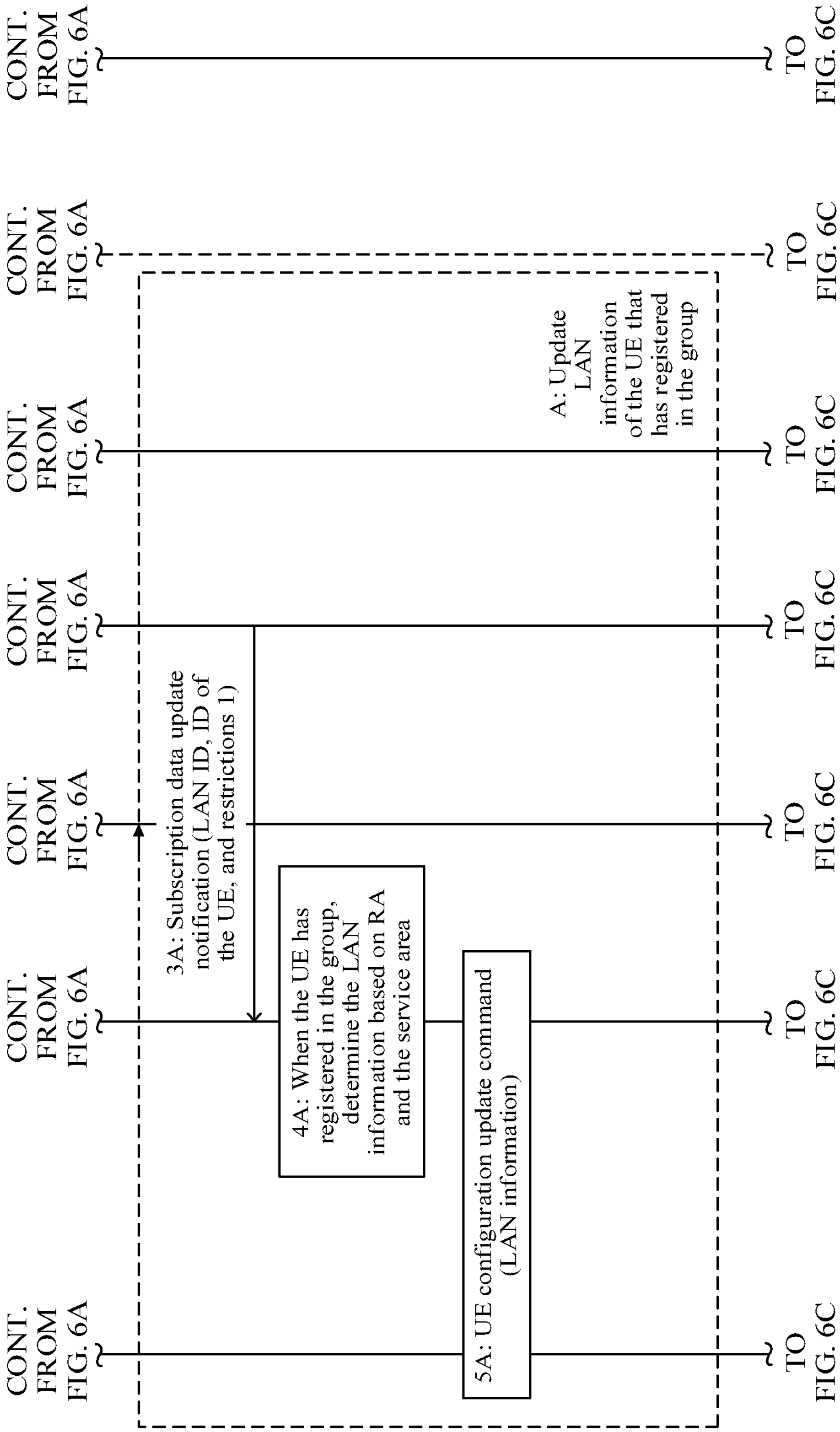
Figure 6C:
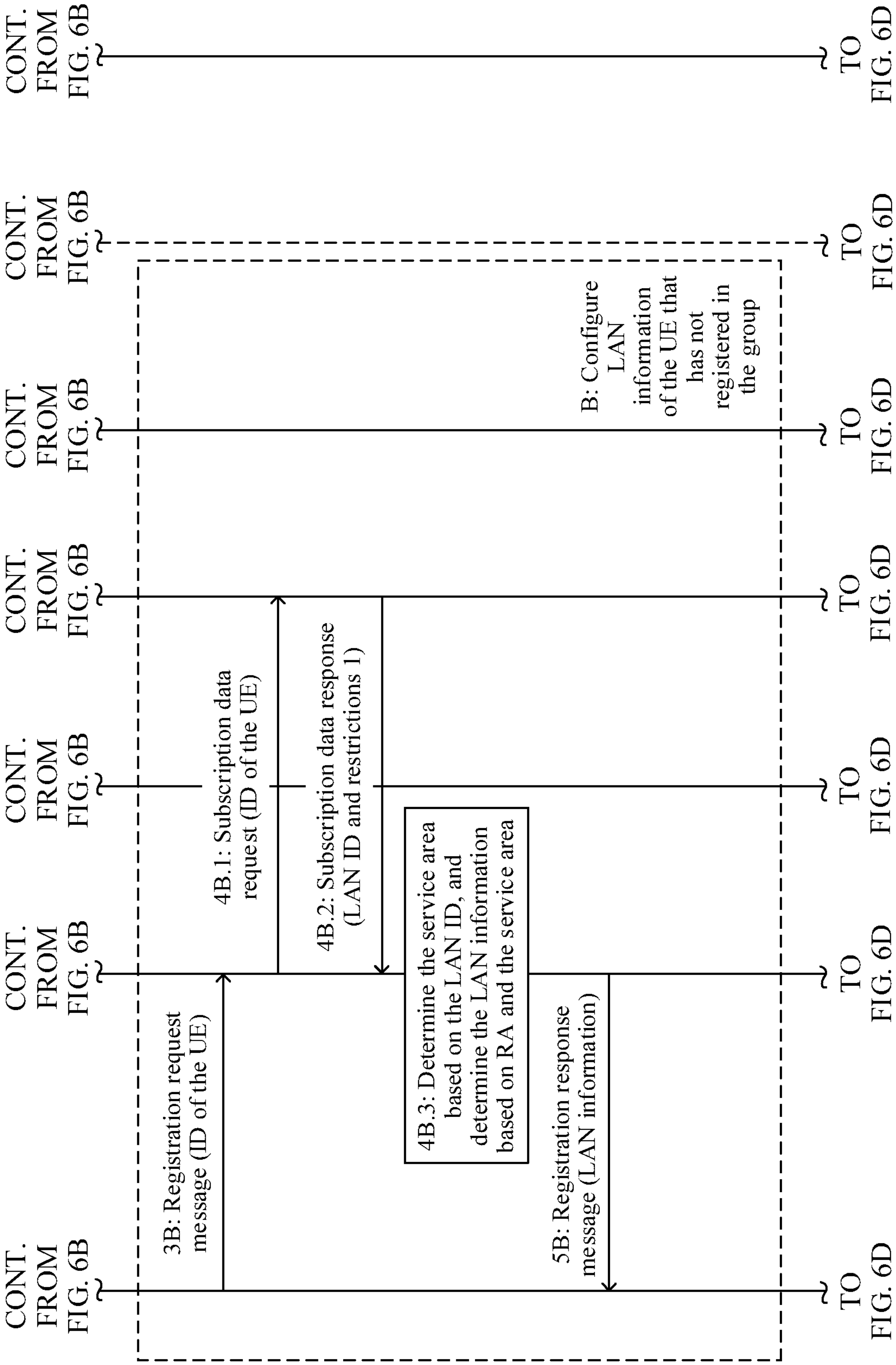
Figure 6D:
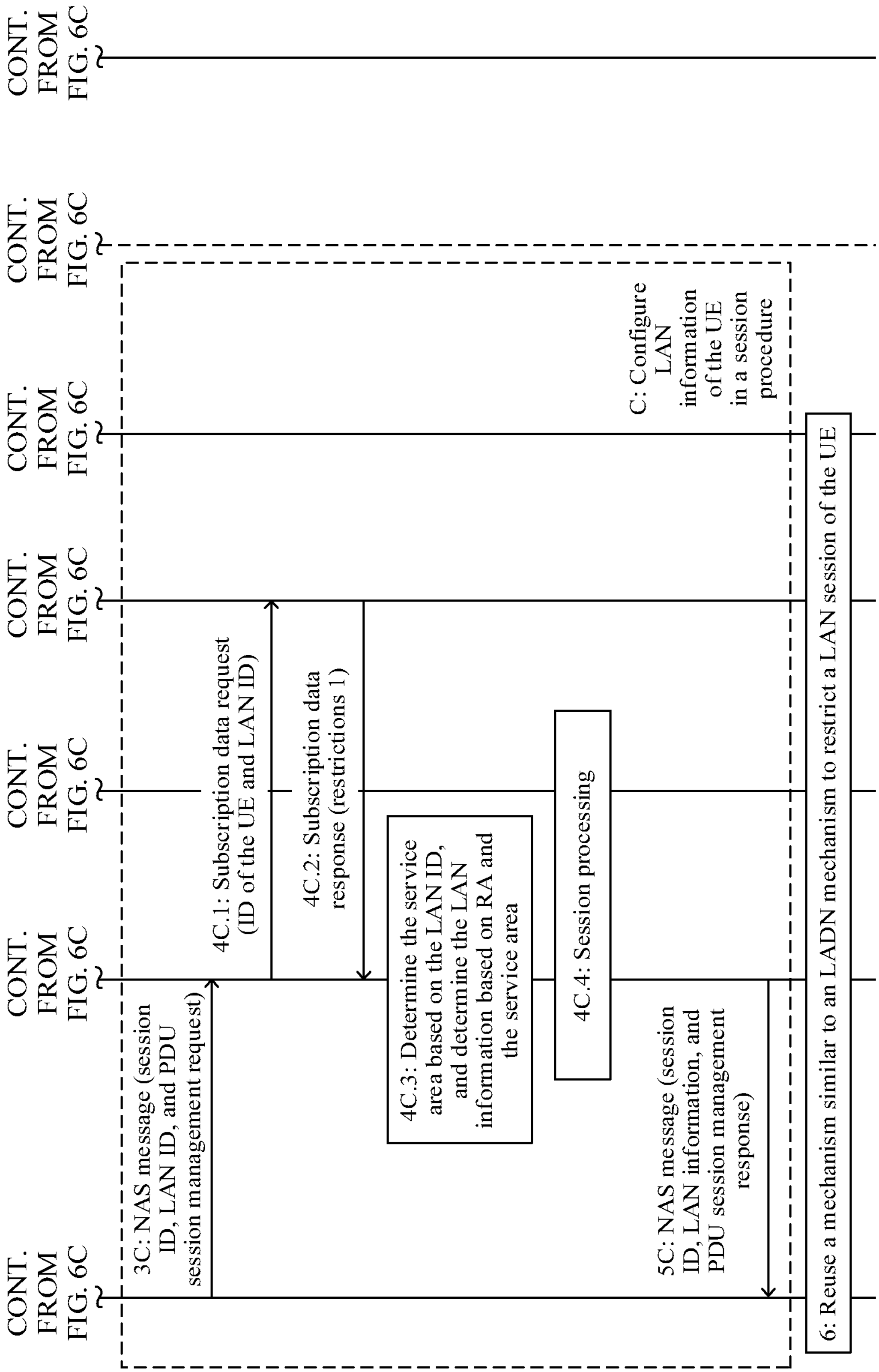

With reference to the foregoing descriptions of the local area network communication management method shown in FIG. 4, if the solution in Embodiment A is used, the local area network communication management method shown in FIG. 4 may be shown in FIG. 5A to FIG. 5C. In FIG. 5A to FIG. 5C, the method includes the following steps.

S501: An LSMF network element obtains an ID of a terminal, a LAN ID of the terminal, and service area information corresponding to the LAN ID.

In addition, if restriction information corresponding to the LAN ID and restriction information of the terminal are further configured in a creation/update process for a LAN group identified by the LAN ID, the LSMF network element may further obtain the restriction information in S501.

A specific implementation in which the LSMF network element obtains the ID of the terminal, the LAN ID of the terminal, and the service area information corresponding to the LAN ID (using a group management request) in S501 is the same as a specific implementation in which the LSMF network element obtains the ID of the terminal, the LAN ID of the terminal, and the service area information corresponding to the LAN ID in S401. Details are not repeatedly described herein.

S502: The LSMF network element selects a UDM network element and an AMF network element based on the service area information corresponding to the LAN ID.

The UDM network element selected by the LSMF network element may be all UDM network elements in a service area corresponding to the LAN ID. The AMF network element selected by the LSMF network element may be all AMF network elements in the service area corresponding to the LAN ID.

That is, when it is difficult to learn which UDM network element performs unified data management on the terminal in the group identified by the LAN ID, the LSMF network element may send a second configuration parameter to all the UDM network elements in the service area corresponding to the LAN ID. When it is difficult to learn which AMF network element performs access and mobility management on a terminal in the LAN group identified by the LAN ID, the LSMF network element may send a first configuration parameter to all the AMF network elements in the service area corresponding to the LAN ID.

S503: The LSMF network element sends the second configuration parameter to the selected UDM network element. The second configuration parameter includes the LAN ID and the ID of the terminal.

Optionally, the second configuration parameter may further include the restriction information of the terminal.

S504: The LSMF network element sends the first configuration parameter to the selected AMF network element.

The first configuration parameter includes the LAN ID and the service area information corresponding to the LAN ID.

Optionally, the first configuration parameter may further include the restriction information corresponding to the LAN ID.

A sequence of performing S503 and S504 is not limited in this embodiment of this application. S503 may be performed before S504, or S504 may be performed before S503, or S503 and S504 may be simultaneously performed.

S505: The AMF network element obtains registration area information of the terminal, the LAN ID of the terminal, and the service area information corresponding to the LAN ID.

In addition, if the restriction information corresponding to the LAN ID and the restriction information of the terminal are further configured in the creation/update process for the LAN group identified by the LAN ID, the AMF network element may further obtain the restriction information in S505 such that the AMF network element uses the restriction information when determining LAN information of the terminal.

S506: The AMF network element determines LAN communication area information of the terminal based on the registration area information of the terminal and the service area information corresponding to the LAN ID.

S507: The AMF network element sends the LAN information of the terminal to the terminal.

The LAN information of the terminal includes the LAN ID and the LAN communication area information of the terminal.

In addition, if the AMF network element further obtains the restriction information of the terminal or the restriction information corresponding to the LAN ID in S505, the LAN information of the terminal may further include the restriction information. When managing LAN communication of the terminal based on the LAN information, the terminal or a network element (for example, the AMF network element, an SMF network element, the UDM network element, or the LSMF network element) further needs to consider the restriction information. For a specific manner, refer to the foregoing related description of the LAN information of the terminal. Details are not described herein again.

S508: The terminal manages LAN communication of the terminal based on the LAN information.

A specific manner in which the terminal manages LAN communication of the terminal based on the LAN information in S508 is the same as the specific manner in which the terminal manages LAN communication of the terminal based on the LAN information in S406. Details are not repeatedly described herein.

In addition, another network element in a network may also manage local area network communication of the terminal based on the LAN information of the terminal. A specific implementation is also described in the method shown in FIG. 4. Details are not described herein again.

It should be noted that in step S505 in Embodiment A, the AMF network element may obtain the registration area information of the terminal, the LAN ID of the terminal, and the service area information corresponding to the LAN ID using different interaction procedures between the AMF network element and the terminal, and send the LAN information of the terminal to the terminal using different interaction procedures.

For example, when the terminal has registered with the network, and the AMF network element receives a subscription data update notification of the terminal, where the subscription data update notification includes the LAN ID (that is, subscription data of the terminal for local area network communication in the LAN group changes), the AMF network element triggers a step of determining the LAN information of the terminal, and sends the LAN information of the terminal to the terminal using a configuration update message. In this way, the terminal can update LAN information in a timely manner, and perform local area network communication based on latest LAN information.

For example, when the terminal has not registered with the network, and the terminal initiates a registration request, the AMF network element may request subscription data of the terminal from the UDM network element, and determine the LAN information of the terminal based on information returned by the UDM. Then, the AMF network element sends the LAN information of the terminal to the terminal using a registration response message. In this way, after a registration procedure is completed, the terminal can perform local area network communication based on the LAN information.

For example, when the terminal initiates a PDU session management request, the AMF may further determine the LAN information of the terminal, and send the LAN information of the terminal to the terminal using a PDU session management response. In this way, the terminal can update LAN information in a timely manner, and perform local area network communication based on latest LAN information.

The following describes, with reference to the accompanying drawing, three specific implementations of step S505 that the AMF network element obtains registration area information of the terminal, the LAN ID of the terminal, and the service area information corresponding to the LAN ID.

Manner 1:

When the terminal has registered with the network, if the LSMF network element receives a group creation request or a group update request, the LSMF network element may notify the UDM network element of subscription information of the terminal, and the UDM network element sends a subscription data update notification to the AMF network element. When the AMF network element receives the subscription data update notification of the terminal, and the subscription data update notification includes the LAN ID of the terminal (that is, subscription data of the terminal for local area network communication in the LAN group changes), the AMF network element may trigger an operation of determining the LAN information of the terminal, and send the LAN information of the terminal to the terminal using a configuration update message. In this way, the terminal can update LAN information in a timely manner, and manage local area network communication of the terminal based on latest LAN information.

Further, when Manner 1 is used, that the AMF network element obtains registration area information of the terminal, the LAN ID of the terminal, and the service area information corresponding to the LAN ID in S505 may be implemented in the following manner. The AMF network element receives a fourth subscription data update notification sent by the UDM network element, where the fourth subscription data update notification includes the LAN ID and the ID of the terminal, the AMF obtains the registration area information of the terminal based on the ID of the terminal, and the AMF network element obtains the LAN ID carried in the fourth subscription data update notification, and obtains, based on the first configuration parameter, the service area information corresponding to the LAN ID.

Then, that the AMF network element sends the LAN information of the terminal to the terminal may be implemented in the following manner. The AMF network element sends a third configuration update message to the terminal, where the third configuration update message includes the LAN information of the terminal.

In Manner 1, when the terminal has registered with the network, the AMF network element stores a context of the terminal. After receiving the fourth subscription data update notification, the AMF network element may search the context to obtain registration area information corresponding to the ID of the terminal that is carried in the fourth subscription data update notification, that is, the registration area information of the terminal. In addition, the AMF network element may further obtain the LAN ID carried in the fourth subscription data update notification, and obtain, based on the first configuration parameter, the service area information corresponding to the LAN ID. In this way, the AMF network element has obtained the LAN ID, the service area information corresponding to the LAN ID, and the registration area information of the terminal that are required for generating the LAN information.

That is, in Manner 1, after the UDM network element receives the second configuration parameter sent by the LSMF network element, if the UDM network element determines that the terminal has registered with the network, the UDM may directly send the second configuration parameter to the AMF network element using the fourth subscription data update notification such that the AMF network element determines the LAN information of the registered terminal based on the second configuration parameter and another parameter (for example, the first configuration parameter), and sends the LAN information to the terminal, and the registered terminal can perform local area network communication based on the LAN information of the terminal.

In addition, if the second configuration parameter received by the UDM further includes the restriction information of the terminal, the fourth subscription data update notification may further carry the restriction information of the terminal such that the AMF network element uses the restriction information when determining the LAN information of the terminal.

Manner 2:

When the terminal has not registered with the network, the AMF network element cannot send the LAN information of the terminal to the terminal using a configuration update procedure. When the terminal initiates a registration request, the AMF network element may trigger an operation of determining the LAN information of the terminal, that is, request subscription data of the terminal from the UDM network element, and determine the LAN information of the terminal based on the subscription data returned by the UDM network element. Then, the AMF network element sends the LAN information of the terminal to the terminal using a registration response message. In this way, after a registration procedure is completed, the terminal can manage local area network communication based on the LAN information.

Further, when Manner 2 is used, that the AMF network element obtains registration area information of the terminal, the LAN ID of the terminal, and the service area information corresponding to the LAN ID in S505 may be implemented in the following manner. The AMF network element receives a third registration request message sent by the terminal, where the third registration request message carries the ID of the terminal, the AMF network element sends a fourth subscription data request message to the UDM network element, where the fourth subscription data request message carries the ID of the terminal, the AMF network element receives a fourth subscription data response message sent by the UDM network element, where the fourth subscription data response message carries the LAN ID, the AMF generates the registration area information of the terminal, and the AMF network element obtains the LAN ID carried in the fourth subscription data response message, and obtains, based on the first configuration parameter, the service area information corresponding to the LAN ID.

Then, that the AMF network element sends the LAN information of the terminal to the terminal may be implemented in the following manner. The AMF network element sends a third registration response message to the terminal, where the third registration response message carries the LAN information of the terminal.

In Manner 2, the fourth subscription data response message carries the LAN ID. This indicates that the UDM network element adds, to the LAN group identified by the LAN ID, the terminal that requests registration. The LSMF network element has obtained, during creation of the LAN group, the LAN ID of the LAN group and the service area information corresponding to the LAN ID. Therefore, after receiving the fourth subscription data response message, the AMF network element may search the first configuration parameter to obtain the service area information corresponding to the LAN ID carried in the fourth subscription data response message. In addition, in the registration procedure corresponding to the terminal, the AMF network element dynamically generates the registration area information of the terminal that requests registration. Therefore, in Manner 2, after receiving the fourth subscription data response message, the AMF network element can generate the registration area information of the terminal. In this way, the AMF network element has obtained the LAN ID, the service area information corresponding to the LAN ID, and the registration area information of the terminal that are required for generating the LAN information.

Optionally, if the second configuration parameter received by the UDM network element further includes the restriction information of the terminal, the fourth subscription data response message may further carry the restriction information of the terminal such that the AMF network element uses the restriction information when determining the LAN information of the terminal.

Manner 3:

When the terminal has registered with the network, and the terminal initiates a PDU session management request, the AMF may further trigger an operation of determining the LAN information of the terminal, and send the LAN information of the terminal to the terminal using a PDU session management response. In this way, the terminal can update LAN information in a timely manner, and manage local area network communication based on latest LAN information.

Further, when Manner 3 is used, that the AMF network element obtains registration area information of the terminal, the LAN ID of the terminal, and the service area information corresponding to the LAN ID in S505 may be implemented in the following manner. The AMF network element receives a first PDU session management request sent by the terminal, where the first PDU session management request carries the LAN ID, the AMF network element obtains the registration area information of the terminal from a context of the terminal, and the AMF network element obtains the LAN ID carried in the first PDU session management request, and obtains, based on the first configuration parameter, the service area information corresponding to the LAN ID.

Then, that the AMF network element sends the LAN information of the terminal to the terminal may be implemented in the following manner. The AMF network element sends a first PDU session management response to the terminal, where the first PDU session management response carries the LAN information of the terminal.

The first PDU session management request may be a PDU session establishment request, a PDU session modification request, or a PDU session release request. Correspondingly, the first PDU session management response may be a PDU session establishment response, a PDU session modification response, or a PDU session release response.

In Manner 3, the registered terminal has established a separate signaling connection with the AMF network element. In this case, after receiving the first PDU session management request through a dedicated channel between the AMF network element and the terminal, the AMF network element may learn of the ID of the terminal, and may determine the registration area information of the terminal based on context information that is stored during registration of the terminal. In addition, the AMF network element may further obtain the LAN ID carried in the first PDU session management request, and obtain, based on the first configuration parameter, the service area information corresponding to the LAN ID. In this way, the AMF network element has obtained the LAN ID, the service area information corresponding to the LAN ID, and the registration area information of the terminal that are required for generating the LAN information.

That the first PDU session management request sent by the terminal to the AMF network element carries the LAN ID may mean that the terminal expects to perform local area network communication with a terminal in the LAN group. The terminal may send the first PDU session management request to the AMF network element. After receiving the first PDU session management request, the AMF network element triggers a process of determining the LAN information of the terminal. The AMF network element responds to the first PDU session management request. This indicates that the terminal can perform local area network communication with a terminal in the LAN group.

It should be noted that after receiving the first PDU session management request, the AMF network element processes a PDU session by interacting with the SMF network element, and then sends the first PDU session management response to the terminal. A PDU session processing procedure belongs to the other approaches. Therefore, details are not described in this embodiment of this application.

In addition, in Manner 3, whether the terminal can join the LAN group identified by the LAN ID carried in the first PDU session management request may be further determined after authentication performed by the UDM network element. To be specific, after the AMF network element receives the first PDU session management request sent by the terminal, the AMF network element may send a fifth subscription data request message to the UDM network element, where the fifth subscription data request message carries the ID of the terminal and the LAN ID. Then, the AMF network element receives a fifth subscription data response message sent by the UDM network element.

The AMF network element receives the fifth subscription data response message. This indicates that the terminal can perform local area network communication with a terminal in the LAN group. In this case, the AMF network element may be triggered to perform the operation of determining the LAN information of the terminal.

Optionally, in Manner 3, if the second configuration parameter received by the UDM network element further includes the restriction information of the terminal, the fifth subscription data response message may further carry the restriction information of the terminal such that the AMF network element uses the restriction information when determining the LAN information of the terminal.

It should be noted that the foregoing three manners may be independently used for different terminals (that is, only one of the foregoing three manners is used for each terminal to implement determining and receiving of LAN information), or any combination of the foregoing three manners may be used for one terminal. For example, when a terminal initiates a registration request, LAN information of the terminal is determined in Manner 2. After a LAN group to which the terminal belongs is updated, updated LAN information of the terminal may be determined in Manner 1. In addition, when the terminal initiates a PDU session management request, the AMF may further re-determine LAN information of the terminal, and send the determined LAN information to the terminal such that LAN information of the terminal can be updated in a timely manner.

The foregoing describes Embodiment A. Based on a same concept, an embodiment of this application further provides a local area network communication management method. The method may be considered as a specific example of the method shown in FIG. 5A to FIG. 5C. As shown in FIG. 6A to FIG. 6D, the method includes the following steps.

1.1: An LSMF network element receives a group creation/update message from a NEF network element/an AF network element, and obtains a LAN ID, service area information corresponding to the LAN ID, an ID of UE in a local area network group, restriction information (restrictions 1) of the UE, and restriction information (restrictions 2) corresponding to the LAN ID.

1.2: The LSMF network element creates/updates service area information corresponding to the group, and selects a UDM network element and an AMF network element based on the service area information corresponding to the LAN ID.

The UDM network element selected by the LSMF network element may be all UDM network elements in a service area corresponding to the LAN ID. The AMF network element selected by the LSMF network element may be all AMF network elements in the service area corresponding to the LAN ID.

2.1: The LSMF network element sends a configuration parameter 1 (Configure 1) to the selected UDM network element, where the configuration parameter 1 carries the LAN ID, the ID of the UE, and the restrictions 1.

2.2: The LSMF network element sends a configuration parameter 2 (Configure 2) to the selected AMF network element, where the configuration parameter 2 carries the LAN ID, the service area, and the restrictions 2.

A: When the UE has registered in the group, the following method may be used to update LAN information of the UE.

3A: When the UE has registered in the group, the UDM network element sends a subscription data update notification to the AMF network element serving the UE, where the subscription data update notification carries the LAN ID, the ID of the UE, and the restrictions 1.

4A: The AMF network element serving the UE determines registration area information of the UE based on the ID of the UE, and determines the LAN information of the UE based on the registration area information of the UE, the service area, the LAN ID, the restrictions 1, and the restrictions 2.

5A: The AMF network element sends the LAN information to the UE using a UE configuration update command in a UE configuration update procedure.

The UE configuration update command may be considered as a specific example of the foregoing third configuration update message.

B: When the UE has not registered in the group, the following method may be used to update LAN information of the UE.

3B: The UE sends a registration request message to the AMF network element, where the registration request message carries the ID of the UE.

4B: The AMF network element sends a subscription data request (carrying the ID of the UE) to the UDM network element, and the UDM network element returns a subscription data response message. If the UE has subscribed to a LAN service, the subscription data response message obtained by the AMF network element carries the subscribed LAN ID of the UE and the restrictions 1. The AMF network element determines, based on the LAN ID, the service area information corresponding to the LAN ID, and determines the LAN information of the UE based on registration area information dynamically generated for the UE in a registration procedure, the service area corresponding to the LAN ID, the LAN ID, the restrictions 1, and the restrictions 2.

5B: The AMF network element sends the LAN information to the UE using a registration response message.

C: Configure LAN information of the UE in a session procedure.

3C: The UE sends a NAS message to the AMF network element, where the NAS message carries a session ID, the LAN ID, and a PDU session management request, where the PDU session management request may be a session establishment request, a session modification request, or a session release request.

4C: The AMF network element sends a subscription data request (carrying the ID of the UE and the LAN ID) to the UDM network element, and the UDM network element returns a subscription data response message, where the subscription data response message may carry the restrictions 1. If the UE has subscribed to the LAN service, the AMF network element may determine, based on the LAN ID, the service area information corresponding to the LAN ID, and determine the LAN information of the UE based on the LAN ID, registration area information of the UE that is found in a local context, the service area information corresponding to the LAN ID, the restrictions 1, and the restrictions 2.

In addition, the AMF network element may request, using an existing session procedure, an SMF network element to process the session management request.

5C: The AMF network element sends a NAS message to the UE, where the NAS message carries the session ID, the LAN information, and a PDU session management response, to send the LAN information to the UE.

The PDU session management response may be obtained from the SMF network element.

6: After obtaining the LAN information, the UE may use the LAN ID in the LAN information as an LADN DNN, and restrict a LAN session of the UE by reusing a mechanism similar to an LADN mechanism, to restrict the UE to using a 5G LAN service.

Likewise, the AMF network element and the SMF network element may also use the LAN ID as an LADN DNN, and process a LAN session of the UE using a mechanism similar to an LADN mechanism.

The LAN information of the UE may further include the restrictions 1 and the restrictions 2, where the restrictions 1 and the restrictions 2 are used as reference information when the UE or a network element (for example, the AMF network element, the SMF network element, the UDM network element, or the LSMF network element) processes the LAN session.

Embodiment B

In Embodiment B, the LSMF network element first sends LAN subscription information of the terminal to the UDM network element as a configuration parameter, then the LSMF network element sends the service area information corresponding to the LAN ID to the AMF network element according to a request of the AMF network element, and the UDM network element may directly send the LAN subscription information of the terminal to the AMF network element, or send the LAN subscription information of the terminal to the AMF network element according to a request of the AMF network element. Further, when triggering an operation of determining the LAN information of the terminal, the AMF network element may request, from the LSMF network element, to obtain the service area information corresponding to the LAN ID such that the AMF network element uses the service area information corresponding to the LAN ID when determining the LAN information of the terminal.

S701: An LSMF network element obtains an ID of a terminal, a LAN ID of the terminal, and service area information corresponding to the LAN ID.

In addition, if restriction information corresponding to the LAN ID and restriction information of the terminal are further configured in a creation/update process for a LAN group identified by the LAN ID, the LSMF network element may further obtain the restriction information in S701.

A specific implementation in which the LSMF network element obtains the ID of the terminal, the LAN ID of the terminal, and the service area information corresponding to the LAN ID (using a group management request) in S701 is the same as a specific implementation in which the LSMF network element obtains the ID of the terminal, the LAN ID of the terminal, and the service area information corresponding to the LAN ID in S401. Details are not repeatedly described herein.

S702: The LSMF network element selects a UDM network element based on the service area information corresponding to the LAN ID.

Further, in S702, the UDM network element selected by the LSMF network element may be all UDM network elements in a service area indicated in the service area information corresponding to the LAN ID.

That is, when it is difficult to learn which UDM network element performs unified data management on the terminal in the group identified by the LAN ID, the LSMF network element may send a second configuration parameter to all the UDM network elements in the service area corresponding to the LAN ID.

S703: The LSMF network element sends the second configuration parameter to the UDM network element.

The second configuration parameter includes the LAN ID and the ID of the terminal.

Optionally, the second configuration parameter may further include the restriction information of the terminal.

S704: An AMF network element obtains registration area information of the terminal, the LAN ID of the terminal, and the service area information corresponding to the LAN ID.

In addition, if the restriction information corresponding to the LAN ID and the restriction information of the terminal are further configured in the creation/update process for the LAN group identified by the LAN ID, the AMF network element may further obtain the restriction information in S704 such that the AMF network element uses the restriction information when determining LAN information of the terminal.

S705: The AMF network element determines LAN communication area information of the terminal based on the registration area information of the terminal and the service area information corresponding to the LAN ID.

S706: The AMF network element sends the LAN information of the terminal to the terminal.

The LAN information of the terminal includes the LAN ID and the LAN communication area information of the terminal.

In addition, if the AMF network element further obtains the restriction information of the terminal or the restriction information corresponding to the LAN ID in S704, the LAN information of the terminal may further include the restriction information. When managing LAN communication of the terminal based on the LAN information, the terminal or a network element (for example, the AMF network element, an SMF network element, the UDM network element, or the LSMF network element) further needs to consider the restriction information. For a specific manner, refer to the foregoing related description of the LAN information of the terminal. Details are not described herein again.

S707: The terminal manages LAN communication of the terminal based on the LAN information.

A specific manner in which the terminal manages LAN communication of the terminal based on the LAN information in S707 is the same as the specific manner in which the terminal manages LAN communication of the terminal based on the LAN information in S406. Details are not repeatedly described herein.

In addition, another network element in a network may also manage local area network communication of the terminal based on the LAN information of the terminal. A specific implementation is also described in the method shown in FIG. 4. Details are not described herein again.

It should be noted that in step S704 in Embodiment B, the AMF network element may determine, using different interaction procedures between the AMF network element and the terminal, an occasion for determining the LAN information of the terminal, to obtain the registration area information of the terminal, the LAN ID of the terminal, and the service area information corresponding to the LAN ID.

The following describes, with reference to the accompanying drawing, three specific implementations of step S704 in which the AMF network element obtains the registration area information of the terminal, the LAN ID of the terminal, and the service area information corresponding to the LAN ID.

Manner 1:

When the terminal has registered with the network, if the LSMF network element receives a group creation request or a group update request, the LSMF network element may notify the UDM network element of subscription information of the terminal, and the UDM network element sends a subscription data update notification to the AMF network element. When the AMF network element receives the subscription data update notification of the terminal, and the subscription data update notification includes the LAN ID of the terminal (that is, subscription data of the terminal for local area network communication in the LAN group changes), the AMF network element may trigger an operation of determining the LAN information of the terminal, and send the LAN information of the terminal to the terminal using a configuration update message. In this way, the terminal can update LAN information in a timely manner, and manage local area network communication of the terminal based on latest LAN information.

Further, when Manner 1 is used, that an AMF network element obtains registration area information of the terminal, the LAN ID of the terminal, and the service area information corresponding to the LAN ID in S704 may be implemented in the following manner. The AMF network element receives a first subscription data update notification sent by the UDM network element, where the first subscription data update notification includes the LAN ID and the ID of the terminal, the AMF obtains the registration area information of the terminal based on the ID of the terminal, the AMF network element sends a first request message to the LSMF network element, where the first request message carries the LAN ID, and the first request message is used to request to obtain the service area information corresponding to the LAN ID, and the AMF network element receives a first response message sent by the LSMF network element, where the first response message carries the service area information corresponding to the LAN ID.

Then, that the AMF network element sends the LAN information of the terminal to the terminal may be implemented in the following manner. The AMF network element sends a first configuration update message to the terminal, where the first configuration update message includes the LAN information of the terminal.

In Manner 1, after receiving the first subscription data update notification, the AMF network element triggers the operation of determining the LAN information of the terminal. When the terminal has registered with the network, the AMF network element stores a context of the terminal. After receiving the first subscription data update notification, the AMF network element may search the context to obtain registration area information corresponding to the ID of the terminal that is carried in the first subscription data update notification, that is, the registration area information of the terminal. In addition, in this case, the AMF network element may send the first request message to the LSMF network element, to request to obtain the service area information corresponding to the LAN ID. In this way, the AMF network element has obtained the LAN ID, the service area information corresponding to the LAN ID, and the registration area information of the terminal that are required for generating the LAN information.

That is, in Manner 1, after the UDM network element receives the second configuration parameter sent by the LSMF network element, if the UDM network element determines that the terminal has registered with the network, the UDM network element may directly send the second configuration parameter to the AMF network element using the first subscription data update notification. In this way, the AMF network element can determine the LAN information of the registered terminal based on the second configuration parameter and another parameter (for example, the service area information that corresponds to the LAN ID and that is obtained from the first response message), and send the LAN information to the terminal, and the registered terminal can perform local area network communication based on the LAN information of the terminal.

In addition, if the second configuration parameter received by the UDM network element further includes the restriction information of the terminal, the first subscription data update notification may further carry the restriction information of the terminal such that the AMF network element uses the restriction information when determining the LAN information of the terminal.

Manner 2:

When the terminal has not registered with the network, the AMF network element cannot send the LAN information of the terminal to the terminal using a configuration update procedure. When the terminal initiates a registration request, the AMF network element may trigger an operation of determining the LAN information of the terminal, that is, request subscription data of the terminal from the UDM network element, and determine the LAN information of the terminal based on the subscription data returned by the UDM network element. Then, the AMF network element sends the LAN information of the terminal to the terminal using a registration response message. In this way, after a registration procedure is completed, the terminal can manage local area network communication based on the LAN information.

Further, when Manner 2 is used, that an AMF network element obtains registration area information of the terminal, the LAN ID of the terminal, and the service area information corresponding to the LAN ID in S704 may be implemented in the following manner. The AMF network element receives a first registration request message sent by the terminal, where the first registration request message carries the ID of the terminal, the AMF network element sends a first subscription data request message to the UDM network element, where the first subscription data request message carries the ID of the terminal, the AMF network element receives a first subscription data response message sent by the UDM network element, where the first subscription data response message carries the LAN ID, the AMF generates the registration area information of the terminal, the AMF network element sends a second request message to the LSMF network element, where the second request message carries the LAN ID, and the second request message is used to request to obtain the service area information corresponding to the LAN ID, and the AMF network element receives a second response message sent by the LSMF network element, where the second response message carries the service area information corresponding to the LAN ID.

Then, that the AMF network element sends the LAN information of the terminal to the terminal may be implemented in the following manner. The AMF network element sends a first registration response message to the terminal, where the first registration response message carries the LAN information of the terminal.

In Manner 2, after receiving the first registration request message, the AMF network element triggers the operation of determining the LAN information of the terminal. In the registration procedure corresponding to the terminal, the AMF network element dynamically generates the registration area information of the terminal that requests registration. Therefore, in Manner 2, after receiving the first subscription data response message, the AMF network element can generate the registration area information of the terminal. In addition, the first subscription data response message carries the LAN ID. This indicates that the UDM network element adds, to the LAN group identified by the LAN ID, the terminal that requests registration. The LSMF network element has obtained, during creation of the LAN group, the LAN ID of the LAN group and the service area information corresponding to the LAN ID. Therefore, after receiving the first subscription data response message, the AMF network element may send the second request message to the LSMF network element, to obtain the service area information corresponding to the LAN ID. In this way, the AMF network element has obtained the LAN ID, the service area information corresponding to the LAN ID, and the registration area information of the terminal that are required for generating the LAN information.

Optionally, if the second configuration parameter received by the UDM network element further includes the restriction information of the terminal, the first subscription data response message may further carry the restriction information of the terminal such that the AMF network element uses the restriction information when determining the LAN information of the terminal.

Manner 3:

When the terminal has registered with the network, and the terminal initiates a PDU session management request, the AMF may further trigger an operation of determining the LAN information of the terminal, and send the LAN information of the terminal to the terminal using a PDU session management response. In this way, the terminal can update LAN information in a timely manner, and manage local area network communication based on latest LAN information.

Further, when Manner 3 is used, that an AMF network element obtains registration area information of the terminal, the LAN ID of the terminal, and the service area information corresponding to the LAN ID in S704 may be implemented in the following manner. The AMF network element receives a second PDU session management request sent by the terminal, where the second PDU session management request carries the LAN ID, the AMF network element obtains the registration area information of the terminal from a context of the terminal, the AMF network element sends a fourth request message to the LSMF network element, where the fourth request message carries the LAN ID, and the fourth request message is used to request to obtain the service area information corresponding to the LAN ID, the AMF network element receives a fourth response message sent by the LSMF network element, where the fourth response message carries the service area information corresponding to the LAN ID, and the AMF network element obtains the LAN ID carried in the second PDU session management request, and obtains, according to the fourth response message, the service area information corresponding to the LAN ID.

Then, that the AMF network element sends the LAN information of the terminal to the terminal may be implemented in the following manner. The AMF network element sends a second PDU session management response to the terminal, where the second PDU session management response carries the LAN information of the terminal.

The second PDU session management request may be a PDU session establishment request, a PDU session modification request, or a PDU session release request. Correspondingly, the second PDU session management response may be a PDU session establishment response, a PDU session modification response, or a PDU session release response.

In Manner 3, after receiving the second PDU session management request, the AMF network element triggers the operation of determining the LAN information of the terminal. In Manner 3, the registered terminal has established a separate signaling connection with the AMF network element. In this case, after receiving the second PDU session management request through a dedicated channel between the AMF network element and the terminal, the AMF network element may learn of the ID of the terminal, and may determine the registration area information of the terminal based on context information that is stored during registration of the terminal. In addition, the AMF network element may send the fourth request message to the LSMF network element, to request to obtain the service area information corresponding to the LAN ID. In this way, the AMF network element has obtained the LAN ID, the service area information corresponding to the LAN ID, and the registration area information of the terminal that are required for generating the LAN information.

In addition, that the second PDU session management request sent by the terminal to the AMF network element carries the LAN ID may mean that the terminal expects to perform local area network communication with a terminal in the LAN group. The terminal may send the second PDU session management request to the AMF network element. After receiving the second PDU session management request, the AMF network element triggers a process of determining the LAN information of the terminal. The AMF network element responds to the second PDU session management request. This indicates that the terminal can perform local area network communication with a terminal in the LAN group.

It should be noted that after receiving the second PDU session management request, the AMF network element processes a PDU session by interacting with the SMF network element, and then sends the second PDU session management response to the terminal. A PDU session processing procedure belongs to the other approaches. Therefore, details are not described in this embodiment of this application.

In addition, in Manner 3, whether the terminal can join the LAN group identified by the LAN ID carried in the second PDU session management request may be further determined after authentication performed by the UDM network element. To be specific, after the AMF network element receives the second PDU session management request sent by the terminal, the AMF network element may send a sixth subscription data request message to the UDM network element, where the sixth subscription data request message carries the ID of the terminal and the LAN ID. Then the AMF network element receives a sixth subscription data response message sent by the UDM network element.

The AMF network element receives the sixth subscription data response message. This indicates that the terminal can perform local area network communication with a terminal in the LAN group. In this case, the AMF network element may be triggered to perform the operation of determining the LAN information of the terminal.

Optionally, in Manner 3, if the second configuration parameter received by the UDM network element further includes the restriction information of the terminal, the sixth subscription data response message may further carry the restriction information of the terminal such that the AMF network element uses the restriction information when determining the LAN information of the terminal.

It should be noted that the foregoing three manners may be independently used for different terminals (that is, only one of the foregoing three manners is used for each terminal to implement determining and receiving of LAN information), or any combination of the foregoing three manners may be used for one terminal. For example, when a terminal initiates a registration request, LAN information of the terminal is determined in Manner 2. After a LAN group to which the terminal belongs is updated, updated LAN information of the terminal may be determined in Manner 1. In addition, when the terminal initiates a PDU session management request, the AMF may further re-determine LAN information of the terminal, and send the determined LAN information to the terminal such that LAN information of the terminal can be updated in a timely manner.

It can be learned from the foregoing descriptions of Embodiment A and Embodiment B that, in Embodiment A, regardless of whether the AMF network element needs to perform the step of determining the LAN information of the terminal, the LSMF network element sends the first configuration parameter to all AMF network elements in the service area corresponding to the group after the group is created or updated, while in Embodiment B, the LSMF network element does not send the first configuration parameter to all AMF network elements in the service area corresponding to the group, but sends, to the AMF network element according to a request of the AMF network element, the response message that carries the LAN ID and the service area information corresponding to the LAN ID. Because only the AMF network element serving the terminal sends the request message to the LSMF network element, a processing workload of the LSMF network element is low in Embodiment B. In addition, because AMF network elements that do not serve the terminal do not receive the first configuration parameter, storage space of these AMF network elements can be saved.

Figure 7A:
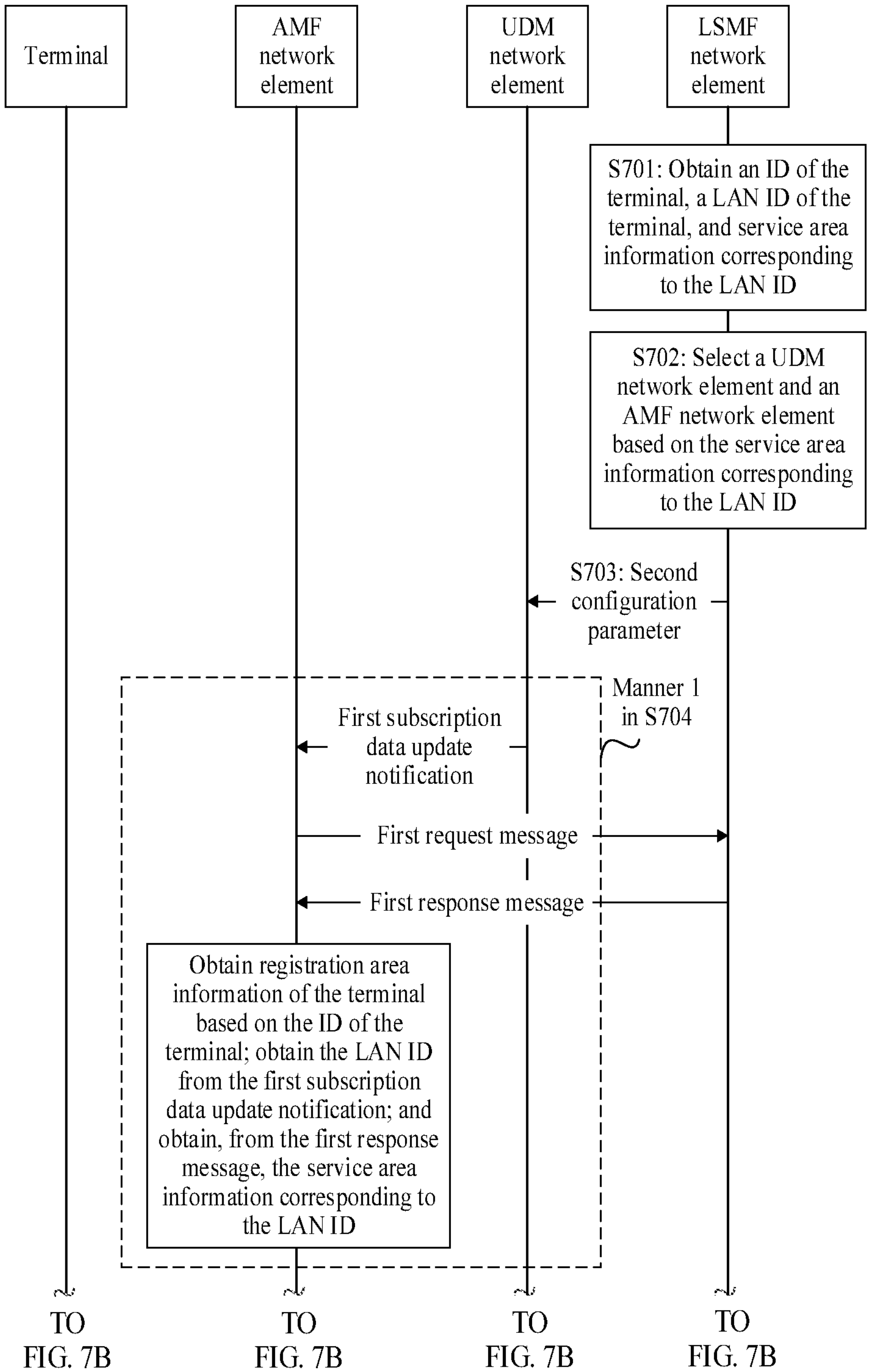
FIG. 7A, FIG. 7B, and FIG. 7C are a schematic flowchart of a fourth local area network communication management method according to an embodiment of this application.
Figure 7B:
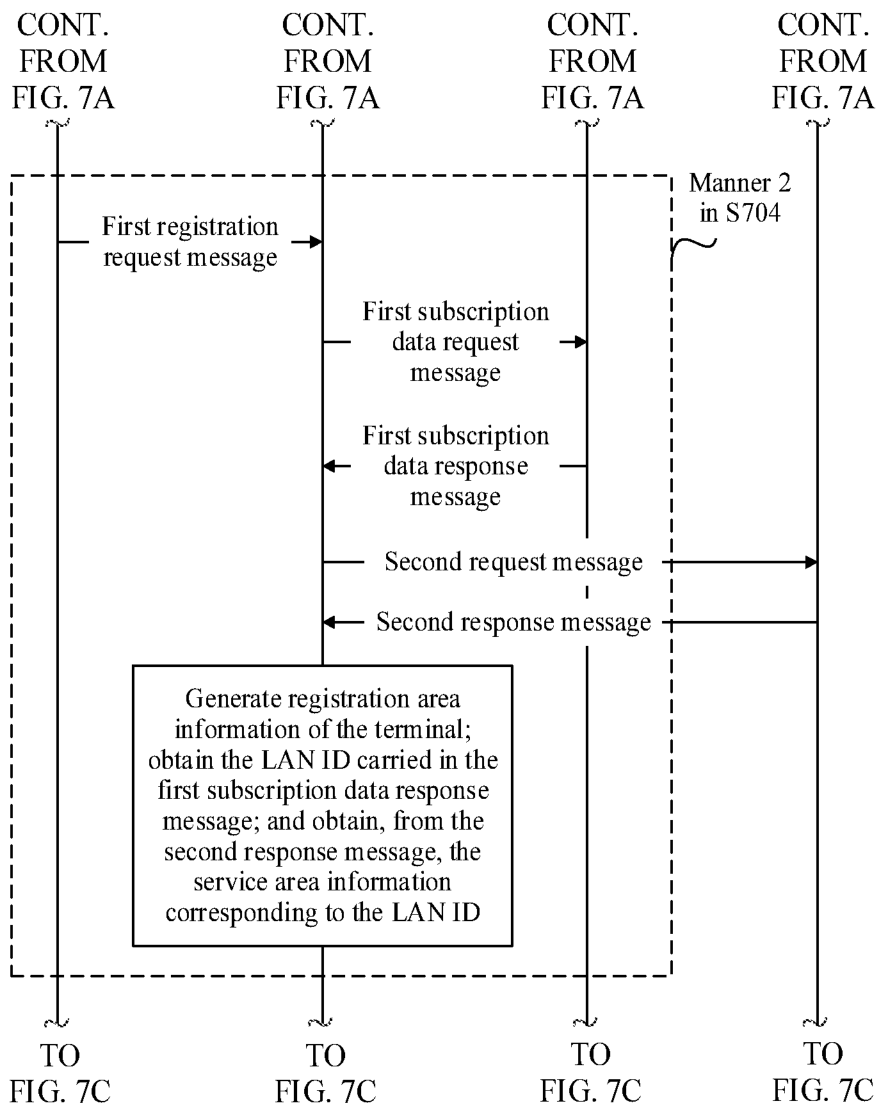
Figure 7C:
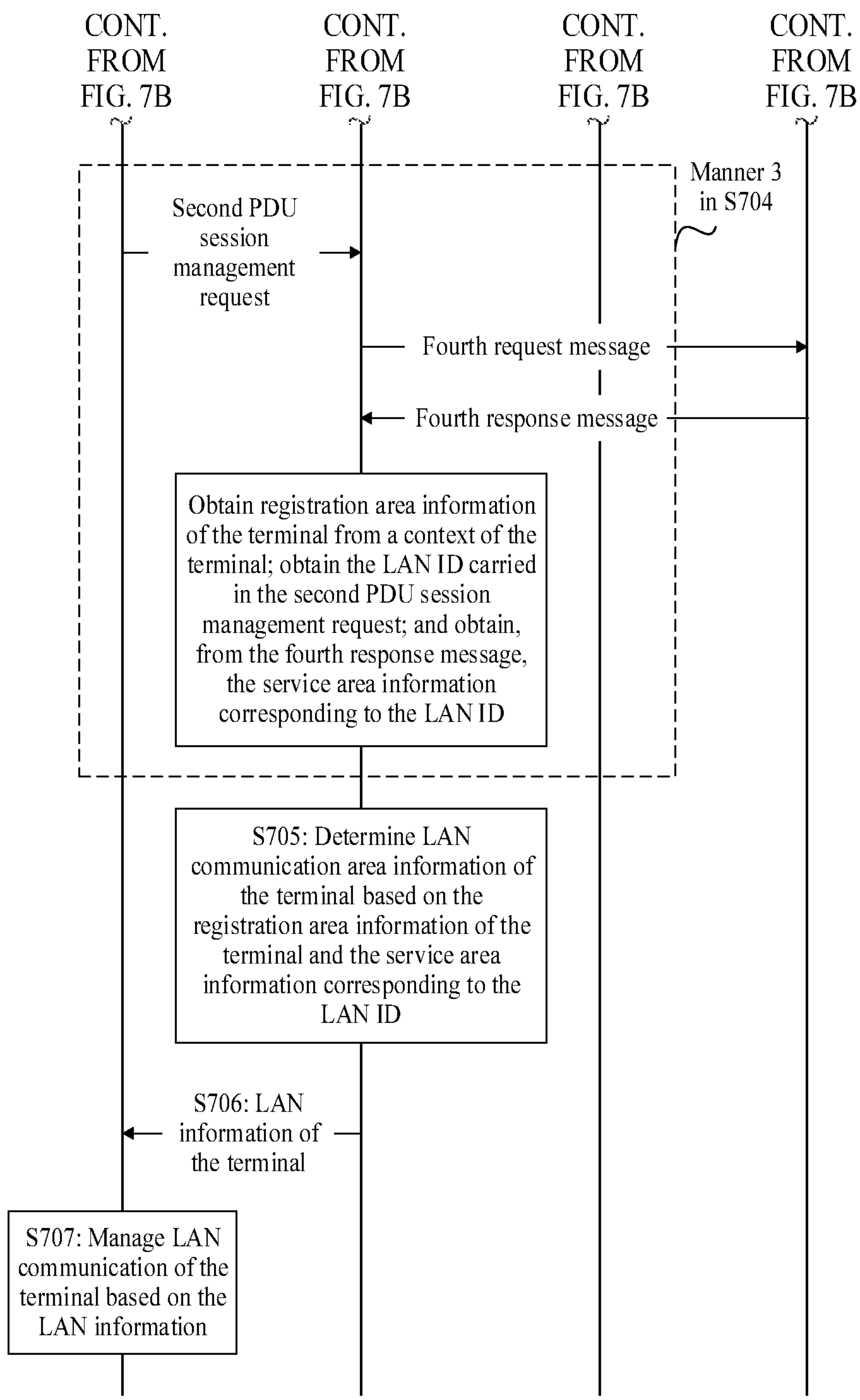
Figure 8A:
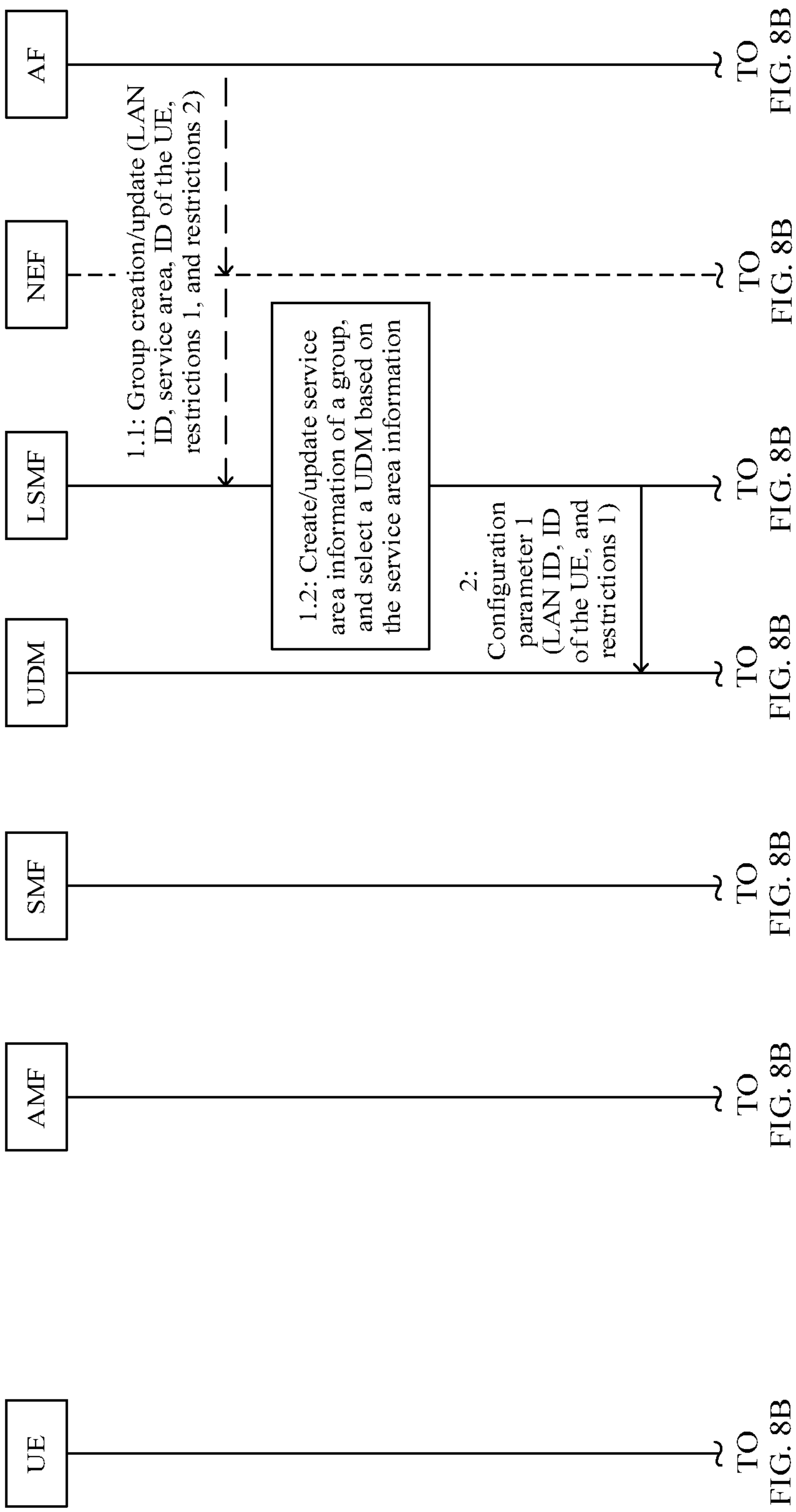
FIG. 8A, FIG. 8B, FIG. 8C, and FIG. 8D are a schematic flowchart of a fifth local area network communication management method according to an embodiment of this application.
Figure 8B:
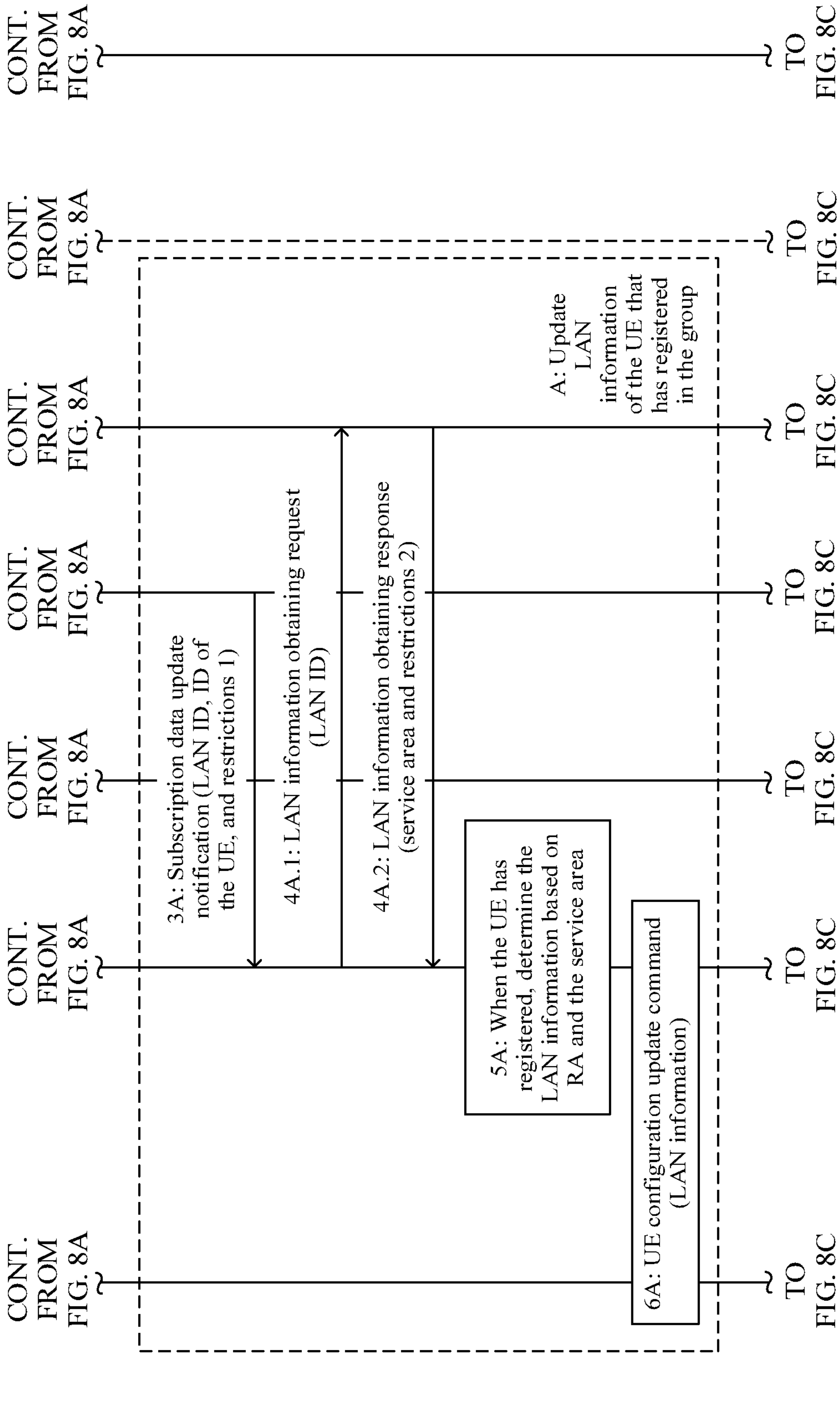
Figure 8C:
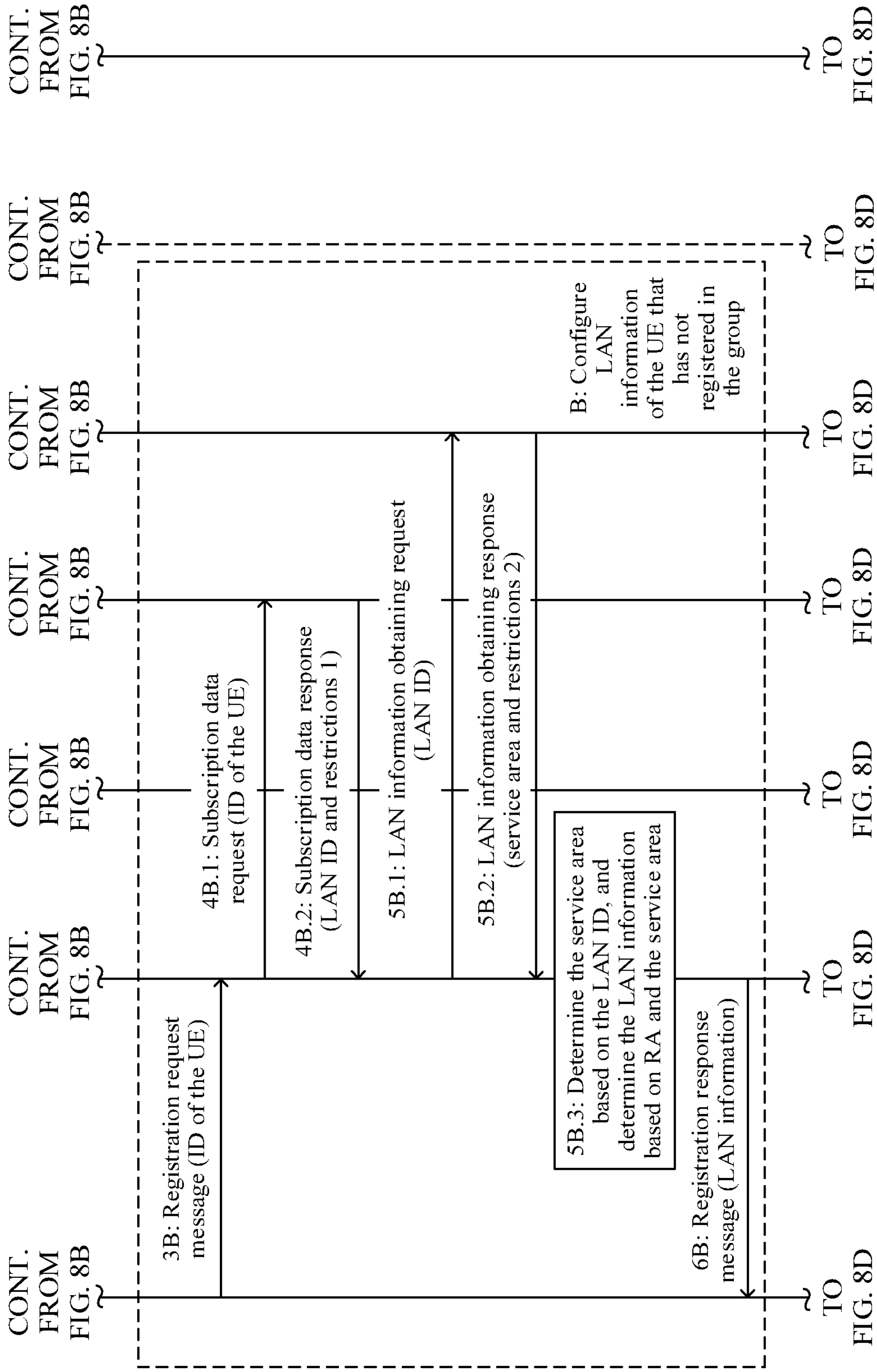
Figure 8D:
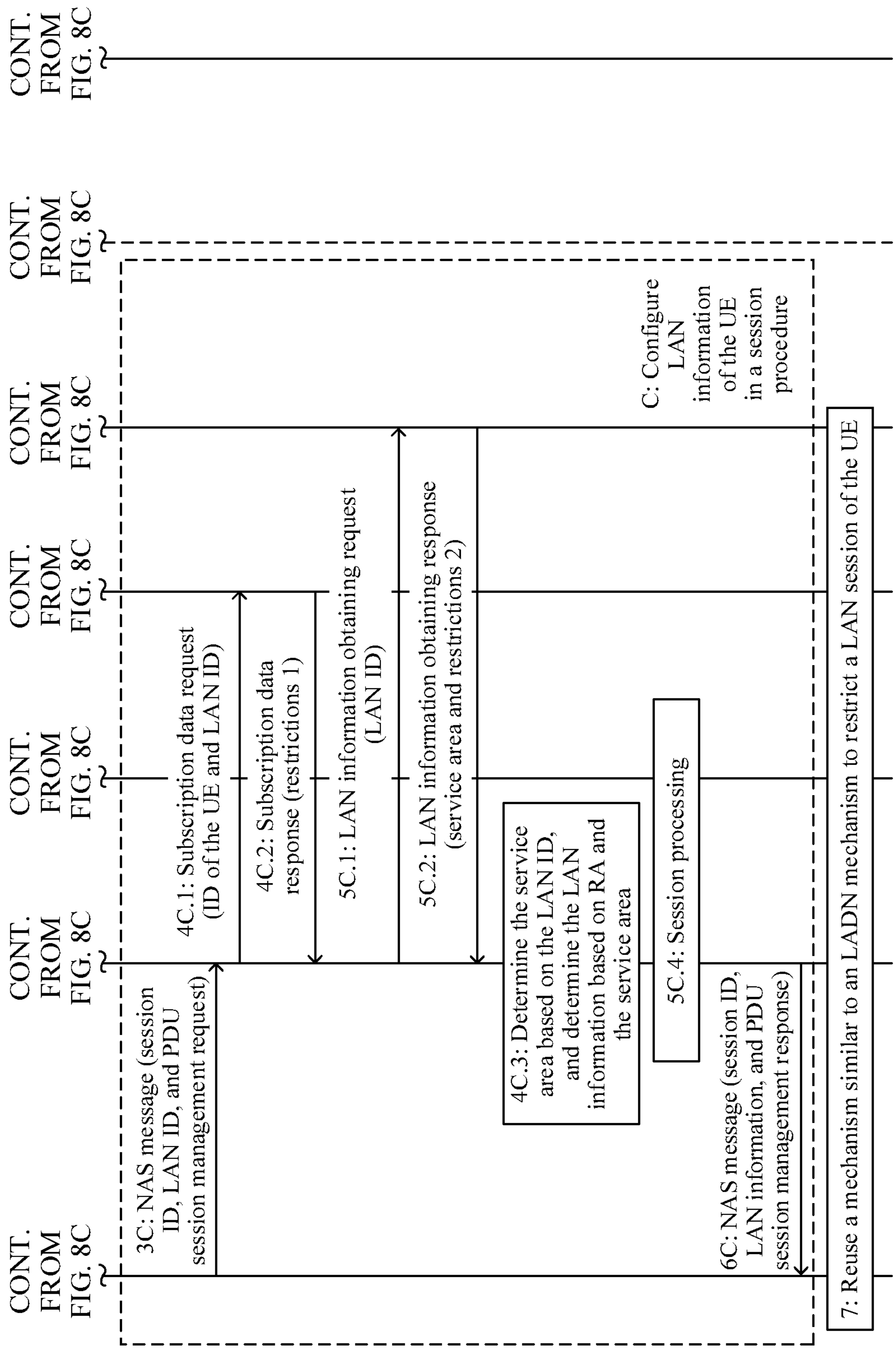

The foregoing describes Embodiment B. Based on a same concept, an embodiment of this application further provides a local area network communication management method. The method may be considered as a specific example of the method shown in FIG. 7A to FIG. 7C. As shown in FIG. 8A to FIG. 8D, the method includes the following steps.

1.1: An LSMF network element receives a group creation/update message from a NEF network element/an AF network element, and obtains a LAN ID, service area information (service area) corresponding to the LAN ID, an ID of UE in the local area network group, restriction information (restrictions 1) of the UE, and restriction information (restrictions 2) corresponding to the LAN ID.

1.2: The LSMF network element selects a UDM network element based on the service area information corresponding to the LAN ID.

The UDM network element selected by the LSMF network element may be all UDM network elements in a service area corresponding to the LAN ID.

2: The LSMF network element sends a configuration parameter 1 (Configure 1) to the selected UDM network element, where the configuration parameter 1 carries the LAN ID, the ID of the UE, and the restrictions 1.

A: When the UE has registered in the group, the following method may be used to update LAN information of the UE.

3A: When the UE has registered in the group, the UDM network element sends a subscription data update notification to an AMF network element serving the UE, where the subscription data update notification carries the LAN ID, the ID of the UE, and the restrictions 1.

4A: The AMF network element sends a LAN information obtaining request (carrying the LAN ID) to the LSMF network element, and the LSMF network element sends a LAN information obtaining response to the AMF network element, where the LAN information obtaining response carries the service area and the restrictions 2.

The LAN information obtaining request may be considered as a specific example of the foregoing first request message, and the LAN information obtaining response may be considered as a specific example of the foregoing first response message.

5A: The AMF network element serving the UE determines registration area information of the UE based on the ID of the UE, and determines the LAN information of the UE based on the registration area information of the UE, the service area, the LAN ID, the restrictions 1, and the restrictions 2.

6A: The AMF network element sends the LAN information to the UE using a UE configuration update command in a UE configuration update procedure.

The UE configuration update command may be considered as a specific example of the foregoing first configuration update message.

B: When the UE has not registered in the group, the following method may be used to update LAN information of the UE.

3B: The UE sends a registration request message to an AMF network element, where the registration request message carries the ID of the UE.

4B: The AMF network element sends a subscription data request (carrying the ID of the UE) to the UDM network element, and the UDM network element returns a subscription data response message. If the UE has subscribed to the LAN service, the subscription data response message obtained by the AMF network element carries the subscribed LAN ID of the UE and the restrictions 1 of the UE.

5B: The AMF network element sends a LAN information obtaining request (carrying the LAN ID) to the LSMF network element, and the LSMF network element sends a LAN information obtaining response to the AMF network element, where the LAN information obtaining response carries the service area and the restrictions 2. The AMF network element determines, based on the LAN ID, the service area information corresponding to the LAN ID, and determines the LAN information based on registration area information dynamically generated for the UE in a registration procedure, the service area information corresponding to the LAN ID, the LAN ID, the restrictions 1, and the restrictions 2.

The LAN information obtaining request may be considered as a specific example of the foregoing second request message, and the LAN information obtaining response may be considered as a specific example of the foregoing second response message.

6B: The AMF network element sends the LAN information to the UE using a registration response message.

C: Configure LAN information of the UE in a session procedure.

3C: The UE sends a NAS message to an AMF network element, where the NAS message carries a session ID, the LAN ID, and a PDU session management request.

The PDU session management request may be a session establishment request, a session modification request, or a session release request.

4C: The AMF network element sends a subscription data request (carrying the ID of the UE and the LAN ID) to the UDM network element, and the UDM network element returns a subscription data response message, where the subscription data response message may carry the restrictions 1.

5C: The AMF network element sends a LAN information obtaining request (carrying the LAN ID) to the LSMF network element, and the LSMF network element sends a LAN information obtaining response to the AMF network element, where the LAN information obtaining response carries the service area and the restrictions 2. The AMF network element determines the LAN information of the UE based on registration area information of the UE that is found in a local context, the service area, the LAN ID, the restrictions 1, and the restrictions 2.

In addition, the AMF network element may request, using an existing session procedure, an SMF network element to process the session management request.

6C: The AMF network element sends a NAS message to the UE, where the NAS message carries the session ID, the LAN information, and a PDU session management response, to send the LAN information to the UE.

The PDU session management response may be obtained from the SMF network element.

7: After obtaining the LAN information, the UE may use the LAN ID in the LAN information as an LADN DNN, and restrict a LAN session of the UE by reusing a mechanism similar to an LADN mechanism, to restrict the UE to using a 5G LAN service.

Likewise, the AMF network element and the SMF network element may also use the LAN ID as an LADN DNN, and process a LAN session of the UE using a mechanism similar to an LADN mechanism.

The LAN information of the UE may further include the restrictions 1 and the restrictions 2, where the restrictions 1 and the restrictions 2 are used as reference information when the UE or a network element (for example, the AMF network element, the SMF network element, the UDM network element, or the LSMF network element) processes the LAN session.

Embodiment C

In Embodiment C, the LSMF network element sends LAN subscription information of the terminal and the service area information corresponding to the LAN ID to the UDM network element as configuration parameters, and the UDM network element may directly send the information to the AMF network element, or send the information to the AMF network element according to a request of the AMF network element such that the AMF network element uses the information when determining the LAN information of the terminal.

To be specific, in Embodiment C, the LSMF network element sends, to the UDM network element, all parameters required for generating the LAN information of the terminal. When the terminal needs to determine the LAN information of the terminal, the terminal may obtain these parameters from the UDM network element.

For example, in addition to the LAN ID and the ID of the terminal, the second configuration parameter sent by the LSMF network element to the UDM network element may further include the service area information corresponding to the LAN ID. Optionally, the second configuration parameter may further include the restriction information corresponding to the LAN ID and the restriction information of the terminal.

Figure 9A:
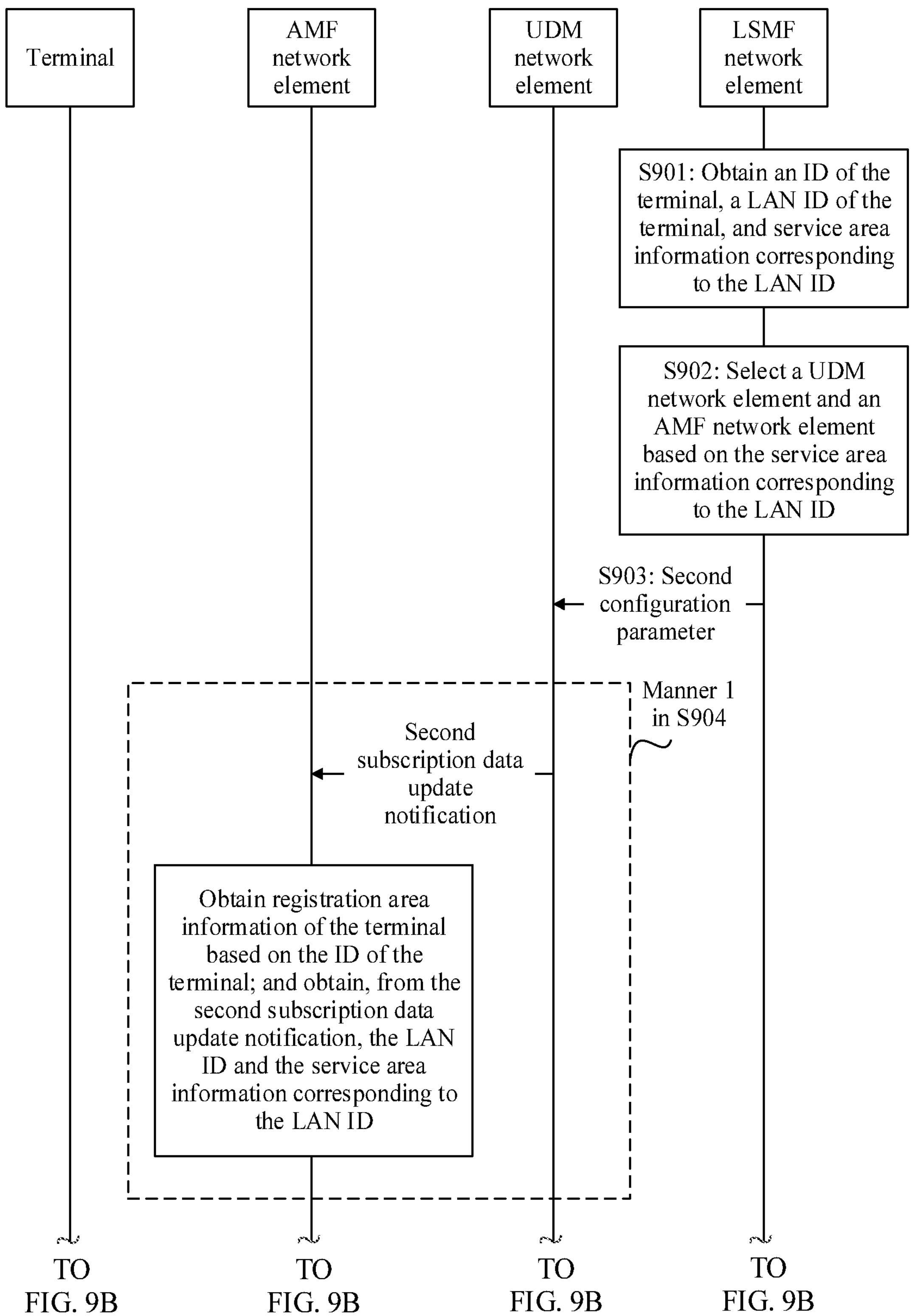
FIG. 9A, FIG. 9B, and FIG. 9C are a schematic flowchart of a sixth local area network communication management method according to an embodiment of this application.
Figure 9B:
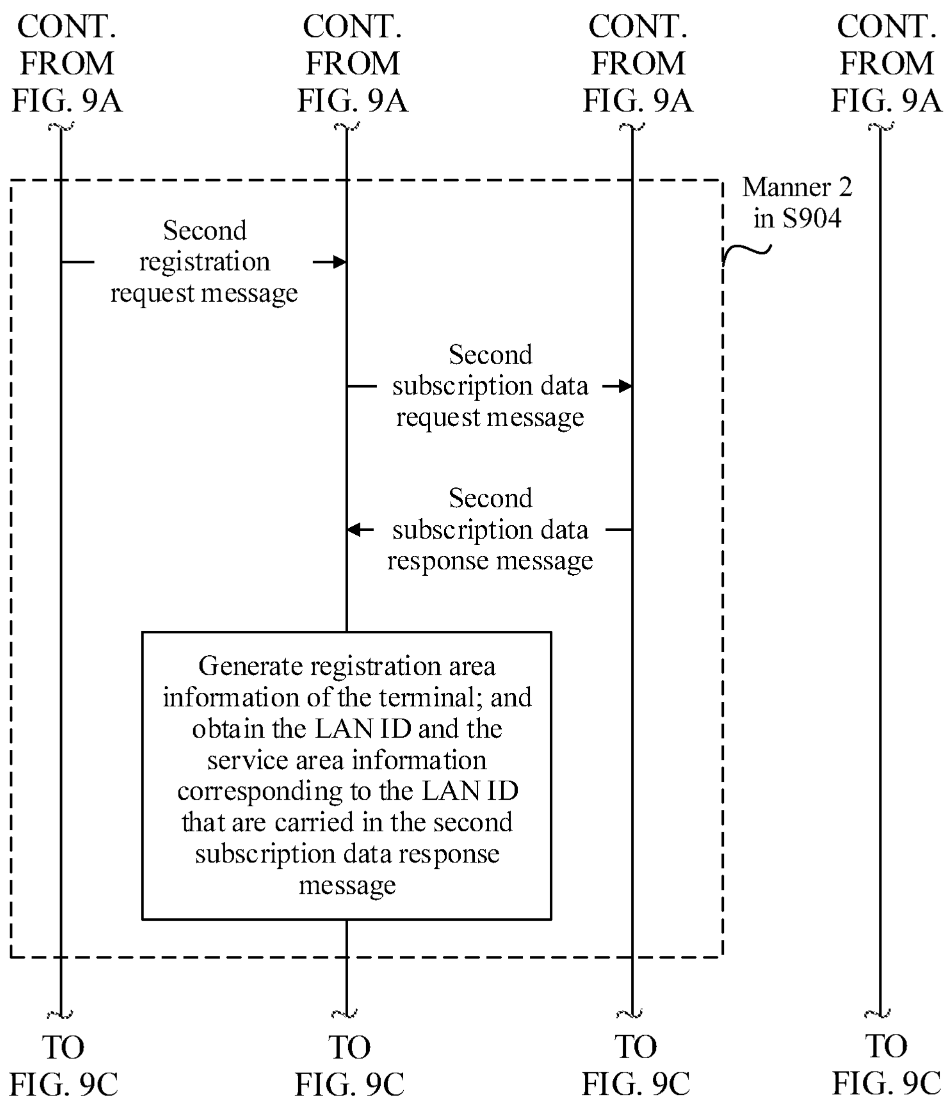
Figure 9C:
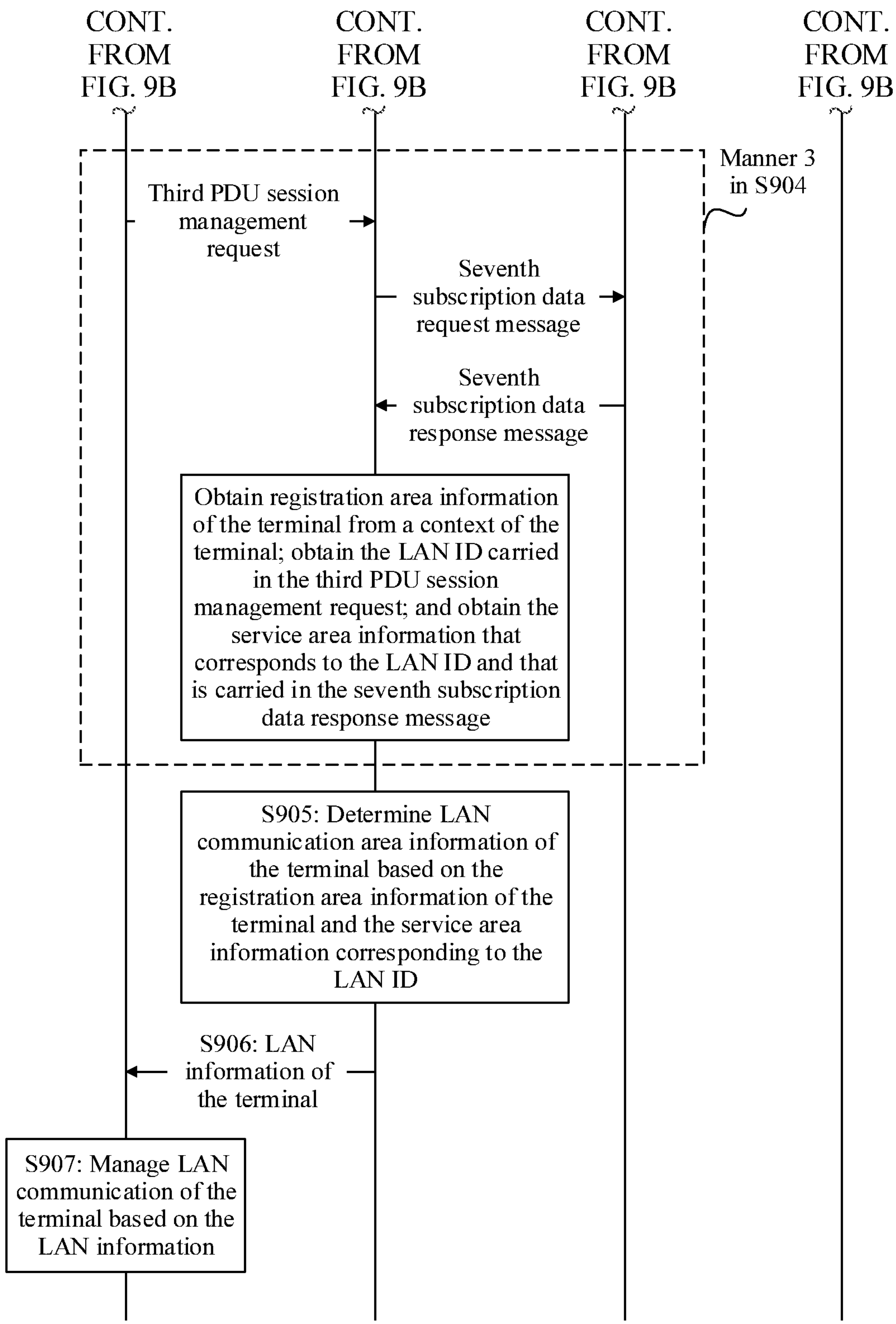
Figure 10A:
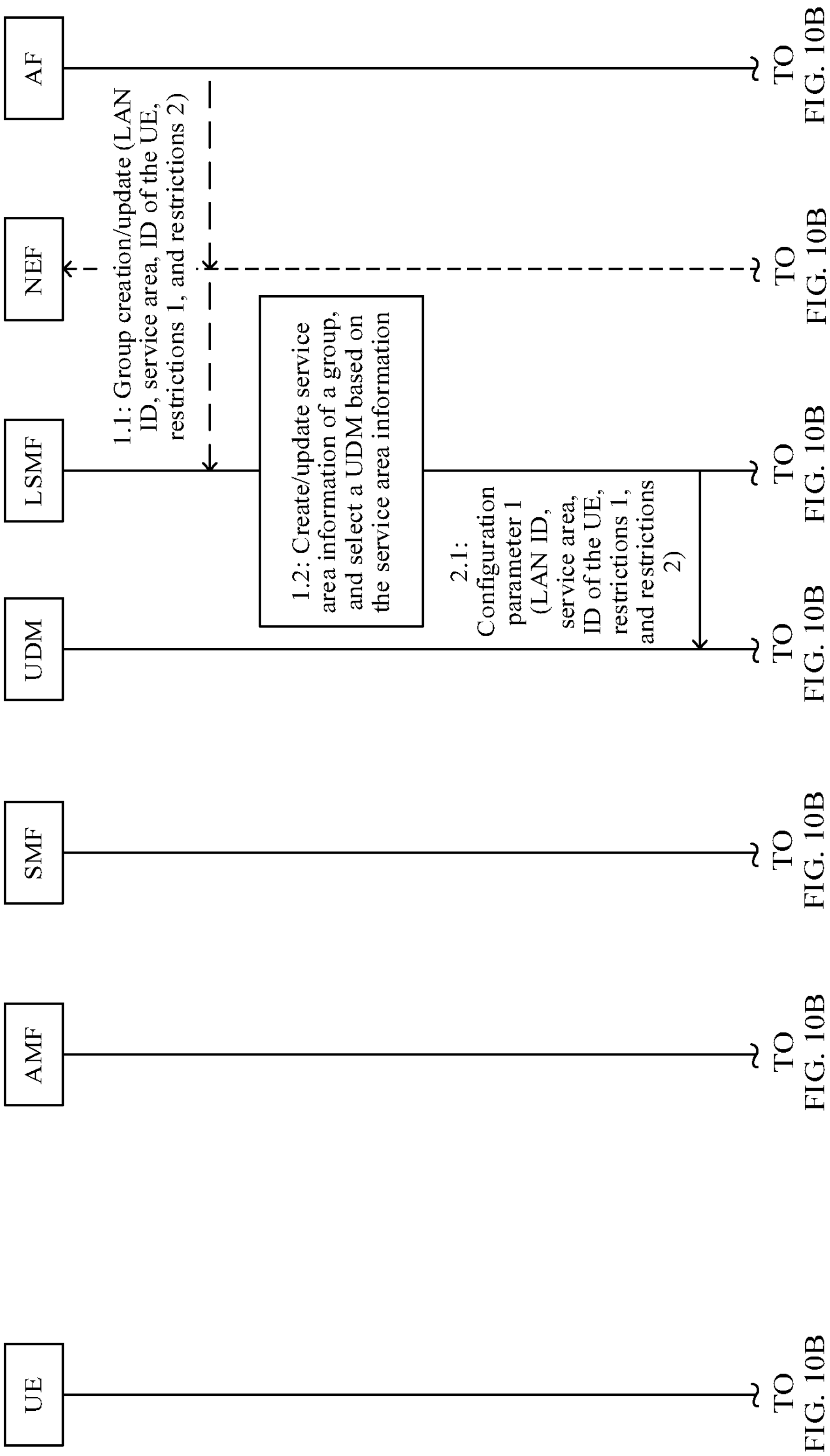
FIG. 10A, FIG. 10B, FIG. 10C, and FIG. 10D are a schematic flowchart of a seventh local area network communication management method according to an embodiment of this application.
Figure 10B:
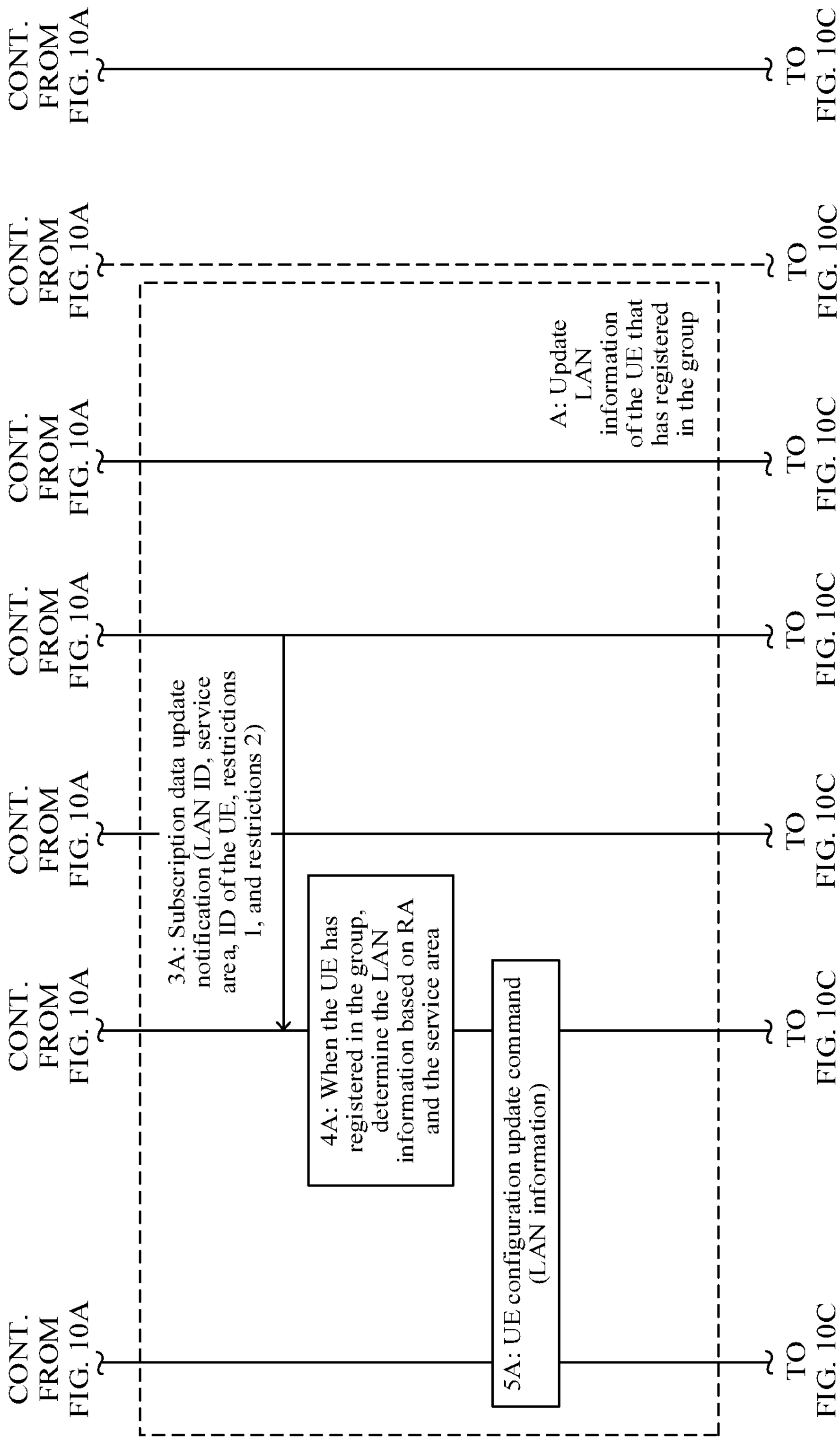
Figure 10C:
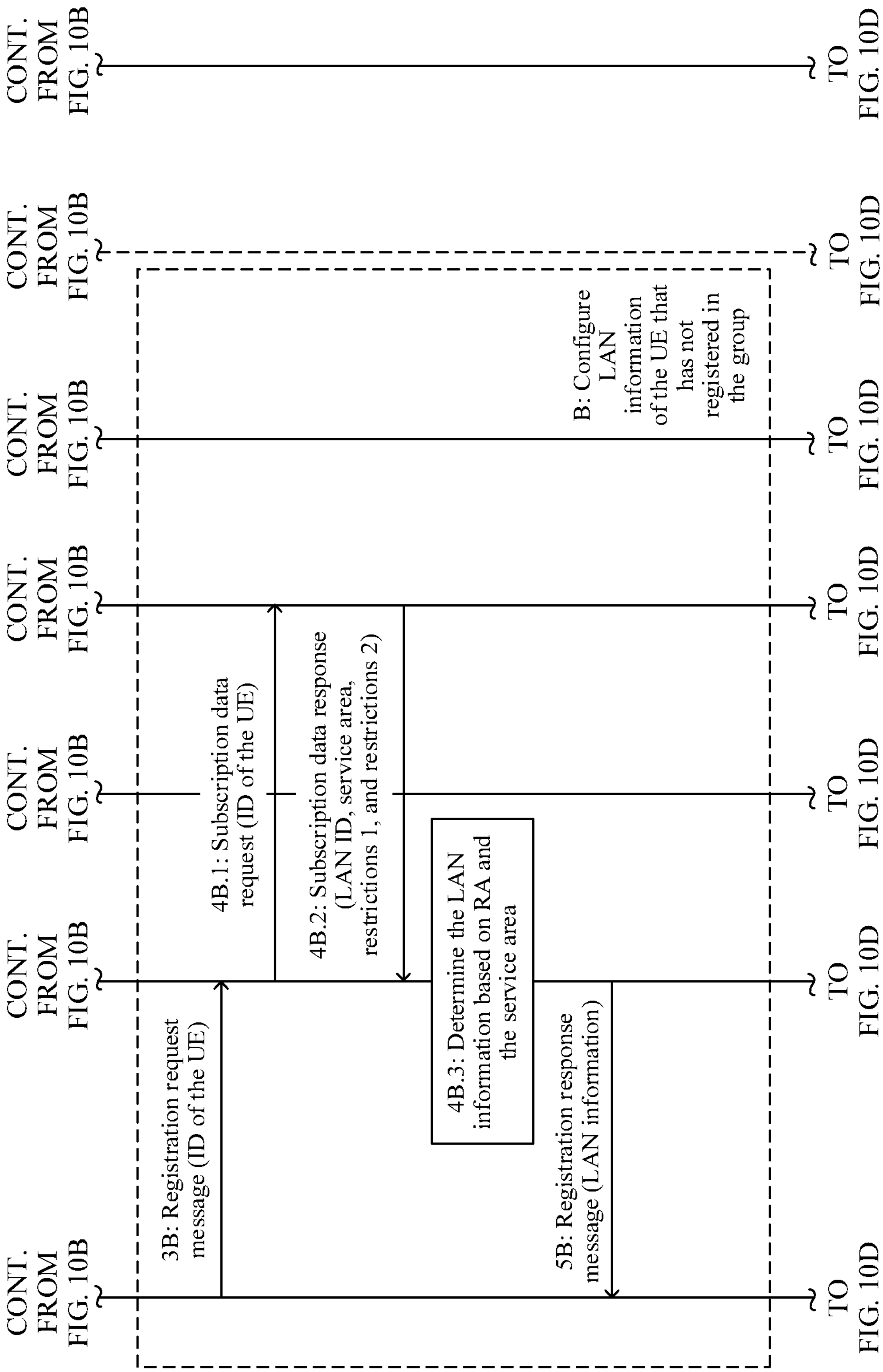
Figure 10D:
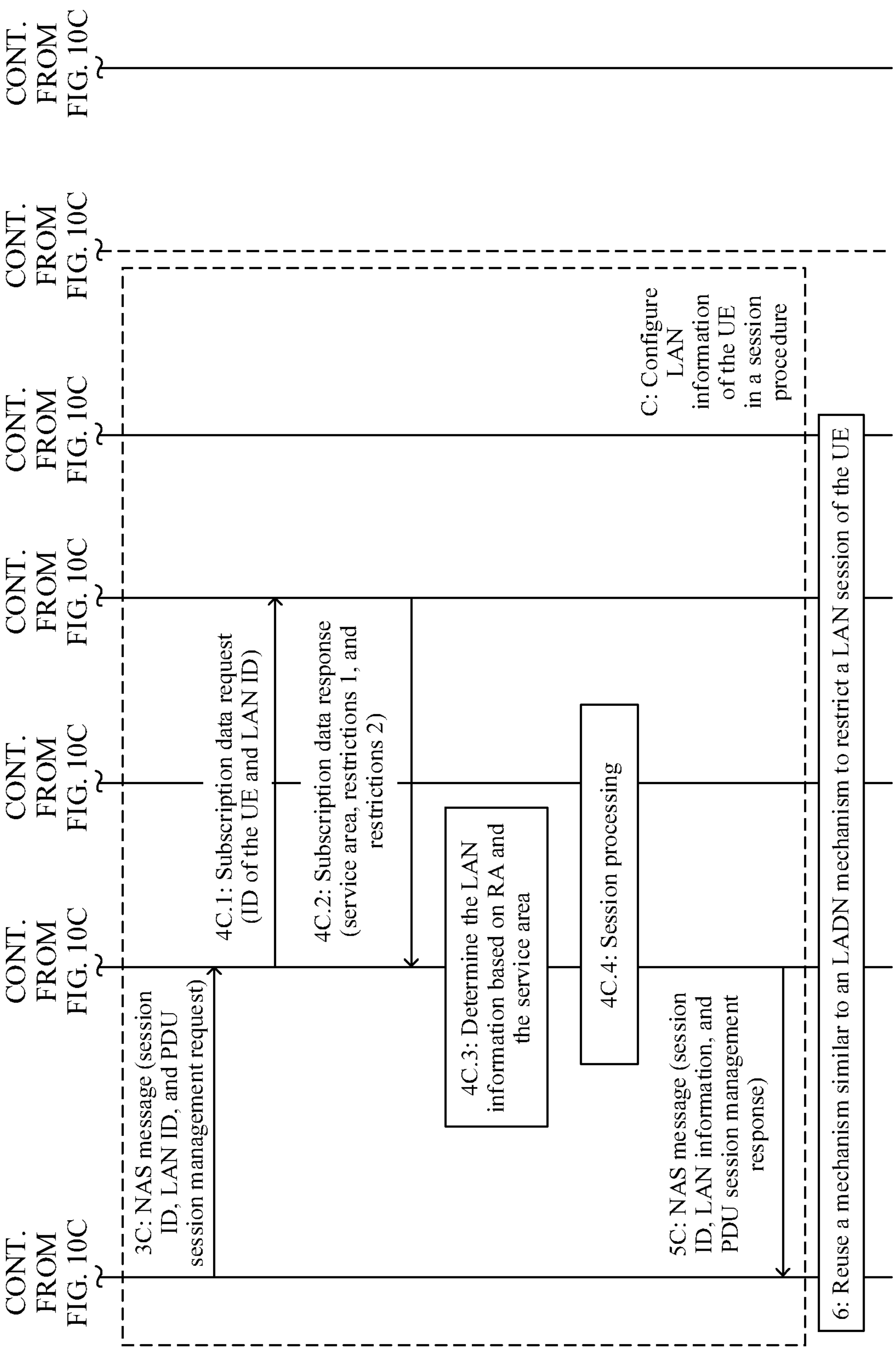

With reference to the foregoing descriptions of the local area network communication management method shown in FIG. 4, if the solution in Embodiment C is used, the local area network communication management method shown in FIG. 4 may be shown in FIG. 9A to FIG. 9C. In FIG. 9A to FIG. 9C, the method includes the following steps.

S901: An LSMF network element obtains an ID of a terminal, a LAN ID of the terminal, and service area information corresponding to the LAN ID.

In addition, if restriction information corresponding to the LAN ID and restriction information of the terminal are further configured in a creation/update process for a LAN group identified by the LAN ID, the LSMF network element may further obtain the restriction information in S901.

A specific implementation in which the LSMF network element obtains the ID of the terminal, the LAN ID of the terminal, and the service area information corresponding to the LAN ID (using a group management request) in S901 is the same as a specific implementation in which the LSMF network element obtains the ID of the terminal, the LAN ID of the terminal, and the service area information corresponding to the LAN ID in S401. Details are not repeatedly described herein.

S902: The LSMF network element selects a UDM network element based on the service area information corresponding to the LAN ID.

Further, in S902, the UDM network element selected by the LSMF network element may be all UDM network elements in a service area indicated in the service area information corresponding to the LAN ID.

That is, when it is difficult to learn which UDM network element performs unified data management on the terminal in the group identified by the LAN ID, the LSMF network element may send a second configuration parameter to all the UDM network elements in the service area corresponding to the LAN ID.

S903: The LSMF network element sends the second configuration parameter to the UDM network element.

The second configuration parameter includes the LAN ID, the service area information corresponding to the LAN ID, and the ID of the terminal.

Optionally, the second configuration parameter may further include the restriction information corresponding to the LAN ID and the restriction information of the terminal.

S904: An AMF network element obtains registration area information of the terminal, the LAN ID of the terminal, and the service area information corresponding to the LAN ID.

In addition, if the restriction information corresponding to the LAN ID and the restriction information of the terminal are further configured in the creation/update process for the LAN group identified by the LAN ID, the AMF network element may further obtain the restriction information in S904 such that the AMF network element uses the restriction information when determining LAN information of the terminal.

S905: The AMF network element determines LAN communication area information of the terminal based on the registration area information of the terminal and the service area information corresponding to the LAN ID.

S906: The AMF network element sends the LAN information of the terminal to the terminal.

The LAN information of the terminal includes the LAN ID and the LAN communication area information of the terminal.

In addition, if the AMF network element further obtains the restriction information of the terminal or the restriction information corresponding to the LAN ID in S904, the LAN information of the terminal may further include the restriction information. When managing LAN communication of the terminal based on the LAN information, the terminal or a network element (for example, the AMF network element, an SMF network element, the UDM network element, or the LSMF network element) further needs to consider the restriction information. For a specific manner, refer to the foregoing related description of the LAN information of the terminal. Details are not described herein again.

S907: The terminal manages LAN communication of the terminal based on the LAN information.

A specific manner in which the terminal manages LAN communication of the terminal based on the LAN information in S907 is the same as the specific manner in which the terminal manages LAN communication of the terminal based on the LAN information in S406. Details are not repeatedly described herein.

In addition, another network element in a network may also manage local area network communication of the terminal based on the LAN information of the terminal. A specific implementation is also described in the method shown in FIG. 4. Details are not described herein again.

It should be noted that in step S904 in Embodiment C, the AMF network element may obtain the registration area information of the terminal, the LAN ID of the terminal, and the service area information corresponding to the LAN ID using different interaction procedures between the AMF network element and the terminal, and send the LAN information of the terminal to the terminal using different interaction procedures.

The following describes, with reference to the accompanying drawing, three specific implementations of step S904 in which the AMF network element obtains the registration area information of the terminal, the LAN ID of the terminal, and the service area information corresponding to the LAN ID.

Manner 1:

When the terminal has registered with the network, if the LSMF network element receives a group creation request or a group update request, the LSMF network element may notify the UDM network element of subscription information of the terminal, and the UDM network element sends a subscription data update notification to the AMF network element. When the AMF network element receives the subscription data update notification of the terminal, and the subscription data update notification includes the LAN ID of the terminal (that is, subscription data of the terminal for local area network communication in the LAN group changes), the AMF network element may trigger an operation of determining the LAN information of the terminal, and send the LAN information of the terminal to the terminal using a configuration update message. In this way, the terminal can update LAN information in a timely manner, and manage local area network communication of the terminal based on latest LAN information.

Further, when Manner 1 is used, that an AMF network element obtains registration area information of the terminal, the LAN ID of the terminal, and the service area information corresponding to the LAN ID in S904 may be implemented in the following manner. The AMF network element receives a second subscription data update notification sent by the UDM network element, where the second subscription data update notification includes the LAN ID, the service area information corresponding to the LAN ID, and the ID of the terminal, the AMF obtains the registration area information of the terminal based on the ID of the terminal that is carried in the second subscription data update notification, and the AMF network element obtains the LAN ID and the service area information corresponding to the LAN ID that are carried in the second subscription data update notification.

Then, that the AMF network element sends the LAN information of the terminal to the terminal may be implemented in the following manner. The AMF network element sends a second configuration update message to the terminal, where the second configuration update message includes the LAN information of the terminal.

In manner 1, when the terminal has registered with the network, the AMF network element stores a context of the terminal. After receiving the second subscription data update notification, the AMF network element may search the context to obtain registration area information corresponding to the ID of the terminal that is carried in the second subscription data update notification, that is, the registration area information of the terminal. In addition, the AMF network element may further obtain the LAN ID and the service area information corresponding to the LAN ID that are carried in the second subscription data update notification. In this way, the AMF network element has obtained, from the UDM network element, the LAN ID, the service area information corresponding to the LAN ID, and the registration area information of the terminal that are required for generating the LAN information.

That is, in Manner 1, after the UDM network element receives the second configuration parameter sent by the LSMF network element, if the UDM network element determines that the terminal has registered with the network, the UDM may directly send the second configuration parameter to the AMF network element using the second subscription data update notification. In this way, the AMF network element can determine the LAN information of the registered terminal based on the second configuration parameter, and send the LAN information to the terminal, and the registered terminal can perform local area network communication based on the LAN information of the terminal.

In addition, if the second configuration parameter received by the UDM network element further includes the restriction information corresponding to the LAN ID or the restriction information of the terminal, the second subscription data update notification may further carry the restriction information such that the AMF network element uses the restriction information when determining the LAN information of the terminal.

Manner 2:

When the terminal has not registered with the network, the AMF network element cannot send the LAN information of the terminal to the terminal using a configuration update procedure. When the terminal initiates a registration request, the AMF network element may trigger an operation of determining the LAN information of the terminal, that is, request subscription data of the terminal from the UDM network element, and determine the LAN information of the terminal based on the subscription data returned by the UDM network element. Then, the AMF network element sends the LAN information of the terminal to the terminal using a registration response message. In this way, after a registration procedure is completed, the terminal can manage local area network communication based on the LAN information.

Further, when Manner 2 is used, that an AMF network element obtains registration area information of the terminal, the LAN ID of the terminal, and the service area information corresponding to the LAN ID in S904 may be implemented in the following manner. The AMF network element receives a second registration request message sent by the terminal, where the second registration request message carries the ID of the terminal, the AMF network element sends a second subscription data request message to the UDM network element, where the second subscription data request message carries the ID of the terminal, the AMF network element receives a second subscription data response message sent by the UDM network element, where the second subscription data response message carries the LAN ID and the service area information corresponding to the LAN ID, the AMF generates the registration area information of the terminal, and the AMF network element obtains the LAN ID and the service area information corresponding to the LAN ID that are carried in the second subscription data response message.

Then, that the AMF network element sends the LAN information of the terminal to the terminal may be implemented in the following manner. The AMF network element sends a second registration response message to the terminal, where the second registration response message includes the LAN information of the terminal.

In Manner 2, after receiving the second registration request message, the AMF network element triggers the operation of determining the LAN information of the terminal. In the registration procedure corresponding to the terminal, the AMF network element dynamically generates the registration area information of the terminal that requests registration. Therefore, in Manner 2, after receiving the second subscription data response message, the AMF network element can generate the registration area information of the terminal. In addition, the second subscription data response message carries the LAN ID. This indicates that the UDM network element adds, to the LAN group identified by the LAN ID, the terminal that requests registration. The LSMF network element has obtained, during creation of the LAN group, the LAN ID of the LAN group and the service area information corresponding to the LAN ID, and sends the LAN ID and the service area information corresponding to the LAN ID to the UDM network element. Therefore, the UDM network element may send the service area information corresponding to the LAN ID to the AMF network element using the second subscription data response message. In this way, the AMF network element has obtained the LAN ID, the service area information corresponding to the LAN ID, and the registration area information of the terminal that are required for generating the LAN information.

Optionally, if the second configuration parameter received by the UDM network element further includes the restriction information corresponding to the LAN ID and the restriction information of the terminal, the second subscription data response message may further carry the restriction information corresponding to the LAN ID and the restriction information of the terminal such that the AMF network element uses the restriction information when determining the LAN information of the terminal.

Manner 3:

When the terminal has registered with the network, and the terminal initiates a PDU session management request, the AMF may further trigger an operation of determining the LAN information of the terminal, and send the LAN information of the terminal to the terminal using a PDU session management response. In this way, the terminal can update LAN information in a timely manner, and manage local area network communication based on latest LAN information.

Further, when Manner 3 is used, that an AMF network element obtains registration area information of the terminal, the LAN ID of the terminal, and the service area information corresponding to the LAN ID in S904 may be implemented in the following manner. The AMF network element receives a third PDU session management request sent by the terminal, where the third PDU session management request carries the LAN ID, the AMF network element sends a seventh subscription data request message to the UDM network element, where the seventh subscription data request message carries the ID of the terminal and the LAN ID, the AMF network element receives a seventh subscription data response message sent by the UDM network element, where the seventh subscription data response message carries the service area information corresponding to the LAN ID, the AMF network element obtains the registration area information of the terminal from a context of the terminal, and the AMF network element obtains the LAN ID carried in the third PDU session management request, and obtains the service area information that corresponds to the LAN ID and that is carried in the seventh subscription data response message.

Then, that the AMF network element sends the LAN information of the terminal to the terminal may be implemented in the following manner. The AMF network element sends a third PDU session management response to the terminal, where the third PDU session management response includes the LAN information of the terminal.

The third PDU session management request may be a PDU session establishment request, a PDU session modification request, or a PDU session release request. Correspondingly, the third PDU session management response may be a PDU session establishment response, a PDU session modification response, or a PDU session release response.

In Manner 3, after receiving the third PDU session management request, the AMF network element triggers the operation of determining the LAN information of the terminal. The registered terminal has established a separate signaling connection with the AMF network element. In this case, after receiving the third PDU session management request through a dedicated channel between the AMF network element and the terminal, the AMF network element may learn of the ID of the terminal, and may determine the registration area information of the terminal based on context information that is stored during registration of the terminal. In addition, the AMF network element may further obtain the LAN ID carried in the third PDU session management request, and obtain the service area information that corresponds to the LAN ID and that is carried in the seventh subscription data response message. In this way, the AMF network element has obtained the LAN ID, the service area information corresponding to the LAN ID, and the registration area information of the terminal that are required for generating the LAN information.

That the third PDU session management request sent by the terminal to the AMF network element carries the LAN ID may mean that the terminal expects to perform local area network communication with a terminal in the LAN group. The terminal may send the third PDU session management request to the AMF network element. After receiving the third PDU session management request, the AMF network element triggers a process of determining the LAN information of the terminal. The AMF network element responds to the third PDU session management request. This indicates that the terminal can perform local area network communication with a terminal in the LAN group.

It should be noted that after receiving the third PDU session management request, the AMF network element processes a PDU session by interacting with the SMF network element, and then sends the third PDU session management response to the terminal. A PDU session processing procedure belongs to the other approaches. Therefore, details are not described in this embodiment of this application.

In addition, in Manner 3, the seventh subscription data request message sent by the AMF network element to the UDM network element may be not only used to request to obtain the service area information corresponding to the LAN ID, but also used to perform authentication on the terminal.

To be specific, after the AMF network element receives the third PDU session management request sent by the terminal, the AMF network element may send the seventh subscription data request message to the UDM network element, where the seventh subscription data request message carries the ID of the terminal and the LAN ID. Then, the AMF network element receives the seventh subscription data response message sent by the UDM network element, where the seventh subscription data response message carries the service area information corresponding to the LAN ID. The AMF network element receives the seventh subscription data response message. This indicates that the terminal can perform local area network communication with a terminal in the LAN group. In this case, the AMF network element may be triggered to perform the operation of determining the LAN information of the terminal.

Optionally, in Manner 3, if the second configuration parameter received by the UDM network element further includes the restriction information corresponding to the LAN ID or the restriction information of the terminal, the seventh subscription data response message may further carry the restriction information corresponding to the LAN ID or the restriction information of the terminal such that the AMF network element uses the restriction information when determining the LAN information of the terminal.

It should be noted that the foregoing three manners may be independently used for different terminals (that is, only one of the foregoing three manners is used for each terminal to implement determining and receiving of LAN information), or any combination of the foregoing three manners may be used for one terminal. For example, when a terminal initiates a registration request, LAN information of the terminal is determined in Manner 2. After a LAN group to which the terminal belongs is updated, updated LAN information of the terminal may be determined in Manner 1. In addition, when the terminal initiates a PDU session management request, the AMF may further re-determine LAN information of the terminal, and send the determined LAN information to the terminal such that LAN information of the terminal can be updated in a timely manner.

It can be learned from the foregoing descriptions of Embodiment C that, in comparison with Embodiment A and Embodiment B, in Embodiment C, the LSMF network element sends all parameters required for determining the LAN information of the terminal to the UDM network element, and the UDM network element selectively sends a parameter to the AMF network element. Therefore, the solution provided in Embodiment C reduces a workload of the AMF network element, and increases a workload of the UDM network element. In actual application, the solution provided in Embodiment A, Embodiment B, or Embodiment C may be selected and performed in different scenarios.

The foregoing describes Embodiment C. Based on a same concept, an embodiment of this application further provides a local area network communication management method. The method may be considered as a specific example of the method shown in FIG. 9A to FIG. 9C. As shown in FIG. 10A to FIG. 10D, the method includes the following steps.

1.1: An LSMF network element receives a group creation/update message from a NEF network element/an AF network element, and obtains a LAN ID, service area information (service area) corresponding to the LAN ID, an ID of UE in the local area network group, restriction information (restrictions 1) of the UE, and restriction information (restrictions 2) corresponding to the LAN ID.

1.2: The LSMF network element selects a UDM network element based on the service area information corresponding to the LAN ID.

The UDM network element selected by the LSMF network element may be all UDM network elements in a service area corresponding to the LAN ID.

2: The LSMF network element sends a configuration parameter 1 (Configure 1) to the selected UDM network element, where the configuration parameter 1 carries the LAN ID, the ID of the UE, the service area, the restrictions 1, and the restrictions 2.

A: When the UE has registered in the group, the following method may be used to update LAN information of the UE.

3A: When the UE has registered in the group, the UDM network element sends a subscription data update notification to an AMF network element serving the UE, where the subscription data update notification carries the LAN ID, the ID of the UE, the service area, the restrictions 1, and the restrictions 2.

4A: The AMF network element serving the UE determines registration area information of the UE based on the ID of the UE, and determines the LAN information of the UE based on the registration area information of the UE, the service area, the LAN ID, the restrictions 1, and the restrictions 2.

5A: The AMF network element sends the LAN information to the UE using a UE configuration update command in a UE configuration update procedure.

The UE configuration update command may be considered as a specific example of the foregoing second configuration update message.

B: When the UE has not registered in the group, the following method may be used to update LAN information of the UE.

3B: The UE sends a registration request message to an AMF network element, where the registration request message carries the ID of the UE.

4B: The AMF network element sends a subscription data request (carrying the ID of the UE) to the UDM network element, and the UDM network element returns a subscription data response message. If the UE has subscribed to the LAN service, the subscription data response message obtained by the AMF network element carries the subscribed LAN ID of the UE, the service area, the restrictions 1, and the restrictions 2. The AMF network element determines the LAN information of the UE based on registration area information dynamically generated for the UE in a registration procedure, the service area information corresponding to the LAN ID, the LAN ID, the restrictions 1, and the restrictions 2.

5B: The AMF network element sends the LAN information to the UE using a registration response message.

C: Configure LAN information of the UE in a session procedure.

3C: The UE sends a NAS message to an AMF network element, where the NAS message carries a session ID, the LAN ID, and a PDU session management request, where the PDU session management request may be a session establishment request, a session modification request, or a session release request.

4C: The AMF network element sends a subscription data request (carrying the ID of the UE and the LAN ID) to the UDM network element, and the UDM network element returns a subscription data response message, where the subscription data response message may carry the service area, the restrictions 1, and the restrictions 2. The AMF network element determines the LAN information based on the LAN ID, registration area information of the UE that is found in a local context, the service area, the restrictions 1, and the restrictions 2.

In addition, the AMF network element may request, using an existing session procedure, an SMF network element to process the session management request.

5C: The AMF network element sends a NAS message to the UE, where the NAS message carries the session ID, the LAN information, and a PDU session management response, to send the LAN information to the UE.

The PDU session management response may be obtained from the SMF network element.

6: After obtaining the LAN information, the UE may use the LAN ID in the LAN information as an LADN DNN, and restrict a LAN session of the UE by reusing a mechanism similar to an LADN mechanism, to restrict the UE to using a 5G LAN service.

Likewise, the AMF network element and the SMF network element may also use the LAN ID as an LADN DNN, and process a LAN session of the UE using a mechanism similar to an LADN mechanism.

The LAN information of the UE may further include the restrictions 1 and the restrictions 2, where the restrictions 1 and the restrictions 2 are used as reference information when the UE or a network element (for example, the AMF network element, the SMF network element, the UDM network element, or the LSMF network element) processes the LAN session.

Embodiment D

In Embodiment D, the LSMF network element does not send a configuration parameter to the UDM network element, but locally stores information such as LAN subscription information of the terminal and the service area information corresponding to the LAN ID, and then the LSMF network element may directly send the information to the AMF network element, or send the information to the AMF network element according to a request of the AMF network element such that the AMF network element uses the information when determining the LAN information of the terminal.

Figure 11:
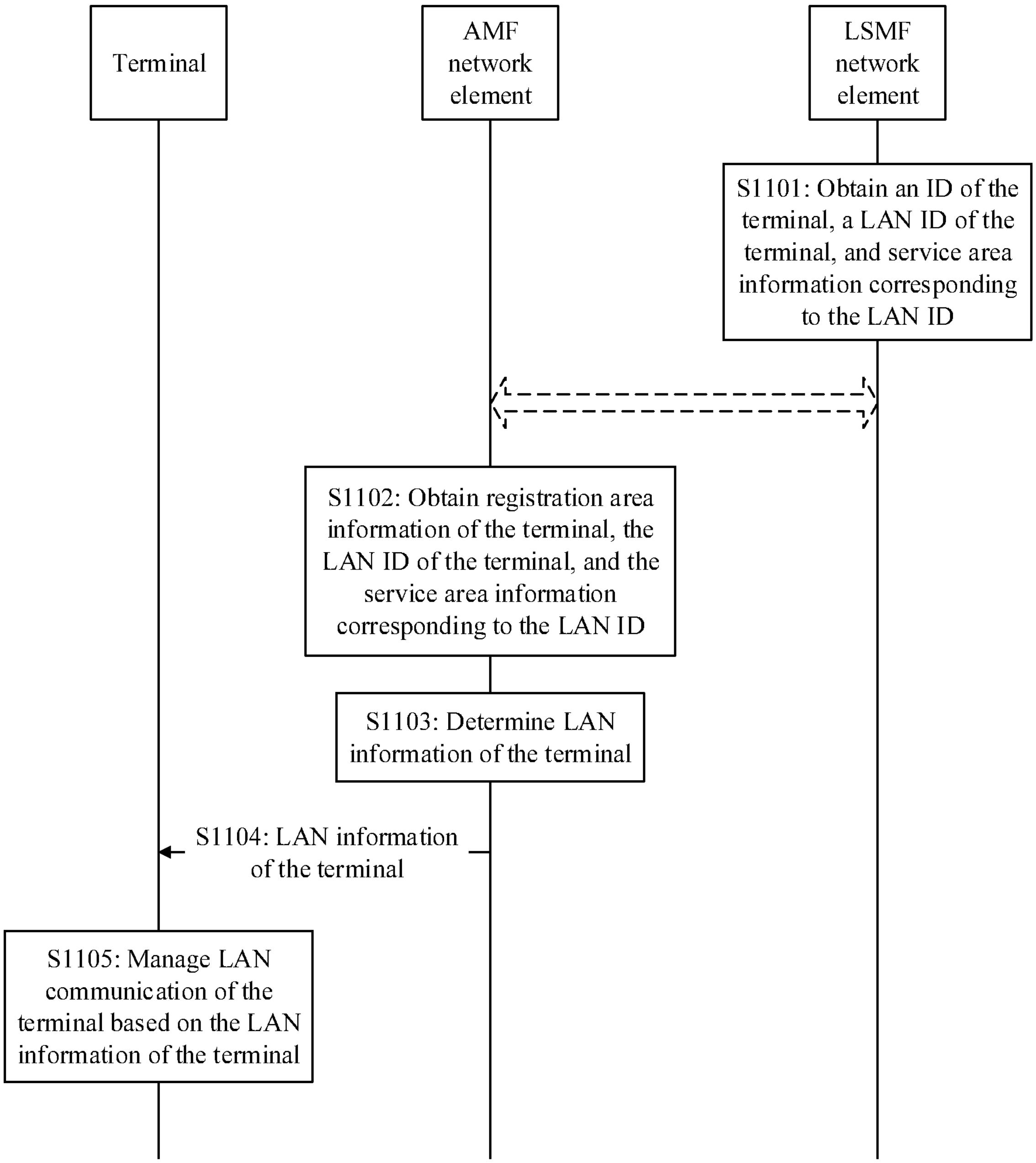
FIG. 11 is a schematic flowchart of an eighth local area network communication management method according to an embodiment of this application.

With reference to the foregoing descriptions of the local area network communication management method shown in FIG. 4, if the solution in Embodiment D is used, the local area network communication management method shown in FIG. 4 may be shown in FIG. 11. In FIG. 11, the method includes the following steps.

S1101: An LSMF network element obtains an ID of a terminal, a LAN ID of the terminal, and service area information corresponding to the LAN ID.

In addition, if restriction information corresponding to the LAN ID and restriction information of the terminal are further configured in a creation/update process for a LAN group identified by the LAN ID, the LSMF network element may further obtain the restriction information in S1101.

A specific implementation in which the LSMF network element obtains the ID of the terminal, the LAN ID of the terminal, and the service area information corresponding to the LAN ID (using a group management request) in S1101 is the same as a specific implementation in which the LSMF network element obtains the ID of the terminal, the LAN ID of the terminal, and the service area information corresponding to the LAN ID in S401. Details are not repeatedly described herein.

S1102: An AMF network element obtains registration area information of the terminal, a LAN ID of the terminal, and service area information corresponding to the LAN ID.

In addition, if the restriction information corresponding to the LAN ID and the restriction information of the terminal are further configured in the creation/update process for the LAN group identified by the LAN ID, the AMF network element may further obtain the restriction information in S1102 such that the AMF network element uses the restriction information when determining LAN information of the terminal.

S1103: The AMF network element determines LAN communication area information of the terminal based on the registration area information of the terminal and the service area information corresponding to the LAN ID.

S1104: The AMF network element sends the LAN information of the terminal to the terminal.

The LAN information of the terminal includes the LAN ID and the LAN communication area information of the terminal.

In addition, if the AMF network element further obtains the restriction information of the terminal or the restriction information corresponding to the LAN ID in S1102, the LAN information of the terminal may further include the restriction information. When managing LAN communication of the terminal based on the LAN information, the terminal or a network element (for example, the AMF network element, an SMF network element, a UDM network element, or the LSMF network element) further needs to consider the restriction information. For a specific manner, refer to the foregoing related description of the LAN information of the terminal. Details are not described herein again.

S1105: The terminal manages LAN communication of the terminal based on the LAN information.

A specific manner in which the terminal manages LAN communication of the terminal based on the LAN information in S1105 is the same as the specific manner in which the terminal manages LAN communication of the terminal based on the LAN information in S406. Details are not repeatedly described herein.

In addition, another network element in a network may also manage local area network communication of the terminal based on the LAN information of the terminal. A specific implementation is also described in the method shown in FIG. 4. Details are not described herein again.

It should be noted that in step S1102 in Embodiment D, the AMF network element may obtain, using different interaction procedures between the AMF network element and the LSMF network element, the LAN ID of the terminal and the service area information corresponding to the LAN ID.

For example, when the terminal has registered with the network, the LSMF network element may directly send the LAN ID of the terminal and the service area information corresponding to the LAN ID to the AMF network element using a configuration update message such that the AMF network element determines the LAN information.

For example, when the terminal has not registered with the network, and the terminal initiates a registration request, the LSMF network element may send the LAN ID of the terminal and the service area information corresponding to the LAN ID to the AMF network element such that the AMF network element determines the LAN information.

For example, alternatively, when the terminal initiates a PDU session management request, the LSMF may send the LAN ID of the terminal and the service area information corresponding to the LAN ID to the AMF network element such that the AMF network element determines the LAN information.

In addition, because the AMF network element generates and stores the registration area information of the terminal, the AMF network element may locally obtain the registration area information of the terminal in S1102.

The following describes, with reference to the accompanying drawing, three specific implementations of step S1102 in which the AMF network element obtains the registration area information of the terminal, the LAN ID of the terminal, and the service area information corresponding to the LAN ID.

Manner 1:

When the terminal has registered with the network, if the LSMF network element receives a group creation request or a group update request, the LSMF network element sends a subscription data update notification to the AMF network element. When the AMF network element receives the subscription data update notification of the terminal, and the subscription data update notification includes the LAN ID of the terminal (that is, subscription data of the terminal for local area network communication in the LAN group changes), the AMF network element may trigger an operation of determining the LAN information of the terminal, and send the LAN information of the terminal to the terminal using a configuration update message. In this way, the terminal can update LAN information in a timely manner, and manage local area network communication of the terminal based on latest LAN information.

Further, when Manner 1 is used, that an AMF network element obtains registration area information of the terminal, a LAN ID of the terminal, and service area information corresponding to the LAN ID in S1102 may be implemented in the following manner. The AMF network element receives a second subscription data update notification sent by the LSMF network element, where the second subscription data update notification includes the LAN ID, the service area information corresponding to the LAN ID, and the ID of the terminal, the AMF obtains the registration area information of the terminal based on the ID of the terminal that is carried in the second subscription data update notification, and the AMF network element obtains the LAN ID and the service area information corresponding to the LAN ID that are carried in the second subscription data update notification.

Then, that the AMF network element sends the LAN information of the terminal to the terminal may be implemented in the following manner. The AMF network element sends a second configuration update message to the terminal, where the second configuration update message includes the LAN information of the terminal.

In manner 1, when the terminal has registered with the network, the AMF network element stores a context of the terminal. After receiving the second subscription data update notification, the AMF network element may search the context to obtain registration area information corresponding to the ID of the terminal that is carried in the second subscription data update notification, that is, the registration area information of the terminal. In addition, the AMF network element may further obtain the LAN ID and the service area information corresponding to the LAN ID that are carried in the second subscription data update notification. In this way, the AMF network element has obtained, from the LSMF network element, the LAN ID, the service area information corresponding to the LAN ID, and the registration area information of the terminal that are required for generating the LAN information.

That is, in Manner 1, if the LSMF determines that the terminal has registered with the network, the LSMF network element may directly send the LAN ID, the service area information corresponding to the LAN ID, and the ID of the terminal to the AMF network element using the second subscription data update notification. In this way, the AMF network element can determine the LAN information of the registered terminal based on the LAN ID, the service area information corresponding to the LAN ID, and the ID of the terminal, and send the LAN information to the terminal, and the registered terminal can perform local area network communication based on the LAN information of the terminal.

In addition, the second subscription data update notification received by the AMF network element may further include the restriction information corresponding to the LAN ID or the restriction information of the terminal.

Manner 2:

When the terminal initiates a registration request, the AMF network element may trigger an operation of determining the LAN information of the terminal, that is, request, from the LSMF network element, information such as the LAN ID and the service area information corresponding to the LAN ID, and determine the LAN information of the terminal based on information returned by the LSMF network element. Then, the AMF network element sends the LAN information of the terminal to the terminal using a registration response message. In this way, after a registration procedure is completed, the terminal can manage local area network communication based on the LAN information.

Further, when Manner 2 is used, that an AMF network element obtains registration area information of the terminal, a LAN ID of the terminal, and service area information corresponding to the LAN ID in S1102 may be implemented in the following manner. The AMF network element receives a second registration request message sent by the terminal, where the second registration request message carries the ID of the terminal, the AMF network element sends a second subscription data request message to the LSMF network element, where the second subscription data request message carries the ID of the terminal, the AMF network element receives a second subscription data response message sent by the LSMF network element, where the second subscription data response message carries the LAN ID and the service area information corresponding to the LAN ID, the AMF network element generates the registration area information of the terminal, and the AMF network element obtains the LAN ID and the service area information corresponding to the LAN ID that are carried in the second subscription data response message.

Further, before the AMF network element sends a LAN information obtaining request to the LSMF network element, the AMF network element may receive the second registration request message sent by the terminal, where the second registration request message carries the ID of the terminal. In addition, the AMF network element may obtain LAN indication information of the terminal from the second registration request message, or the AMF network element may obtain LAN subscription information of the terminal from the UDM network element. The LAN indication information or the LAN subscription information is used to indicate that the terminal needs to use a LAN service indicated by the LAN ID.

For example, the LAN indication information may be the LAN ID. When the second registration request message sent by the terminal to the AMF network element carries the LAN ID, the LAN ID is used to indicate that the terminal needs to use the LAN service corresponding to the LAN ID. Alternatively, the LAN indication information or the LAN subscription information is a binary indication and used to indicate that the terminal needs to use the LAN service indicated by the LAN ID.

When receiving the LAN indication information carried in the second registration request message or the LAN subscription information of the terminal that is sent by the UDM network element, the AMF network element determines that the terminal needs to use the LAN service indicated by the LAN ID. In this way, the AMF network element requests to obtain, from the LSMF network element, the LAN ID of the terminal and the service area information corresponding to the LAN ID.

Then, that the AMF network element sends the LAN information of the terminal to the terminal may be implemented in the following manner. The AMF network element sends a second registration response message to the terminal, where the second registration response message includes the LAN information of the terminal.

In Manner 2, after receiving the second registration request message, the AMF network element triggers the operation of determining the LAN information of the terminal. In the registration procedure corresponding to the terminal, the AMF network element dynamically generates the registration area information of the terminal that requests registration. Therefore, in Manner 2, after receiving the second subscription data response message, the AMF network element can generate the registration area information of the terminal. In addition, the second subscription data response message carries the LAN ID. This indicates that the LSMF network element adds, to the LAN group identified by the LAN ID, the terminal that requests registration. The LSMF network element has obtained, during creation of the LAN group, the LAN ID of the LAN group and the service area information corresponding to the LAN ID. Therefore, the LSMF network element may send the service area information corresponding to the LAN ID to the AMF network element using the second subscription data response message. In this way, the AMF network element has obtained the LAN ID, the service area information corresponding to the LAN ID, and the registration area information of the terminal that are required for generating the LAN information.

Optionally, the second subscription data response message received by the AMF network element further includes the restriction information corresponding to the LAN ID and the restriction information of the terminal.

Manner 3:

When the terminal has registered with the network, and the terminal initiates a PDU session management request, the AMF network element may further trigger an operation of determining the LAN information of the terminal, and send the LAN information of the terminal to the terminal using a PDU session management response. In this way, the terminal can update LAN information in a timely manner, and manage local area network communication based on latest LAN information.

Further, when Manner 3 is used, that an AMF network element obtains registration area information of the terminal, a LAN ID of the terminal, and service area information corresponding to the LAN ID in S1102 may be implemented in the following manner. The AMF network element receives a third PDU session management request sent by the terminal, where the third PDU session management request carries the LAN ID, the AMF network element sends a seventh subscription data request message to the LSMF network element, where the seventh subscription data request message carries the ID of the terminal and the LAN ID, the AMF network element receives a seventh subscription data response message sent by the LSMF network element, where the seventh subscription data response message carries the service area information corresponding to the LAN ID, the AMF network element obtains the registration area information of the terminal from a context of the terminal, and the AMF network element obtains the LAN ID carried in the third PDU session management request, and obtains the service area information that corresponds to the LAN ID and that is carried in the seventh subscription data response message.

Then, that the AMF network element sends the LAN information of the terminal to the terminal may be implemented in the following manner. The AMF network element sends a third PDU session management response to the terminal, where the third PDU session management response includes the LAN information of the terminal.

The third PDU session management request may be a PDU session establishment request, a PDU session modification request, or a PDU session release request. Correspondingly, the third PDU session management response may be a PDU session establishment response, a PDU session modification response, or a PDU session release response.

In Manner 3, after receiving the third PDU session management request, the AMF network element triggers the operation of determining the LAN information of the terminal. The registered terminal has established a separate signaling connection with the AMF network element. In this case, after receiving the third PDU session management request through a dedicated channel between the AMF network element and the terminal, the AMF network element may learn of the ID of the terminal, and may determine the registration area information of the terminal based on context information that is stored during registration of the terminal. In addition, the AMF network element may further obtain the LAN ID carried in the third PDU session management request, and obtain the service area information that corresponds to the LAN ID and that is carried in the seventh subscription data response message. In this way, the AMF network element has obtained the LAN ID, the service area information corresponding to the LAN ID, and the registration area information of the terminal that are required for generating the LAN information.

That the third PDU session management request sent by the terminal to the AMF network element carries the LAN ID may mean that the terminal expects to perform local area network communication with a terminal in the LAN group. The terminal may send the third PDU session management request to the AMF network element. After receiving the third PDU session management request, the AMF network element triggers a process of determining the LAN information of the terminal. The AMF network element responds to the third PDU session management request. This indicates that the terminal can perform local area network communication with a terminal in the LAN group.

It should be noted that after receiving the third PDU session management request, the AMF network element processes a PDU session by interacting with the SMF network element, and then sends the third PDU session management response to the terminal. A PDU session processing procedure belongs to the other approaches. Therefore, details are not described in this embodiment of this application.

In addition, in Manner 3, the seventh subscription data request message sent by the AMF network element to the LSMF network element may be not only used to request to obtain the service area information corresponding to the LAN ID, but also used to perform authentication on the terminal.

To be specific, after the AMF network element receives the third PDU session management request sent by the terminal, the AMF network element may send the seventh subscription data request message to the LSMF network element, where the seventh subscription data request message carries the ID of the terminal and the LAN ID. Then, the AMF network element receives the seventh subscription data response message sent by the LSMF network element, where the seventh subscription data response message carries the service area information corresponding to the LAN ID. The AMF network element receives the seventh subscription data response message. This indicates that the terminal can perform local area network communication with a terminal in the LAN group. In this case, the AMF network element may be triggered to perform the operation of determining the LAN information of the terminal.

Optionally, in Manner 3, the seventh subscription data response message received by the AMF network element may further carry the restriction information corresponding to the LAN ID or the restriction information of the terminal such that the AMF network element uses the restriction information when determining the LAN information of the terminal.

It should be noted that the foregoing three manners may be independently used for different terminals (that is, only one of the foregoing three manners is used for each terminal to implement determining and receiving of LAN information), or any combination of the foregoing three manners may be used for one terminal. For example, when a terminal initiates a registration request, LAN information of the terminal is determined in Manner 2. After a LAN group to which the terminal belongs is updated, updated LAN information of the terminal may be determined in Manner 1. In addition, when the terminal initiates a PDU session management request, the AMF may further re-determine LAN information of the terminal, and send the determined LAN information to the terminal such that LAN information of the terminal can be updated in a timely manner.

It can be learned from the foregoing descriptions of Embodiment D that a difference between Embodiment C and Embodiment D lies in the following. In Embodiment C, the LSMF network element sends information (the second configuration parameter) required for determining the LAN information of the terminal to the UDM network element, and the UDM network element directly forwards the information or forwards the information according to a request of the AMF network element. However, in Embodiment D, the LSMF network element does not send the second configuration parameter to the UDM network element. Instead, the LSMF network element sends information (such as the LAN ID and the service area information corresponding to the LAN ID) required for determining the LAN information of the terminal to the AMF network element directly or according to a request of the AMF network element. Therefore, the solution provided in Embodiment D can reduce a workload of the UDM network element. In actual application, the solution provided in Embodiment A, Embodiment B, Embodiment C, or Embodiment D may be selected and performed in different scenarios.

Figure 12A:
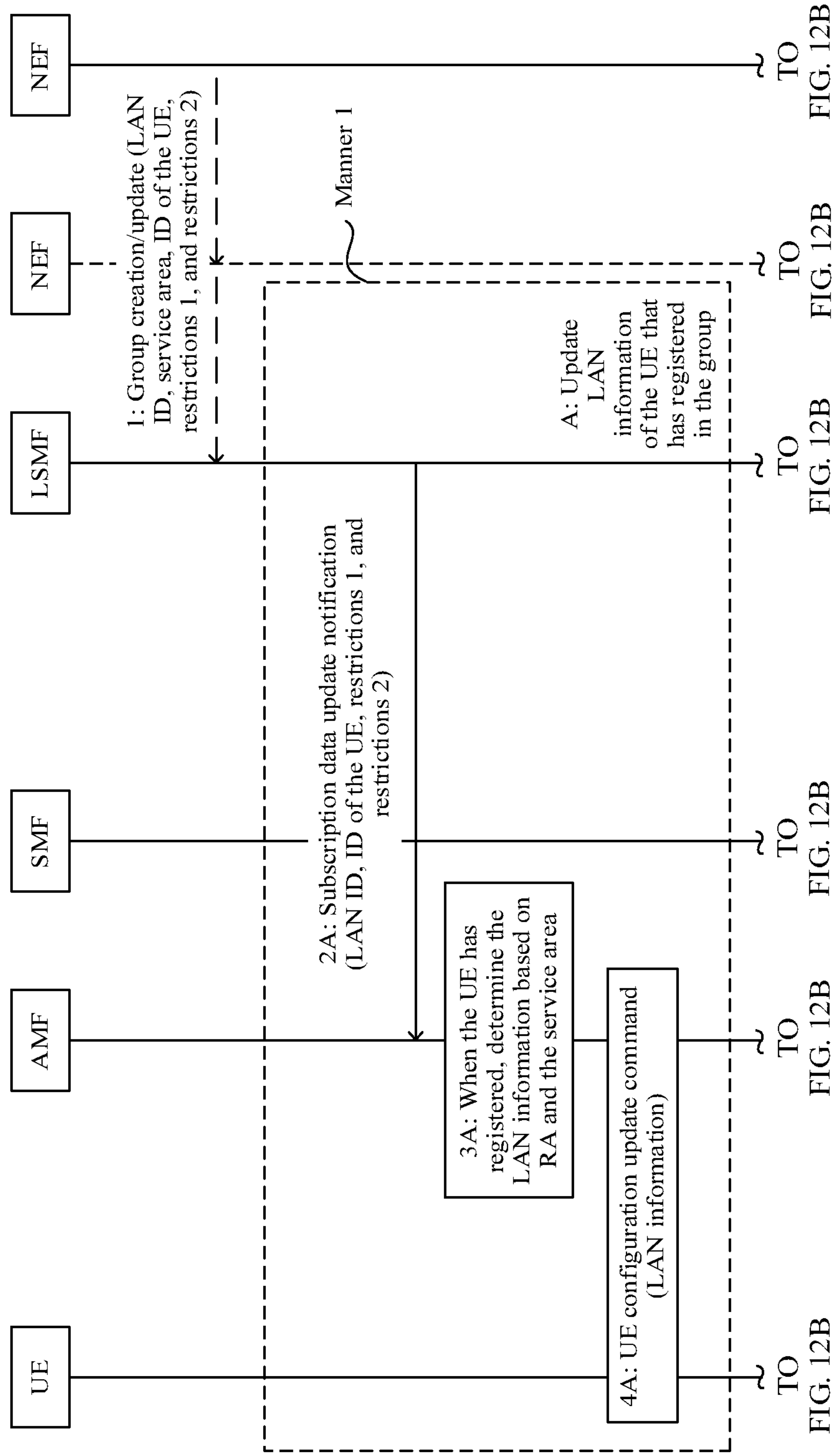
FIG. 12A, FIG. 12B, and FIG. 12C are a schematic flowchart of a ninth local area network communication management method according to an embodiment of this application.
Figure 12B:
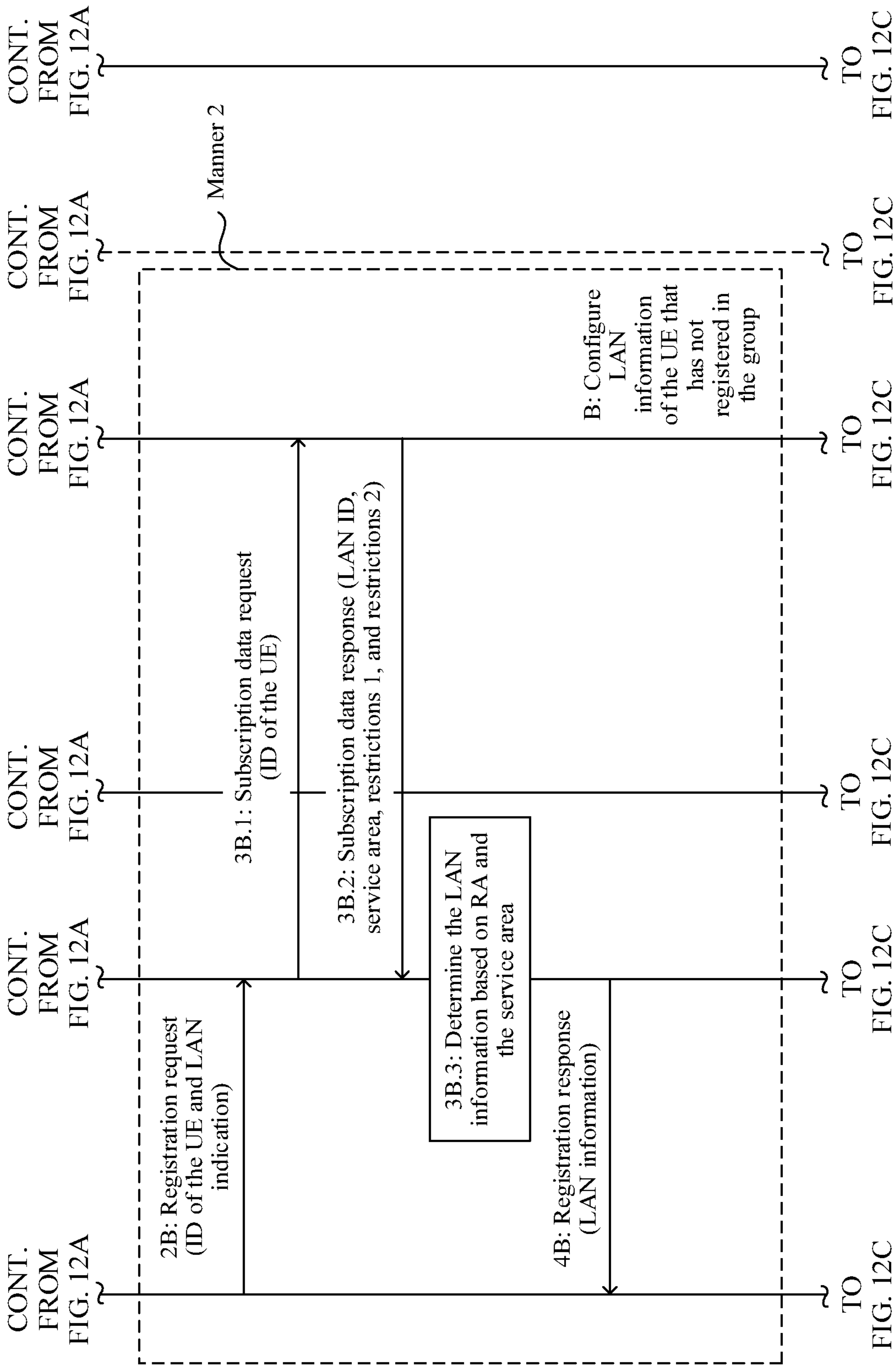
Figure 12C:
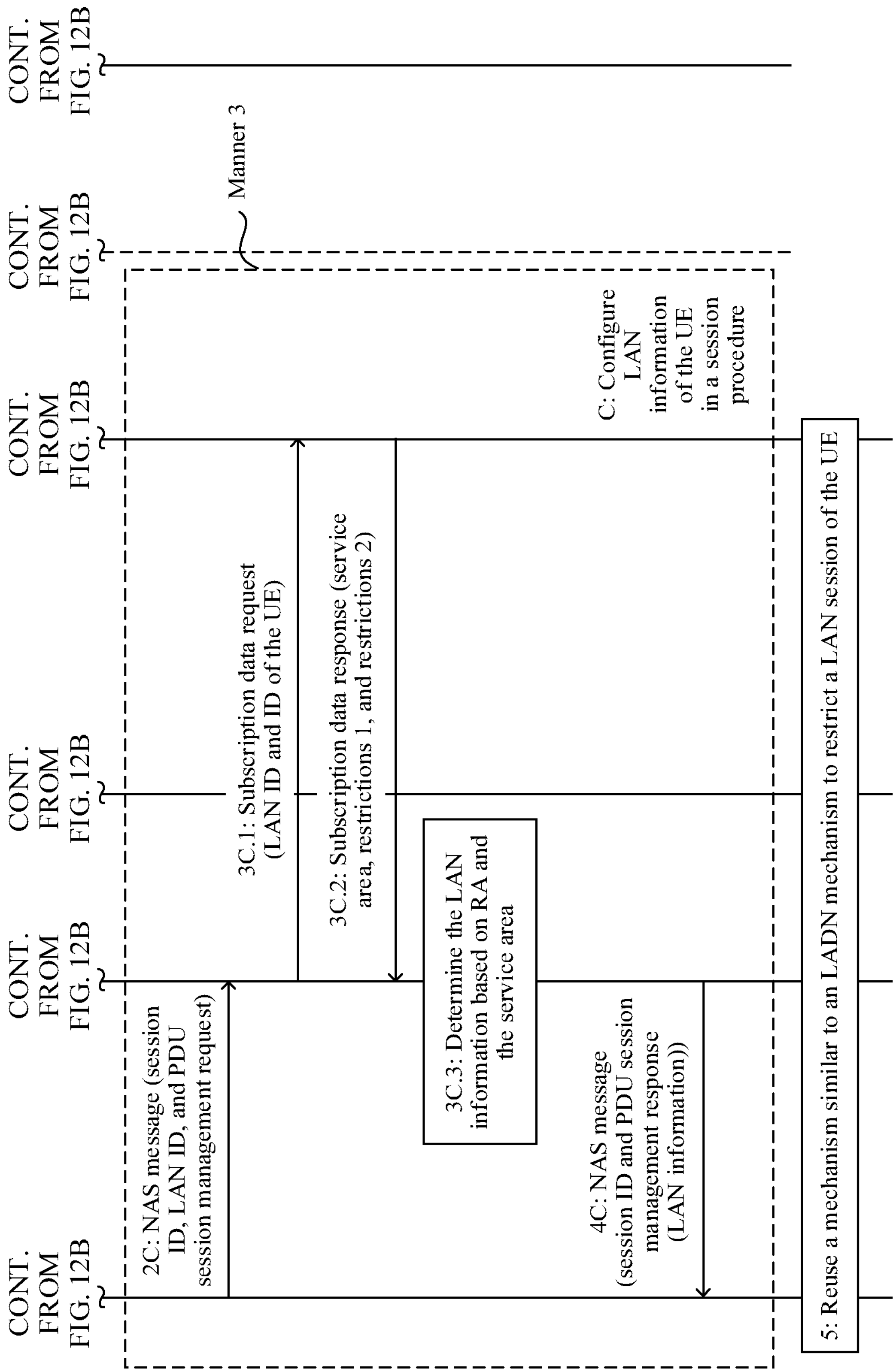

The foregoing describes Embodiment D. Based on a same concept, an embodiment of this application further provides a local area network communication management method. The method may be considered as a specific example of the method shown in FIG. 11. As shown in FIG. 12A to FIG. 12C, the method includes the following steps.

1: An LSMF network element receives a group creation/update message from a NEF network element/an AF network element, and obtains a LAN ID, service area information (service area) corresponding to the LAN ID, an ID of UE in the local area network group, restriction information (restrictions 1) of the UE, and restriction information (restrictions 2) corresponding to the LAN ID.

A: When the UE has registered in the group, the following method may be used to update LAN information of the UE (which is equivalent to Manner 1).

2A: When the UE has registered in the group, the LSMF network element sends a subscription data update notification to an AMF network element serving the UE, where the subscription data update notification carries the LAN ID, the ID of the UE, the service area, the restrictions 1, and the restrictions 2.

3A: The AMF network element serving the UE determines registration area information of the UE based on the ID of the UE, and determines the LAN information of the UE based on the registration area information of the UE, the service area, the LAN ID, the restrictions 1, and the restrictions 2.

4A: The AMF network element sends the LAN information to the UE using a UE configuration update command in a UE configuration update procedure.

The UE configuration update command may be considered as a specific example of the foregoing second configuration update message.

B: When the UE has not registered in the group, the following method may be used to update LAN information of the UE (which is equivalent to Manner 2).

2B: The UE sends a registration request message to an AMF network element, where the registration request message carries the ID of the UE.

3B: The AMF network element obtains LAN indication information of the UE from a registration request message or obtains LAN subscription information of the UE from a UDM network element, the AMF network element is triggered to send a subscription data request (carrying the ID of the UE) to the LSMF network element, and the LSMF network element returns a subscription data response message. If the UE has subscribed to the LAN service, the subscription data response message obtained by the AMF network element carries the subscribed LAN ID of the UE, the service area, the restrictions 1, and the restrictions 2. The AMF network element determines the LAN information of the UE based on registration area information dynamically generated for the UE in a registration procedure, the service area information corresponding to the LAN ID, the LAN ID, the restrictions 1, and the restrictions 2.

4B: The AMF network element sends the LAN information to the UE using a registration response message.

C: Configure LAN information of the UE in a session procedure (which is equivalent to Manner 3).

2C: The UE sends a NAS message to an AMF network element, where the NAS message carries a session ID, the LAN ID, and a PDU session management request, where the PDU session management request may be a session establishment request, a session modification request, or a session release request.

3C: The AMF network element sends a subscription data request (carrying the ID of the UE and the LAN ID) to the LSMF network element, and the LSMF network element returns a subscription data response message, where the subscription data response message may carry the service area, the restrictions 1, and the restrictions 2. The AMF network element determines the LAN information based on the LAN ID, registration area information of the UE that is found in a local context, the service area, the restrictions 1, and the restrictions 2.

In addition, the AMF network element may request, using an existing session procedure, an SMF network element to process the session management request.

4C: The AMF network element sends a NAS message to the UE, where the NAS message carries the session ID, the LAN information, and a PDU session management response, to send the LAN information to the UE.

The PDU session management response may be obtained from the SMF network element.

5: After obtaining the LAN information, the UE may use the LAN ID in the LAN information as an LADN DNN, and restrict a LAN session of the UE by reusing a mechanism similar to an LADN mechanism, to restrict the UE to using a 5G LAN service.

Likewise, the AMF network element and the SMF network element may also use the LAN ID as an LADN DNN, and process a LAN session of the UE using a mechanism similar to an LADN mechanism.

The LAN information of the UE may further include the restrictions 1 and the restrictions 2, where the restrictions 1 and the restrictions 2 are used as reference information when the UE or a network element (for example, the AMF network element, an SMF network element, the LSMF network element, or the UDM network element) processes the LAN session.

Embodiment 2

Figure 13:
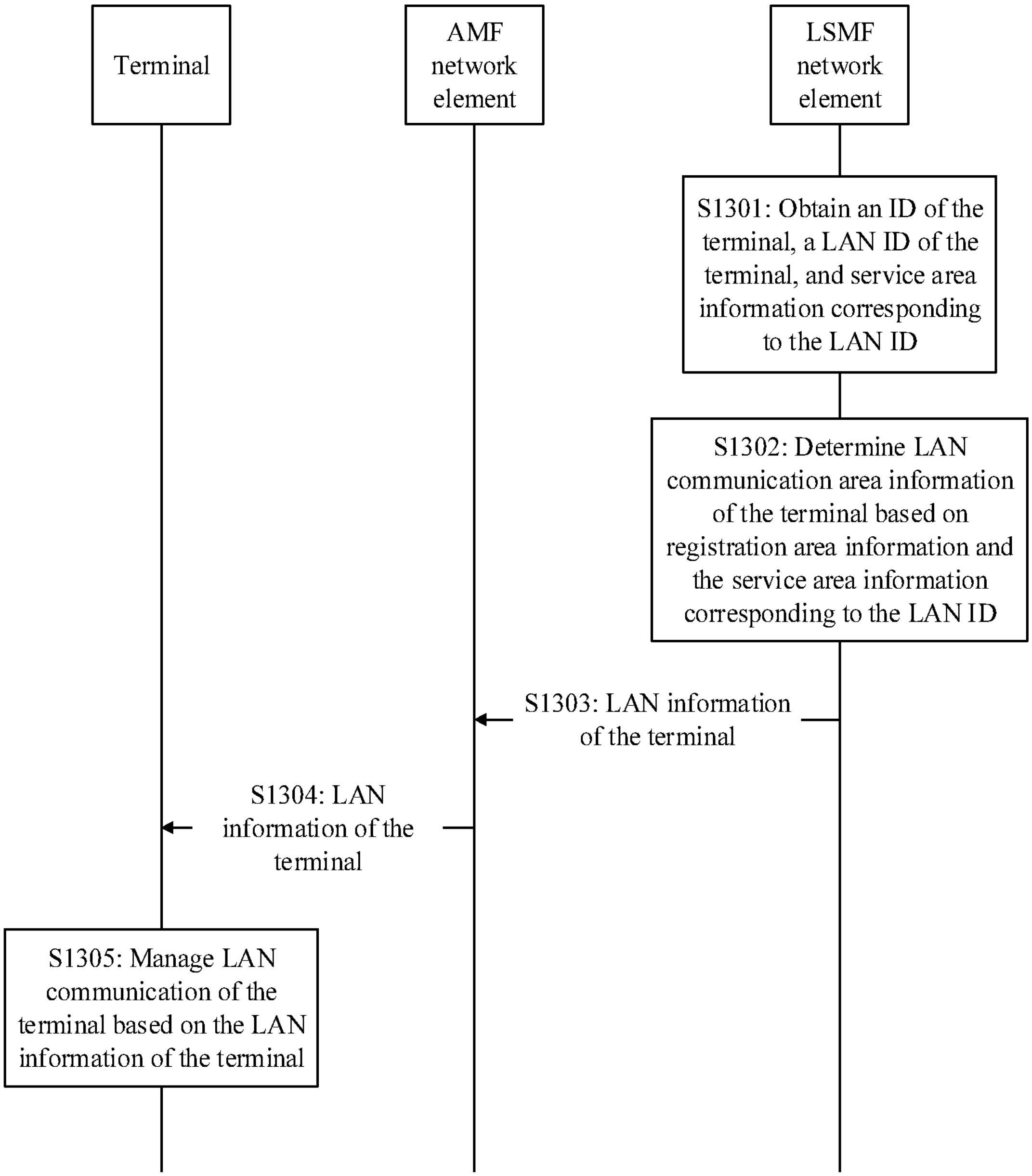
FIG. 13 is a schematic flowchart of a tenth local area network communication management method according to an embodiment of this application.
Figure 14A:
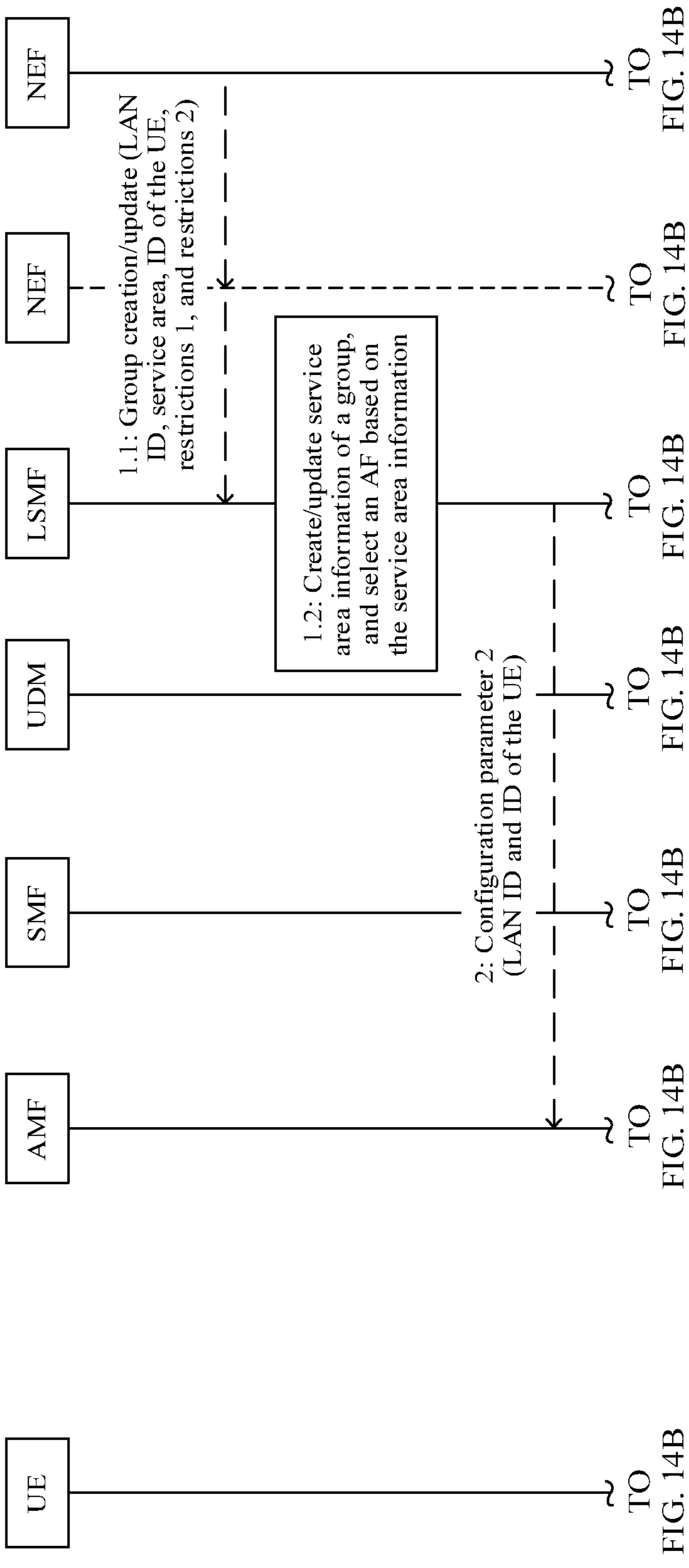
FIG. 14A, FIG. 14B, FIG. 14C, and FIG. 14D are a schematic flowchart of an eleventh local area network communication management method according to an embodiment of this application.
Figure 14B:
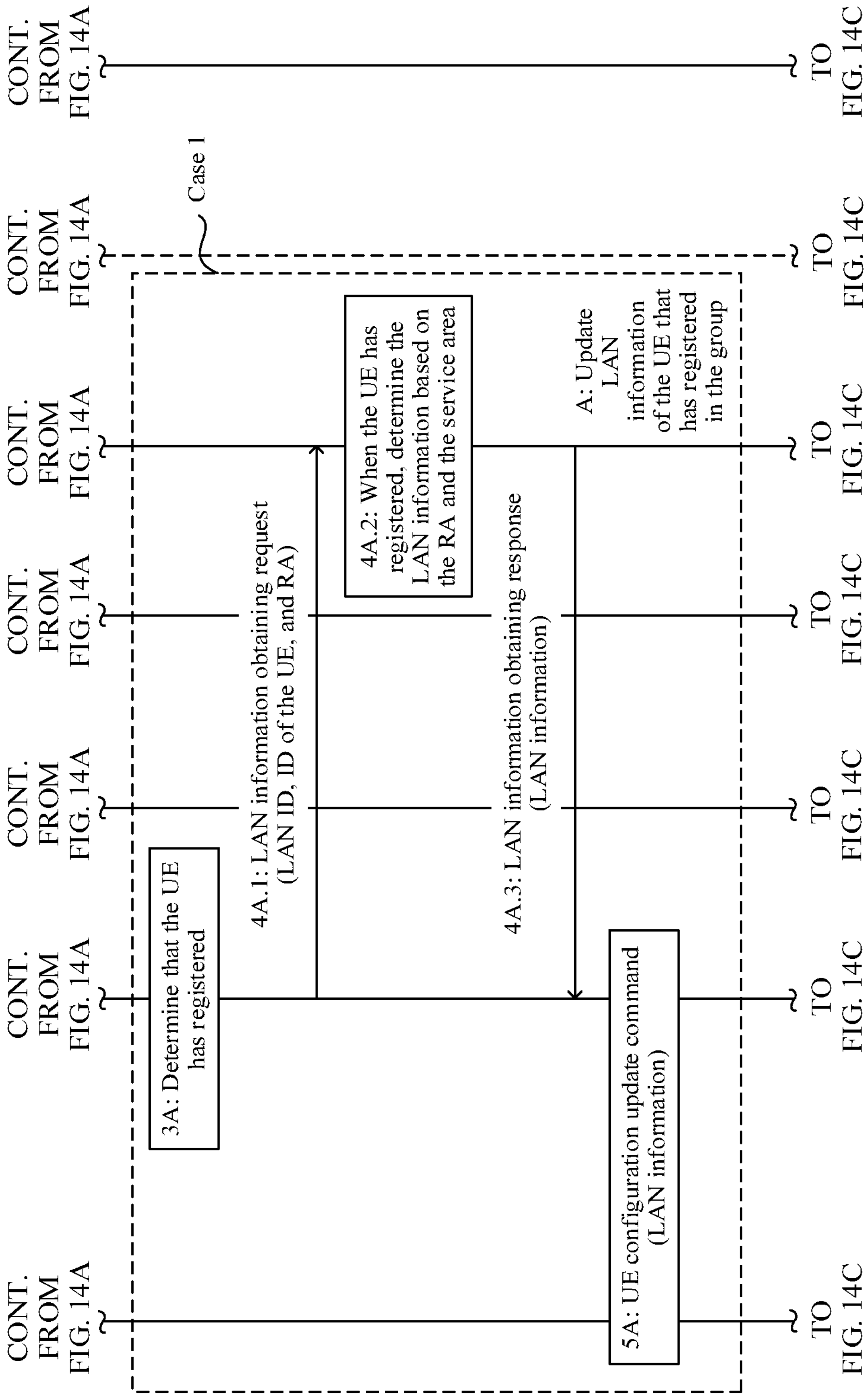
Figure 14C:
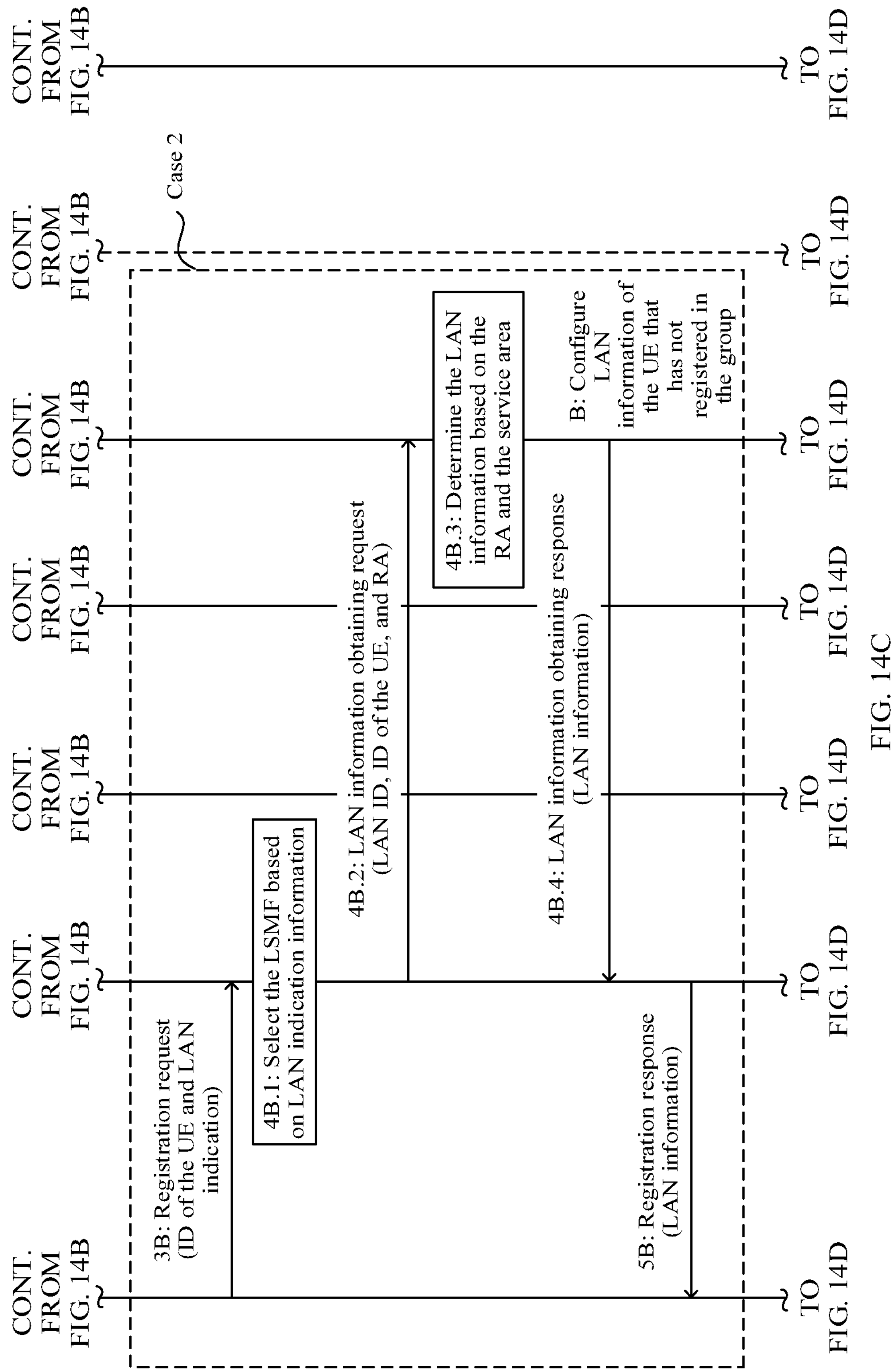
Figure 14D:
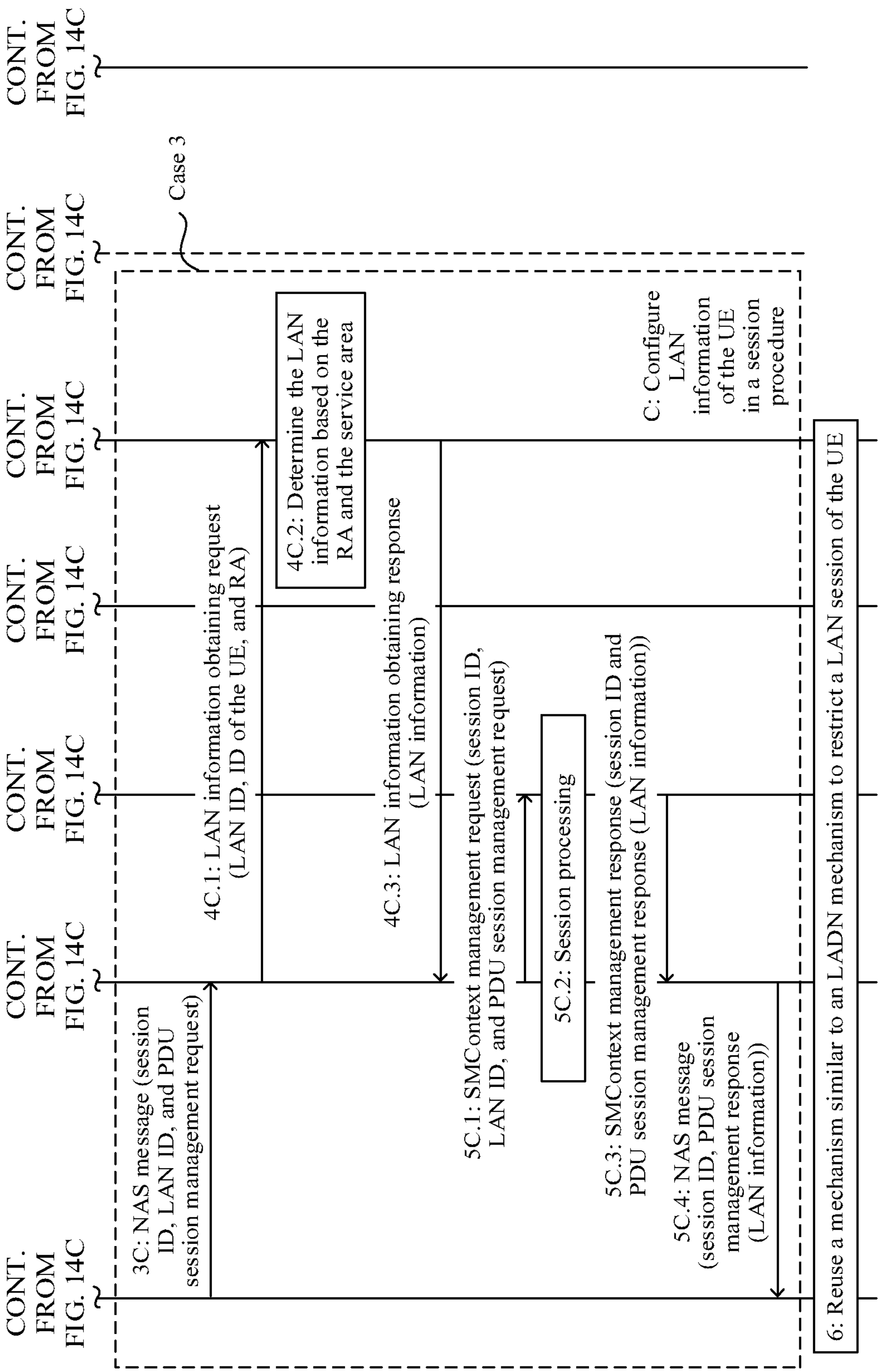

As shown in FIG. 13, a local area network communication management method provided in this embodiment of this application includes the following steps.

S1301: An LSMF network element obtains registration area information of a terminal, an ID of the terminal, a LAN ID of the terminal, and service area information corresponding to the LAN ID. A specific implementation in which the LSMF network element obtains the ID of the terminal, the LAN ID of the terminal, and the service area information corresponding to the LAN ID (using a group management request) in S1301 is the same as a specific implementation in which the LSMF network element obtains the ID of the terminal, the LAN ID of the terminal, and the service area information corresponding to the LAN ID in S401. Details are not repeatedly described herein.

It should be noted that the ID of the terminal that is obtained by the LSMF network element in S1301 is an ID of a group member in a LAN group identified by the LAN ID, and the terminal is not necessarily a designated terminal configured to send the group management request to the LSMF network element. After receiving the group management request, the LSMF network element may obtain a terminal list (a UE list). The list includes IDs of all terminals in the LAN group identified by the LAN ID. An AMF network element may subsequently determine LAN information of a terminal in the terminal list in different scenarios. The terminal indicated by the ID of the terminal that is obtained in S1301 is a terminal for which LAN information subsequently needs to be determined.

It should be noted that, if restriction information corresponding to the LAN ID and restriction information of the terminal are further configured in a creation/update process for the LAN group identified by the LAN ID, the LSMF network element may further obtain the restriction information in S1301.

In addition, because the AMF network element generates and stores the registration area information of the terminal, the LSMF network element may obtain the registration area information of the terminal from the AMF network element in S1301. For example, the AMF network element may send, to the LSMF network element, a LAN information obtaining request that carries the registration area information of the terminal. Related content is to be described in the following description of the LAN information obtaining request. Details are not described herein.

S1302: The LSMF network element determines LAN communication area information of the terminal based on the registration area information and the service area information corresponding to the LAN ID.

Further, a condition for triggering the LSMF network element to determine LAN information of the terminal may be that the AMF network element sends the LAN information obtaining request to the LSMF network element, to request to obtain the LAN information of the terminal. To be specific, before the LSMF network element determines the LAN communication area information of the terminal based on the registration area information of the terminal and the service area information corresponding to the LAN ID, the LSMF network element may receive the LAN information obtaining request sent by the AMF network element. The LAN information obtaining request is used to request to obtain the LAN information of the terminal, and the LAN information obtaining request carries the LAN ID, the ID of the terminal, and the registration area information of the terminal. That the LSMF network element sends the LAN information of the terminal to the AMF network element may be implemented in the following manner. The LSMF network element sends a LAN information obtaining response to the AMF network element, where the LAN information obtaining response carries the LAN information of the terminal.

Herein, it should be noted that, because the AMF network element generates and stores the registration area information of the terminal, and the LSMF network element needs to determine the LAN information of the terminal based on the registration area information of the terminal, the LAN information obtaining request sent by the AMF network element to the LSMF network element needs to carry the registration area information of the terminal.

There is a plurality of conditions for triggering the AMF network element to send the LAN information obtaining request to the LSMF network element. The following describes, using examples, three cases in which the AMF network element is triggered to send the LAN information obtaining request to the LSMF network element.

Case 1:

When the LSMF network element sends a subscription data update notification to the AMF network element, and the subscription data update notification includes the LAN ID of the registered terminal (that is, subscription data of the terminal for local area network communication in the LAN group changes), the AMF network element needs to update LAN information of the terminal. In this case, the AMF network element may send the LAN information obtaining request to the LSMF network element, to request to obtain the LAN information of the terminal.

Further, before the AMF network element sends the LAN information obtaining request to the LSMF network element, the AMF network element may receive the subscription data update notification sent by the LSMF network element, where the subscription data update notification includes the LAN ID and the ID of the terminal. The AMF network element determines that the terminal has registered in the group corresponding to the LAN ID. Then, the AMF network element sends a configuration update message to the terminal, where the configuration update message carries the LAN information of the terminal.

In Case 1, after the subscription data of the terminal is updated, the LSMF network element notifies the AMF network element using the subscription data update notification. In this case, the AMF network element requests to obtain the LAN information of the terminal from the LSMF network element, and may update LAN information of the terminal in a timely manner. In this way, the terminal or a network element (for example, the AMF network element, an SMF network element, a UDM network element, or the LSMF network element) can manage local area network communication of the terminal based on updated LAN information.

Case 2:

The AMF network element receives a registration request message sent by the terminal that has not registered. In this case, the AMF network element may send the LAN information obtaining request to the LSMF network element, to request to obtain the LAN information of the terminal. In this way, after a registration procedure is completed, the terminal can manage local area network communication based on the LAN information.

Further, before the AMF network element sends the LAN information obtaining request to the LSMF network element, the AMF network element may receive the registration request message sent by the terminal, where the registration request message further carries the ID of the terminal. The AMF network element may obtain LAN indication information of the terminal from the registration request message, or the AMF network element may obtain LAN subscription information of the terminal from a UDM network element. The LAN indication information or the LAN subscription information is used to indicate that the terminal needs to use a LAN service indicated by the LAN ID.

For example, the LAN indication information may be the LAN ID. When the registration request message sent by the terminal to the AMF network element carries the LAN ID, the LAN ID is used to indicate that the terminal needs to use the LAN service corresponding to the LAN ID. Alternatively, the LAN indication information or the LAN subscription information is a binary indication and used to indicate that the terminal needs to use the LAN service indicated by the LAN ID.

When receiving the LAN indication information carried in the registration request message or the LAN subscription information of the terminal that is sent by the UDM, the AMF network element determines that the terminal needs to use the LAN service indicated by the LAN ID. The AMF network element may send the LAN information obtaining request to the LSMF network element, to obtain the LAN information of the terminal. In this way, after the registration procedure corresponding to the terminal is completed, the terminal or a network element (for example, the AMF network element, an SMF network element, the UDM network element, or the LSMF network element) can manage local area network communication of the terminal based on the LAN information.

Case 3:

When the terminal has registered with a network, and the terminal initiates a PDU session management request, the AMF may further send the LAN information obtaining request to the LSMF network element, to request to obtain LAN information of the terminal, and send the LAN information of the terminal to the terminal using a PDU session management response. In this way, the terminal can update LAN information in a timely manner, and manage local area network communication based on latest LAN information.

Further, before the AMF network element sends the LAN information obtaining request to the LSMF network element, the AMF network element may receive the PDU session management request sent by the terminal, where the PDU session management request carries the LAN ID, and the AMF network element determines the ID of the terminal according to the PDU session management request. Then, the AMF network element sends a PDU session management response message to the terminal, where the PDU session management response message carries the LAN information of the terminal.

The PDU session management request may be a PDU session establishment request, a PDU session modification request, or a PDU session release request. Correspondingly, the PDU session management response may be a PDU session establishment response, a PDU session modification response, or a PDU session release response.

In Case 3, after the terminal initiates the PDU session management request, the AMF network element requests to obtain the LAN information of the terminal from the LSMF network element, to update LAN information of the terminal in a timely manner. In this way, the terminal or a network element (for example, the AMF network element, an SMF network element, a UDM network element, or the LSMF network element) can manage local area network communication of the terminal based on updated LAN information.

S1303: The LSMF network element sends the LAN information of the terminal to the AMF network element.

The LAN information of the terminal includes the LAN ID and the LAN communication area information of the terminal.

Further, the LAN communication area information of the terminal may be considered as an intersection of the registration area information of the terminal and the service area information corresponding to the LAN ID. To be specific, a LAN communication area of the terminal may be considered as an intersection area of a registration area of the terminal and a service area corresponding to the LAN ID. If the restriction information of the terminal includes communication allowed area information, the LAN communication area information of the terminal may be considered as an intersection of the service area information corresponding to the LAN ID, the registration area information of the terminal, and the communication allowed area information of the terminal. To be specific, the LAN communication area of the terminal may be considered as an intersection area of the registration area of the terminal, the service area corresponding to the LAN ID, and a communication allowed area of the terminal.

In addition, if the LSMF network element further obtains the restriction information corresponding to the LAN ID and the restriction information of the terminal in S1301, the LAN information of the terminal may further include the restriction information corresponding to the LAN ID and the restriction information of the terminal. In this case, when managing LAN communication of the terminal based on the LAN information, the terminal or a network element (for example, the AMF network element, the SMF network element, the UDM network element, or the LSMF network element) further needs to consider the restriction information. For a specific manner, refer to the foregoing related description of the LAN information of the terminal. Details are not described herein again.

S1304: The AMF network element sends the LAN information of the terminal to the terminal.

S1305: The terminal manages LAN communication of the terminal based on the LAN information.

Further, a manner in which the terminal manages local area network communication of the terminal based on the LAN information of the terminal in S1305 is the same as the manner in which the terminal manages local area network communication of the terminal based on the LAN information of the terminal in S406. For related descriptions, refer to Embodiment 1. Details are not described herein again.

It can be learned from the foregoing descriptions of Embodiment 2 that, in comparison with Embodiment 1, in Embodiment 2, the LSMF network element does not send parameters required for determining the LAN information of the terminal to the UDM network element or the AMF network element, instead, when the AMF network element needs to determine the LAN information of the terminal, the AMF network element sends, to the LSMF network element, the LAN information obtaining request that carries the parameters, that is, the LAN ID, the ID of the terminal, and the registration area information of the terminal, and the LSMF network element determines the LAN information of the terminal and sends the LAN information to the AMF network element. It can be easily learned that the solution provided in Embodiment 2 reduces workloads of the AMF network element and the UDM network element, and increases a workload of the LSMF network element. In actual application, the solution provided in Embodiment 1 or Embodiment 2 may be selected and performed in different scenarios.

The foregoing describes Embodiment 2. Based on a same concept, an embodiment of this application further provides a local area network communication management method. The method may be considered as a specific example of the method shown in FIG. 13. As shown in FIG. 14A to FIG. 14D, the method includes the following steps.

1.1: An LSMF network element receives a group creation/update message from a NEF network element/an AF network element, and obtains a LAN ID, service area information (service area) corresponding to the LAN ID, an ID of UE in the local area network group, restriction information (restrictions 1) of the UE, and restriction information (restrictions 2) corresponding to the LAN ID.

1.2: The LSMF network element creates/updates service area information corresponding to the group, and selects an AMF network element based on the service area information corresponding to the LAN ID.

The AMF network element selected by the LSMF network element may be all AMF network elements in a service area corresponding to the LAN ID.

2: The LSMF network element sends a configuration parameter 2 (Configure 2) to the selected AMF network element, where the configuration parameter 2 carries the LAN ID and the ID of the UE.

A: When the UE has registered in the group, the following method may be used to update LAN information of the UE (which is equivalent to Case 1).

3A: The AMF network element determines that the UE has registered.

4A: The AMF network element sends a LAN information obtaining request to the LSMF network element, to request to obtain the LAN information of the UE, where the LAN information obtaining request carries the LAN ID of the UE, the ID of the UE, and registration area information of the UE. The LSMF network element determines, based on the LAN ID, the service area information corresponding to the LAN ID, and then determines the LAN information of the UE based on the registration area information of the UE, the service area information corresponding to the LAN ID, the LAN ID, the restrictions 1, and the restrictions 2. Then, the LSMF network element sends the LAN information of the UE to the AMF using a LAN information obtaining response message.

5A: The AMF network element sends the LAN information to the UE using a UE configuration update command in a UE configuration update procedure.

The UE configuration update command may be considered as a specific example of the configuration update message in the method shown in FIG. 13.

B: When the UE has not registered in the group, the following method may be used to update LAN information of the UE (which is equivalent to Case 2).

3B: The UE sends a registration request message to the AMF network element, where the registration request message carries the ID of the UE and LAN indication information.

4B: The AMF network element selects the LSMF network element based on the LAN indication information, and sends a LAN information obtaining request to the selected LSMF network element, to request to obtain the LAN information of the UE, where the LAN information obtaining request carries the LAN ID of the UE, the ID of the UE, and registration area information of the UE. The LSMF network element determines, based on the LAN ID, the service area information corresponding to the LAN ID, and then determines the LAN information of the UE based on the registration area information of the UE, the service area information corresponding to the LAN ID, the LAN ID, the restrictions 1, and the restrictions 2. Then, the LSMF network element sends the LAN information of the UE to the AMF network element using a LAN information obtaining response message.

5B: The AMF network element sends the LAN information of the UE to the UE using a registration response message.

C: Configure LAN information of the UE in a session procedure (which is equivalent to Case 3).

3C: The UE sends a NAS message to the AMF network element, where the NAS message carries a session ID, the LAN ID, and a PDU session management request, where the PDU session management request may be a session establishment request, a session modification request, or a session release request.

4C: The AMF network element sends a LAN information obtaining request to the LSMF network element, to request to obtain the LAN information of the UE, where the LAN information obtaining request carries the LAN ID of the UE, the ID of the UE, and registration area information of the UE. The LSMF network element determines, based on the LAN ID, the service area information corresponding to the LAN ID, and then determines the LAN information of the UE based on the registration area information of the UE, the service area information corresponding to the LAN ID, the LAN ID, the restrictions 1, and the restrictions 2. Then, the LSMF network element sends the LAN information of the UE to the AMF using a LAN information obtaining response message.

5C: The AMF network element sends an SMContext management request (carrying the session ID, the LAN information, and the PDU session management request) message to an SMF network element, where the SMContext management request may be an SMContext establishment request, an SMContext update request, or an SMContext release request, the SMF network element processes a LAN session, and the SMF network element sends an SMContext management response (carrying the Session ID and a PDU session management response (carrying the LAN information)) message to the AMF network element, where the SMContext management response may be an SMContext establishment response, an SMContext update response, or an SMContext release response. The AMF network element sends a NAS message to the UE, where the NAS message carries the session ID and the PDU session management response (carrying the LAN information), to send the LAN information of the UE to the UE.

6: After obtaining the LAN information of the UE, the UE may use the LAN ID in the LAN information as an LADN DNN, and restrict a LAN session of the UE by reusing a mechanism similar to an LADN mechanism, to restrict the UE to using a 5G LAN service.

Likewise, the AMF network element and the SMF network element may also use the LAN ID as an LADN DNN, and process a LAN session of the UE using a mechanism similar to an LADN mechanism.

The LAN information of the UE may further include the restrictions 1 and the restrictions 2, where the restrictions 1 and the restrictions 2 are used as reference information when the UE or a network element (for example, the AMF network element, the SMF network element, the UDM network element, or the LSMF network element) processes the LAN session.

Figure 15:
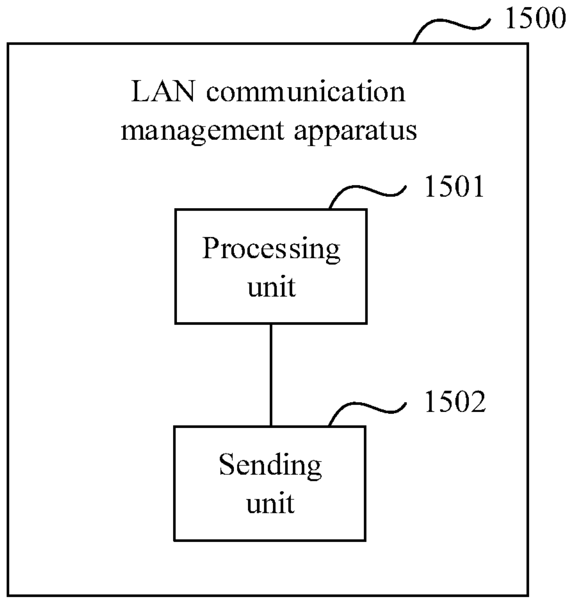
FIG. 15 is a schematic structural diagram of a first local area network communication management apparatus according to an embodiment of this application.

Based on a same concept, an embodiment of this application further provides a local area network communication management apparatus. The apparatus may be configured to perform an operation performed by the AMF network element in the method shown in FIG. 4. For related features, refer to the foregoing method embodiment. Details are not described herein again. As shown in FIG. 15, the apparatus 1500 includes a processing unit 1501 and a sending unit 1502.

The processing unit 1501 is configured to obtain registration area information of a terminal, a LAN ID of the terminal, and service area information corresponding to the LAN ID.

The processing unit 1501 is further configured to determine LAN communication area information of the terminal based on the registration area information and the service area information corresponding to the LAN ID.

The sending unit 1502 is configured to send LAN information of the terminal to the terminal, where the LAN information of the terminal includes the LAN ID and the LAN communication area information of the terminal.

In addition, the apparatus 1500 further includes a receiving unit configured to, before the processing unit 1501 obtains the registration area information of the terminal, the LAN ID of the terminal, and the service area information corresponding to the LAN ID, receive a first configuration parameter sent by an LSMF network element, where the first configuration parameter includes the LAN ID and the service area information corresponding to the LAN ID.

Further, after the first configuration parameter sent by the LSMF network element is received, the processing unit 1501 may obtain, in two specific manners, the registration area information of the terminal, the LAN ID of the terminal, and the service area information corresponding to the LAN ID.

Manner 1:

The processing unit 1501 receives, through the receiving unit, a fourth subscription data update notification sent by a UDM network element, where the fourth subscription data update notification includes the LAN ID and an ID of the terminal, the processing unit 1501 obtains the registration area information of the terminal based on the ID of the terminal, and the processing unit 1501 obtains the LAN ID carried in the fourth subscription data update notification, and obtains, based on the first configuration parameter, the service area information corresponding to the LAN ID.

In Manner 1, when sending the LAN information of the terminal to the terminal, the sending unit 1502 is further configured to send a third configuration update message to the terminal, where the third configuration update message includes the LAN information of the terminal.

Manner 2:

The processing unit 1501 receives, through the receiving unit, a third registration request message sent by the terminal, where the third registration request message carries an ID of the terminal, the processing unit 1501 sends a fourth subscription data request message to a UDM network element through the sending unit 1502, where the fourth subscription data request message carries the ID of the terminal, the processing unit 1501 receives, through the receiving unit, a fourth subscription data response message sent by the UDM network element, where the fourth subscription data response message carries the LAN ID, the processing unit 1501 generates the registration area information of the terminal, and the processing unit 1501 obtains the LAN ID carried in the fourth subscription data response message, and obtains, based on the first configuration parameter, the service area information corresponding to the LAN ID.

In Manner 2, when sending the LAN information of the terminal to the terminal, the sending unit 1502 is further configured to send a third registration response message to the terminal, where the third registration response message carries the LAN information of the terminal.

Manner 3:

The processing unit 1501 receives, through the receiving unit, a first PDU session management request sent by the terminal, where the first PDU session management request carries the LAN ID, the processing unit 1501 obtains the registration area information of the terminal from a context of the terminal, and the processing unit 1501 obtains the LAN ID carried in the first PDU session management request, and obtains, based on the first configuration parameter, the service area information corresponding to the LAN ID.

In Manner 3, when sending the LAN information of the terminal to the terminal, the sending unit 1502 is further configured to send a first PDU session management response to the terminal, where the first PDU session management response carries the LAN information of the terminal.

In addition, when the LSMF network element does not send the first configuration parameter to an AMF network element, the processing unit 1501 obtains, in a plurality of manners, the registration area information of the terminal, the LAN ID of the terminal, and the service area information corresponding to the LAN ID. Six of the plurality of manners are listed below.

First Manner:

When obtaining the registration area information of the terminal, the LAN ID of the terminal, and the service area information corresponding to the LAN ID, the processing unit 1501 is further configured to receive, through the receiving unit, a first subscription data update notification sent by a UDM network element, where the first subscription data update notification includes the LAN ID and an ID of the terminal, the processing unit 1501 obtains the registration area information of the terminal based on the ID of the terminal, the processing unit 1501 sends a first request message to the LSMF network element through the sending unit 1502, where the first request message carries the LAN ID, and the first request message is used to request to obtain the service area information corresponding to the LAN ID, and the processing unit 1501 receives, through the receiving unit, a first response message sent by the LSMF network element, where the first response message carries the service area information corresponding to the LAN ID.

In the first manner, when sending the LAN information of the terminal to the terminal, the sending unit 1502 is further configured to send a first configuration update message to the terminal, where the first configuration update message includes the LAN information of the terminal.

Second Manner:

When obtaining the registration area information of the terminal, the LAN ID of the terminal, and the service area information corresponding to the LAN ID, the processing unit 1501 is further configured to receive, through the receiving unit, a first registration request message sent by the terminal, where the first registration request message carries an ID of the terminal, the processing unit 1501 sends a first subscription data request message to a UDM network element through the sending unit 1502, where the first subscription data request message carries the ID of the terminal, the processing unit 1501 receives, through the receiving unit, a first subscription data response message sent by the UDM network element, where the first subscription data response message carries the LAN ID, the processing unit 1501 generates the registration area information of the terminal, the processing unit 1501 sends a second request message to the LSMF network element through the sending unit 1502, where the second request message carries the LAN ID, and the second request message is used to request to obtain the service area information corresponding to the LAN ID, and the processing unit 1501 receives, through the receiving unit, a second response message sent by the LSMF network element, where the second response message carries the service area information corresponding to the LAN ID.

In the second manner, when sending the LAN information of the terminal to the terminal, the sending unit 1502 is further configured to send a first registration response message to the terminal, where the first registration response message carries the LAN information of the terminal.

Third Manner:

When obtaining the registration area information of the terminal, the LAN ID of the terminal, and the service area information corresponding to the LAN ID, the processing unit 1501 is further configured to receive, through the receiving unit, a second PDU session management request sent by the terminal, where the second PDU session management request carries the LAN ID, the processing unit 1501 obtains the registration area information of the terminal from a context of the terminal, the processing unit 1501 sends a fourth request message to the LSMF network element through the sending unit 1502, where the fourth request message carries the LAN ID, and the fourth request message is used to request to obtain the service area information corresponding to the LAN ID, the processing unit 1501 receives, through the receiving unit, a fourth response message sent by the LSMF network element, where the fourth response message carries the service area information corresponding to the LAN ID, and the processing unit 1501 obtains the LAN ID carried in the second PDU session management request, and obtains, according to the fourth response message, the service area information corresponding to the LAN ID.

In the third manner, when sending the LAN information of the terminal to the terminal, the sending unit 1502 is further configured to send a second PDU session management response to the terminal, where the second PDU session management response carries the LAN information of the terminal.

Fourth Manner:

When obtaining the registration area information of the terminal, the LAN ID of the terminal, and the service area information corresponding to the LAN ID, the processing unit 1501 is further configured to receive, through the receiving unit, a second subscription data update notification sent by a UDM network element or the LSMF network element, where the second subscription data update notification includes the LAN ID, the service area information corresponding to the LAN ID, and an ID of the terminal, the processing unit 1501 obtains the registration area information of the terminal based on the ID of the terminal that is carried in the second subscription data update notification, and the processing unit 1501 obtains the LAN ID and the service area information corresponding to the LAN ID that are carried in the second subscription data update notification.

In the fourth manner, when sending the LAN information of the terminal to the terminal, the sending unit 1502 is further configured to send a second configuration update message to the terminal, where the second configuration update message includes the LAN information of the terminal.

Fifth Manner:

When obtaining the registration area information of the terminal, the LAN ID of the terminal, and the service area information corresponding to the LAN ID, the processing unit 1501 is further configured to receive, through the receiving unit, a second registration request message sent by the terminal, where the second registration request message carries an ID of the terminal, the processing unit 1501 sends a second subscription data request message to a UDM network element or the LSMF network element through the sending unit 1502, where the second subscription data request message carries the ID of the terminal, the processing unit 1501 receives, through the receiving unit, a second subscription data response message sent by the UDM network element or the LSMF network element, where the second subscription data response message carries the LAN ID and the service area information corresponding to the LAN ID, the processing unit 1501 generates the registration area information of the terminal, and the processing unit 1501 obtains the LAN ID and the service area information corresponding to the LAN ID that are carried in the second subscription data response message.

In the fifth manner, when sending the LAN information of the terminal to the terminal, the sending unit 1502 is further configured to send a second registration response message to the terminal, where the second registration response message includes the LAN information of the terminal.

In addition, in the fifth manner, the processing unit 1501 is further configured to, before the sending unit 1502 sends the second subscription data request message to the LSMF network element, obtain LAN indication information of the terminal or LAN subscription information of the terminal, where the LAN indication information is carried in the second registration request message, the LAN subscription information is obtained by the AMF network element from the UDM network element, and the LAN indication information or the LAN subscription information is used to indicate that the terminal needs to use a LAN service indicated by the LAN ID.

Sixth Manner:

When obtaining the registration area information of the terminal, the LAN ID of the terminal, and the service area information corresponding to the LAN ID, the processing unit 1501 is further configured to receive, through the receiving unit, a third PDU session management request sent by the terminal, where the third PDU session management request carries the LAN ID, the processing unit 1501 sends a seventh subscription data request message to a UDM network element or the LSMF network element through the sending unit 1502, where the seventh subscription data request message carries an ID of the terminal and the LAN ID, the processing unit 1501 receives, through the receiving unit, a seventh subscription data response message sent by the UDM network element or the LSMF network element, where the seventh subscription data response message carries the service area information corresponding to the LAN ID, the processing unit 1501 obtains the registration area information of the terminal from a context of the terminal, and the processing unit 1501 obtains the LAN ID carried in the third PDU session management request, and obtains the service area information corresponding to the LAN ID carried in the seventh subscription data response message.

In the sixth manner, when sending the LAN information of the terminal to the terminal, the sending unit 1502 is further configured to send a third PDU session management response to the terminal, where the third PDU session management response includes the LAN information of the terminal.

In a possible design, the apparatus 1500 further includes a receiving unit configured to, after the sending unit 1502 sends the LAN information of the terminal to the terminal, receive a first LAN communication request sent by the terminal, where the first LAN communication request carries the LAN ID. The processing unit 1501 is further configured to determine the LAN information of the terminal according to the LAN ID and the ID of the terminal. The sending unit 1502 is further configured to report, in a case in which the terminal is not located in a LAN communication area, to an SMF network element, the case in which the terminal is not located in the LAN communication area such that the SMF network element processes the first LAN communication request.

Figure 16:
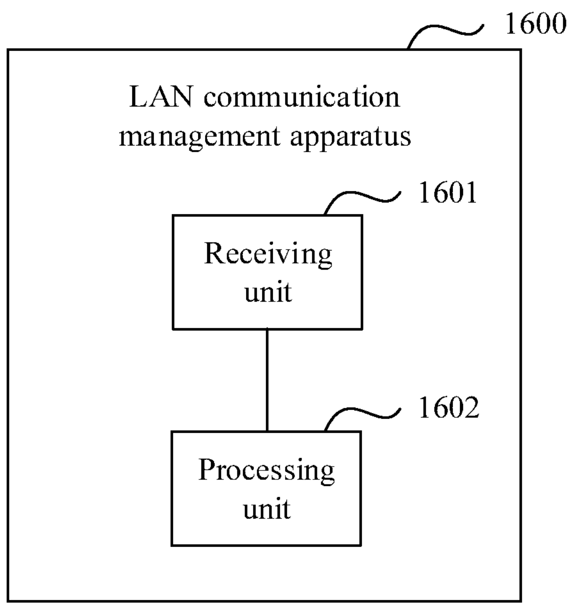
FIG. 16 is a schematic structural diagram of a second local area network communication management apparatus according to an embodiment of this application.

Based on a same concept, an embodiment of this application further provides a local area network communication management apparatus. The apparatus may be configured to perform an operation performed by the LSMF network element in the method shown in FIG. 4. For related features, refer to the foregoing method embodiment. Details are not described herein again. As shown in FIG. 16, the apparatus 1600 includes a receiving unit 1601 and a processing unit 1602.

The receiving unit 1601 is configured to receive a group management request sent by a communications device.

The processing unit 1602 configured to obtain, according to the group management request, an ID of a terminal, a LAN ID of the terminal, and service area information corresponding to the LAN ID.

Optionally, the processing unit 1602 is further configured to, after obtaining, according to the group management request, the ID of the terminal, the LAN ID of the terminal, and the service area information corresponding to the LAN ID, select a UDM network element based on the service area information corresponding to the LAN ID. The apparatus 1600 further includes a sending unit configured to send a second configuration parameter to the UDM network element, where the second configuration parameter includes the LAN ID and the ID of the terminal.

Optionally, the processing unit 1602 is further configured to, after the processing unit 1602 obtains the ID of the terminal, the LAN ID of the terminal, and the service area information corresponding to the LAN ID, select an AMF network element based on the service area information corresponding to the LAN ID. The apparatus 1600 further includes a sending unit configured to send a first configuration parameter to the AMF network element, where the first configuration parameter includes the LAN ID and the service area information corresponding to the LAN ID.

Optionally, the receiving unit 1601 is further configured to, after the sending unit sends the second configuration parameter to the UDM network element, receive a third request message sent by the AMF network element, where the third request message carries the LAN ID, and the third request message is used to request to obtain the service area information corresponding to the LAN ID. The sending unit is further configured to send a third response message to the AMF network element, where the third response message carries the service area information corresponding to the LAN ID.

In addition, the second configuration parameter further includes the service area information corresponding to the LAN ID.

In the apparatus 1600, the receiving unit 1601 is further configured to, after the processing unit 1602 obtains, according to the group management request, the ID of the terminal, the LAN ID of the terminal, and the service area information corresponding to the LAN ID, receive a third subscription data request message sent by an AMF network element, where the third subscription data request message carries the ID of the terminal, and the third subscription data request message is used to request to obtain the LAN ID of the terminal and the service area information corresponding to the LAN ID. The apparatus 1600 further includes a sending unit configured to send a third subscription data response message to the AMF network element, where the third subscription data response message carries the LAN ID and the service area information corresponding to the LAN ID.

The third subscription data request message may be the second subscription data request message or the seventh subscription data request message in the foregoing embodiments. The third subscription data response message may be the second subscription data response message or the seventh subscription data response message in the foregoing embodiments.

Optionally, the apparatus 1600 further includes a sending unit configured to, after the processing unit 1602 obtains, according to the group management request, the ID of the terminal, the LAN ID of the terminal, and the service area information corresponding to the LAN ID, send a second subscription data update notification to the AMF network element, where the second subscription data update notification includes the LAN ID, the service area information corresponding to the LAN ID, and the ID of the terminal.

In the apparatus 1600, the processing unit 1602 obtains, according to the group management request in a plurality of manner, the ID of the terminal, the LAN ID of the terminal, and the service area information corresponding to the LAN ID. Two of the plurality of manners are listed below.

First Manner:

The group management request is a group creation request, the group creation request is used to request to create a group in which LAN communication is to be performed, and the group creation request carries service area information corresponding to the group and the ID of the terminal.

That the processing unit 1602 obtains, according to the group management request, the ID of the terminal, the LAN ID of the terminal, and the service area information corresponding to the LAN ID further includes that the processing unit 1602 allocates the LAN ID to the group, and the processing unit 1602 determines that a service area corresponding to the LAN ID is a service area corresponding to the group.

Second Manner:

The group management request is a first group update request, the first group update request is used to request to update a group corresponding to the LAN ID, and the first group update request carries the LAN ID and the service area information corresponding to the LAN ID. That the processing unit 1602 obtains, according to the group management request, the ID of the terminal, the LAN ID of the terminal, and the service area information corresponding to the LAN ID further includes that the processing unit 1602 determines the ID of the terminal based on the LAN ID.

Alternatively, the group management request is a second group update request, the second group update request is used to request to update a group corresponding to the LAN ID, and the second group update request carries the ID of the terminal and the LAN ID of the terminal. That the processing unit 1602 obtains, according to the group management request, the ID of the terminal, the LAN ID of the terminal, and the service area information corresponding to the LAN ID further includes that the processing unit 1602 determines, based on the LAN ID, the service area information corresponding to the LAN ID.

Optionally, the communications device is any one of an AF network element, an OAM entity, and a designated terminal.

Figure 17:
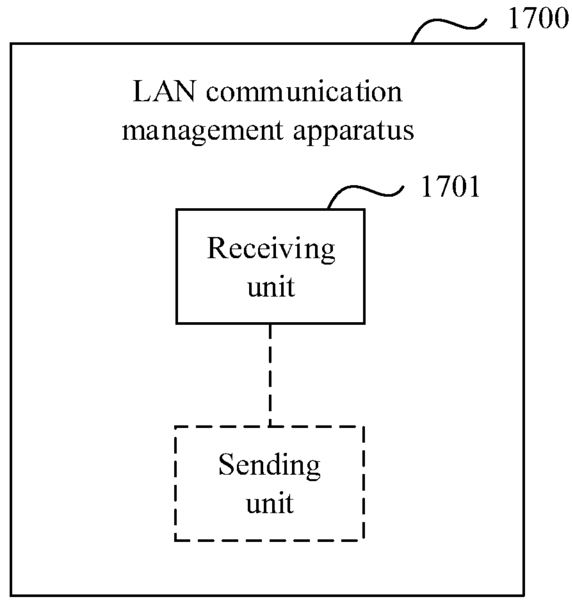
FIG. 17 is a schematic structural diagram of a third local area network communication management apparatus according to an embodiment of this application.

Based on a same concept, an embodiment of this application further provides a local area network communication management apparatus. The apparatus may be configured to perform an operation performed by the UDM network element in the method shown in FIG. 4. For related features, refer to the foregoing method embodiment. Details are not described herein again. As shown in FIG. 17, the apparatus 1700 includes a receiving unit 1701.

The receiving unit configured to receive a second configuration parameter sent by an LSMF network element, where the second configuration parameter includes a LAN ID of a terminal and an ID of the terminal.

In addition, the second configuration parameter may further include service area information corresponding to the LAN ID.

Optionally, the apparatus 1700 further includes a sending unit configured to, after the receiving unit receives the second configuration parameter sent by the LSMF network element, send a third subscription data update notification to an AMF network element, where the third subscription data update notification carries the second configuration parameter.

The third subscription data update notification may be any one of the fourth subscription data update notification, the first subscription data update notification, or the second subscription data update notification in the foregoing embodiments.

Optionally, the receiving unit is further configured to, after receiving the second configuration parameter sent by the LSMF network element, receive a third subscription data request message sent by an AMF network element, where the third subscription data request message carries the ID of the terminal. The apparatus 1700 further includes a sending unit configured to send a third subscription data response message to the AMF network element, where the third subscription data response message carries the LAN ID.

The third subscription data request message may be any one of the foregoing fourth subscription data request message, the foregoing fifth subscription data request message, or the foregoing first subscription data request message. The third subscription data response message may be any one of the foregoing fourth subscription data response message, the foregoing fifth subscription data response message, or the foregoing first subscription data response message.

In addition, the third subscription data response message further carries the service area information corresponding to the LAN ID.

In this case, the third subscription data request message may be the foregoing first subscription data request message.

Optionally, the receiving unit 1701 is further configured to, after receiving the second configuration parameter sent by the LSMF network element, receive an eighth subscription data request message sent by an AMF network element, where the eighth subscription data request message carries the ID of the terminal and the LAN ID. The apparatus 1700 further includes a sending unit configured to send an eighth subscription data response message to the AMF network element.

The eighth subscription data request message may be considered as any one of the foregoing fifth subscription data request message, the foregoing sixth subscription data request message, and the foregoing seventh subscription data request message. The eighth subscription data response message may be considered as any one of the foregoing fifth subscription data response message, the foregoing sixth subscription data response message, and the foregoing seventh subscription data response message.

In addition, the eighth subscription data response message may further carry the service area information corresponding to the LAN ID.

In this case, the eighth subscription data request message may be considered as the foregoing seventh subscription data request message, and the eighth subscription data response message may be considered as the foregoing seventh subscription data response message.

Figure 18:
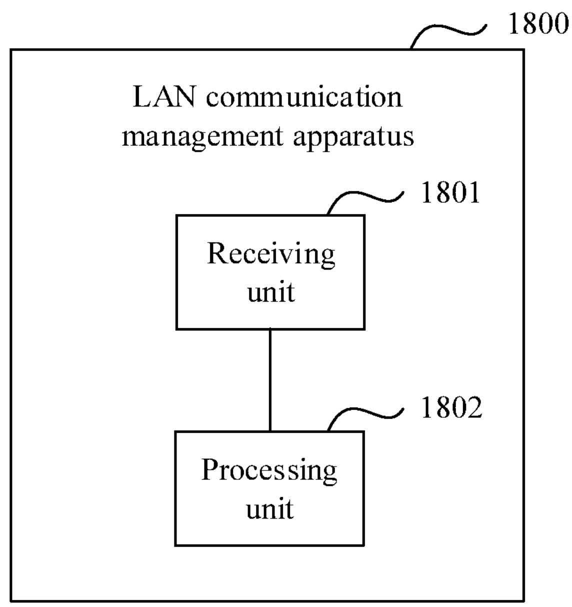
FIG. 18 is a schematic structural diagram of a fourth local area network communication management apparatus according to an embodiment of this application.

Based on a same concept, an embodiment of this application further provides a local area network communication management apparatus. The apparatus may be configured to perform an operation performed by the terminal in the method shown in FIG. 4. For related features, refer to the foregoing method embodiment. Details are not described herein again. As shown in FIG. 18, the apparatus 1800 includes a receiving unit 1801 and a processing unit 1802.

The receiving unit 1801 is configured to receive LAN information sent by an AMF network element, where the LAN information of a terminal includes a LAN ID of the terminal and LAN communication area information of the terminal.

The processing unit 1802 is configured to manage LAN communication of the terminal based on the LAN information.

Optionally, when managing local area network communication of the terminal based on the LAN information, the processing unit 1802 is further configured to, when the terminal is not located in a LAN communication area, forbid the terminal to initiate a second LAN communication request.

Optionally, when receiving the LAN information sent by the AMF network element, the receiving unit 1801 is further configured to receive a first message sent by the AMF network element, where the first message carries the LAN information of the terminal, and the first message is any one of a configuration update message, a registration response message, and a PDU session management response message.

Figure 19:
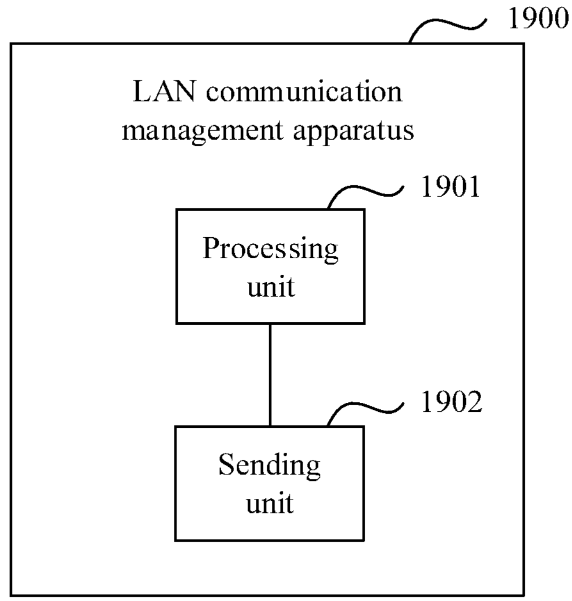
FIG. 19 is a schematic structural diagram of a fifth local area network communication management apparatus according to an embodiment of this application.

Based on a same concept, an embodiment of this application further provides a local area network communication management apparatus. The apparatus may be configured to perform an operation performed by the LSMF network element in the method shown in FIG. 13. For related features, refer to the foregoing method embodiment. Details are not described herein again. As shown in FIG. 19, the apparatus 1900 includes a processing unit 1901 and a sending unit 1902.

The processing unit 1901 is configured to obtain registration area information of a terminal, an ID of the terminal, a LAN ID of the terminal, and service area information corresponding to the LAN ID.

The processing unit 1901 is further configured to determine LAN communication area information of the terminal based on the registration area information and the service area information corresponding to the LAN ID.

The sending unit 1902 is configured to send LAN information of the terminal to an AMF network element, where the LAN information of the terminal includes the LAN ID and LAN communication area information of the terminal.

In the apparatus 1900, the processing unit 1901 may obtain, in the following two manners, the ID of the terminal, the LAN ID of the terminal, and the service area information corresponding to the LAN ID.

Manner 1:

When obtaining the ID of the terminal, the LAN ID of the terminal, and the service area information corresponding to the LAN ID, the processing unit 1901 is further configured to receive, through a receiving unit, a group creation request sent by a communications device, where the group creation request is used to request to create a group in which local area network communication is to be performed, and the group creation request carries service area information corresponding to the group and the ID of the terminal, the processing unit 1901 allocates the LAN ID to the group, and the processing unit 1901 determines that a service area corresponding to the LAN ID is a service area corresponding to the group.

Manner 2:

When obtaining the ID of the terminal, the LAN ID of the terminal, and the service area information corresponding to the LAN ID, the processing unit 1901 is further configured to receive, through a receiving unit, a first group update request sent by a communications device, where the first group update request is used to request to update a group corresponding to the LAN ID, and the first group update request carries the LAN ID and the service area information corresponding to the LAN ID, and the processing unit 1901 determines the ID of the terminal based on the LAN ID, or the processing unit 1901 receives, through a receiving unit, a second group update request sent by a communications device, where the second group update request is used to request to update a group corresponding to the LAN ID, and the second group update request carries the ID of the terminal and the LAN ID of the terminal, and the processing unit 1901 determines, based on the LAN ID, the service area information corresponding to the LAN ID.

In addition, the apparatus 1900 further includes a receiving unit configured to, before the processing unit 1901 determines the LAN communication area information of the terminal based on the registration area information and the service area information corresponding to the LAN ID, receive a LAN information obtaining request sent by the AMF network element, where the LAN information obtaining request is used to request to obtain the LAN information of the terminal, and the LAN information obtaining request carries the LAN ID, the ID of the terminal, and the registration area information of the terminal. When sending the LAN information of the terminal to the AMF network element, the sending unit 1902 is further configured to send a LAN information obtaining response to the AMF network element, where the LAN information obtaining response carries the LAN information of the terminal.

The communications device is any one of an AF network element, an OAM entity, and a designated terminal.

Figure 20:
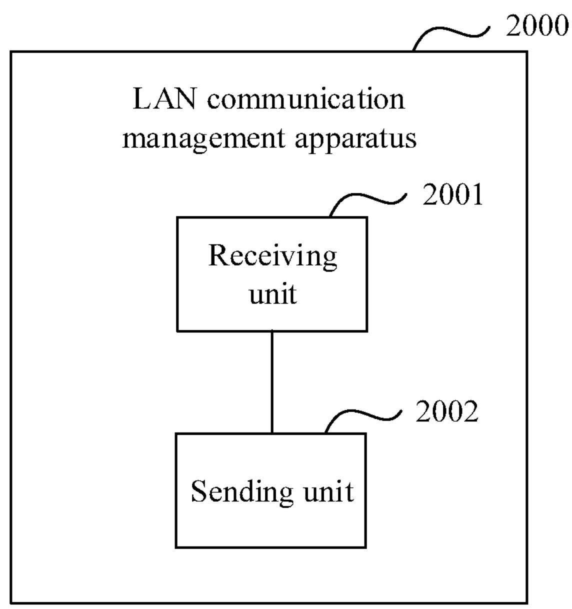
FIG. 20 is a schematic structural diagram of a sixth local area network communication management apparatus according to an embodiment of this application.

Based on a same concept, an embodiment of this application further provides a local area network communication management apparatus. The apparatus may be configured to perform an operation performed by the AMF network element in the method shown in FIG. 13. For related features, refer to the foregoing method embodiment. Details are not described herein again. As shown in FIG. 20, the apparatus 2000 includes a receiving unit 2001 and a sending unit 2002.

The receiving unit 2001 is configured to receive LAN information of a terminal that is sent by an LSMF network element, where the LAN information of the terminal includes a LAN ID of the terminal and LAN communication area information of the terminal.

The sending unit 2002 is configured to send the LAN information of the terminal to the terminal.

Optionally, the sending unit 2002 is further configured to, before the receiving unit 2001 receives the LAN information of the terminal that is sent by the LSMF network element, send a LAN information obtaining request to the LSMF network element, where the LAN information obtaining request is used to request to obtain the LAN information of the terminal, and the LAN information obtaining request carries the LAN ID, an ID of the terminal, and registration area information of the terminal. When receiving the LAN information of the terminal that is sent by the LSMF network element, the receiving unit 2001 is further configured to receive a LAN information obtaining response sent by the LSMF network element, where the LAN information obtaining response carries the LAN information of the terminal.

The apparatus 2000 shown in FIG. 20 may be triggered in different scenarios to perform an operation of requesting to obtain the LAN information of the terminal. The following lists three cases.

Case 1:

The receiving unit 2001 is further configured to, before the sending unit 2002 sends the LAN information obtaining request to the LSMF network element, receive a subscription data update notification sent by the LSMF network element, where the subscription data update notification includes the LAN ID and the ID of the terminal. The apparatus 2000 further includes a processing unit configured to determine that the terminal has registered in a group corresponding to the LAN ID. When sending the LAN information of the terminal to the terminal, the sending unit 2002 is further configured to send a configuration update message to the terminal, where the configuration update message carries the LAN information of the terminal.

Case 2:

The receiving unit 2001 is further configured to, before the sending unit 2002 sends the LAN information obtaining request to the LSMF network element, receive a registration request message sent by the terminal, where the registration request message carries LAN indication information of the terminal or LAN subscription information of the terminal, the registration request message further carries the ID of the terminal, and the LAN indication information or the LAN subscription information is used to indicate that the terminal needs to use a LAN service indicated by the LAN ID. When sending the LAN information of the terminal to the terminal, the sending unit 2002 is further configured to send a registration response message to the terminal, where the registration response message carries the LAN information of the terminal.

Case 3:

The receiving unit 2001 is further configured to, before the sending unit 2002 sends the LAN information obtaining request to the LSMF network element, receive a PDU session management request sent by the terminal, where the PDU session management request carries the LAN ID. The apparatus 2000 further includes a processing unit configured to determine the ID of the terminal according to the PDU session management request. When sending the LAN information of the terminal to the terminal, the sending unit 2002 is further configured to send a PDU session management response message to the terminal, where the PDU session management response message carries the LAN information of the terminal.

In addition, the receiving unit 2001 is further configured to, after the sending unit 2002 sends the LAN information of the terminal to the terminal, receive a first LAN communication request sent by the terminal, where the first LAN communication request carries the LAN ID. The apparatus 2000 further includes a processing unit configured to determine the LAN information of the terminal based on the LAN ID and the ID of the terminal. The sending unit 2002 is further configured to, in a case in which the terminal is not located in a LAN communication area, report, to an SMF network element, the case in which the terminal is not located in the LAN communication area such that the SMF network element processes the first LAN communication request.

Figure 21:
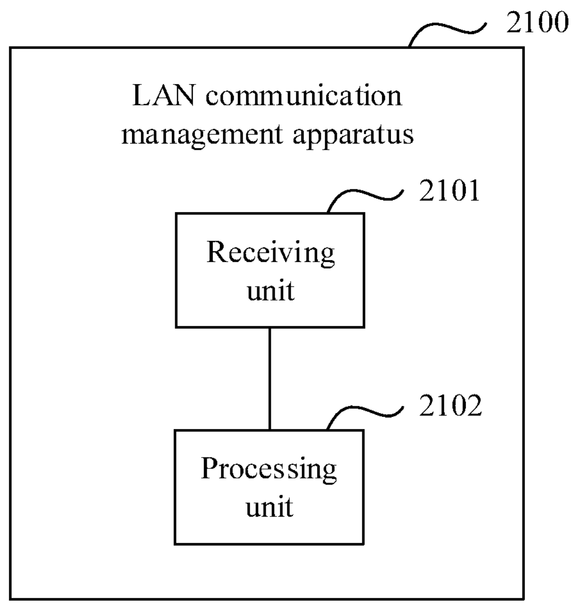
FIG. 21 is a schematic structural diagram of a seventh local area network communication management apparatus according to an embodiment of this application.

Based on a same concept, an embodiment of this application further provides a local area network communication management apparatus. The apparatus may be configured to perform an operation performed by the terminal in the method shown in FIG. 13. For related features, refer to the foregoing method embodiment. Details are not described herein again. As shown in FIG. 21, the apparatus 2100 includes a receiving unit 2101 and a processing unit 2102.

The receiving unit 2101 is configured to receive LAN information sent by an AMF network element, where the LAN information of a terminal includes a LAN ID of the terminal and LAN communication area information of the terminal.

The processing unit 2102 is configured to manage LAN communication of the terminal based on the LAN information.

Optionally, when managing local area network communication of the terminal based on the LAN information, the processing unit 2102 is further configured to, when the terminal is not located in a LAN communication area, forbid the terminal to initiate a second LAN communication request.

Optionally, when receiving the LAN information sent by the AMF network element, the receiving unit 2101 is further configured to receive a first message sent by the AMF network element, where the first message carries the LAN information of the terminal, and the first message is any one of a configuration update message, a registration response message, and a PDU session management response message.

In the embodiments of this application, the AMF network element, the LSMF network element, or the UDM network element may be presented in a form of integrating functional modules. The "module" herein may be a specific ASIC, a circuit, a processor and a memory that execute one or more software or firmware programs, an integrated logic circuit, and/or another component that can provide the foregoing functions.

It should be noted that, in the embodiments of this application, division into units is an example, is merely logical function division, and may be other division in an actual implementation. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

Figure 22:
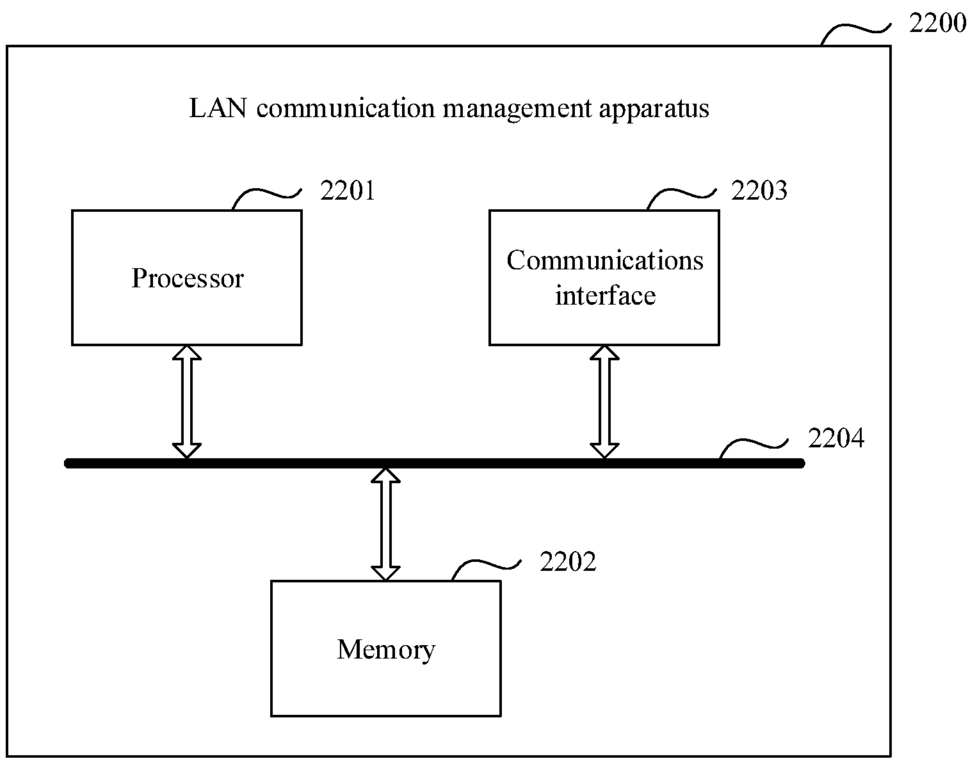
FIG. 22 is a schematic structural diagram of an eighth local area network communication management apparatus according to an embodiment of this application.

In a simple embodiment, a person skilled in the art may figure out that the AMF network element, the LSMF network element, or the UDM network element in the foregoing embodiments may be in a form shown in FIG. 22.

A local area network communication management apparatus 2200 shown in FIG. 22 includes at least one processor 2201 and a memory 2202. Optionally, the apparatus 2200 may further include a communications interface 2203.

The memory 2202 may be a volatile memory such as a RAM. Alternatively, the memory may be a non-volatile memory such as a ROM, a flash memory, a hard disk drive (HDD), or a solid-state drive (SSD). Alternatively, the memory 2202 is any other medium that can be used to carry or store expected program code in an instruction structure form or a data structure form and that can be accessed by a computer. However, this is not limited. The memory 2202 may be a combination of the foregoing memories.

A specific connection medium between the processor 2201 and the memory 2202 is not limited in this embodiment of this application. In this embodiment of this application, the memory 2202 is connected to the processor 2201 through a bus 2204 in the figure. The bus 2204 is represented by one thick line in the figure. A connection manner between other components is schematically described, and is not limited thereto. The bus 2204 may be classified into an address bus, a data bus, a control bus, and the like. For ease of representation, only one thick line is used to represent the bus in FIG. 22, but this does not mean that there is only one bus or only one type of bus.

The processor 2201 may have a data receiving and sending function, and can communicate with another device. In the apparatus shown in FIG. 22, an independent data receiving and sending module, for example, the communications interface 2203, may also be disposed and is configured to receive and send data. When communicating with another device, the processor 2201 may transmit data through the communications interface 2203.

When the AMF network element, the LSMF network element, or the UDM network element in the foregoing embodiments uses the form shown in FIG. 22, the processor 2201 in FIG. 22 may invoke a computer-executable instruction stored in the memory 2202 such that the AMF network element, the LSMF network element, or the UDM network element may separately perform the method performed by the AMF network element, the LSMF network element, or the UDM network element in any one of the foregoing method embodiments.

Further, functions/implementation processes of a sending unit, a receiving unit, and a processing unit in the AMF network element, the LSMF network element, or the UDM network element may be implemented by the processor 2201 in FIG. 22 by invoking the computer-executable instruction stored in the memory 2202. Alternatively, a function/implementation process of a processing unit in the AMF network element, the LSMF network element, or the UDM network element may be implemented by the processor 2201 in FIG. 22 by invoking the computer-executable instruction stored in the memory 2202. Functions/implementation processes of a sending unit and a receiving unit in the AMF network element, the LSMF network element, or the UDM network element may be implemented by the communications interface 2203 in FIG. 22.

Figure 23:
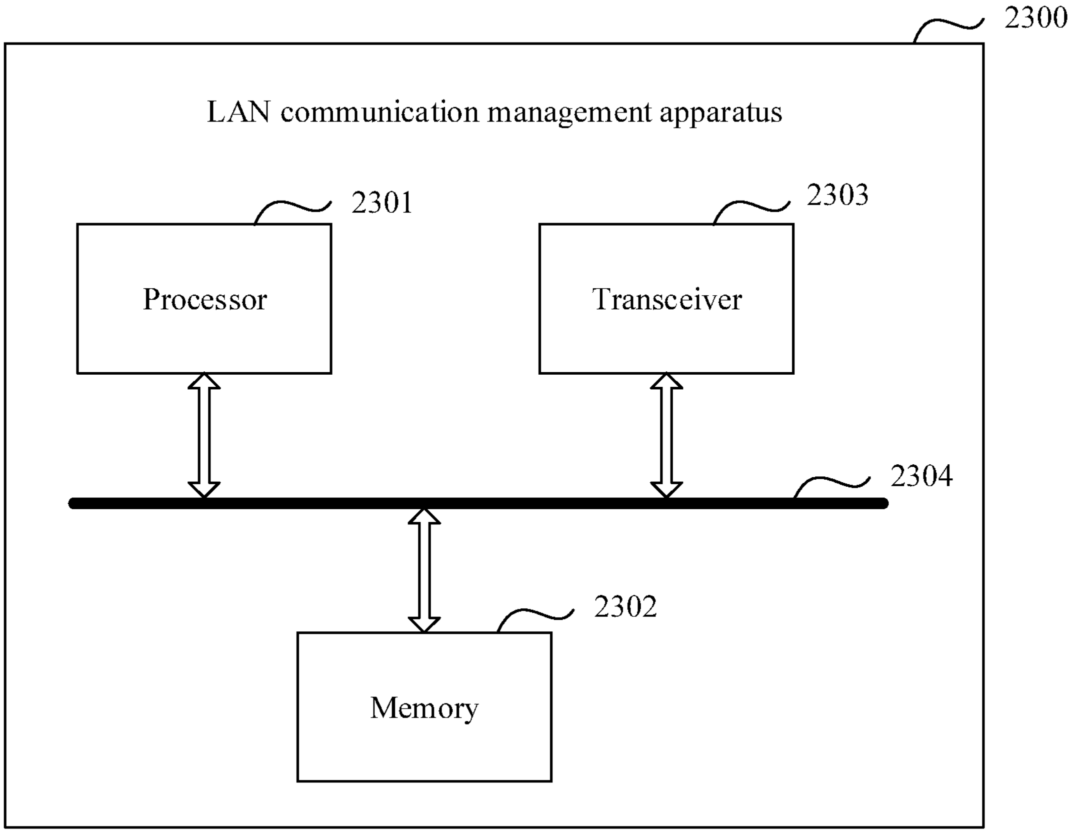
FIG. 23 is a schematic structural diagram of a ninth local area network communication management apparatus according to an embodiment of this application.

In a simple embodiment, a person skilled in the art may figure out that the terminal in the foregoing embodiments may be in a form shown in FIG. 23.

A local area network communication management apparatus 2300 shown in FIG. 23 includes at least one processor 2301 and a memory 2302. Optionally, the apparatus 2300 may further include a transceiver 2303.

For an implementation of the memory 2302, refer to the memory 2202. For an implementation of the processor 2301, refer to the processor 2201. For an implementation of the transceiver 2303, refer to the communications interface 2203. Details are not described herein again.

When the terminal in the foregoing embodiments uses the form shown in FIG. 23, the processor 2301 in FIG. 23 may invoke a computer-executable instruction stored in the memory 2302 such that the terminal can perform the method performed by the terminal in any one of the foregoing method embodiments.

Further, functions/implementation processes of a sending unit, a receiving unit, and a processing unit in the apparatus 1800 or the apparatus 2230 may be implemented by the processor 2301 in FIG. 23 by invoking the computer executable instruction stored in the memory 2302. Alternatively, a function/implementation process of a processing unit in the apparatus 1800 or the apparatus 2230 may be implemented by the processor 2301 in FIG. 23 by invoking the computer executable instruction stored in the memory 2302, and functions/implementation processes of a sending unit and a receiving unit in the apparatus 1800 or the apparatus 2230 may be implemented by the transceiver 2303 in FIG. 23.

Figure 24:
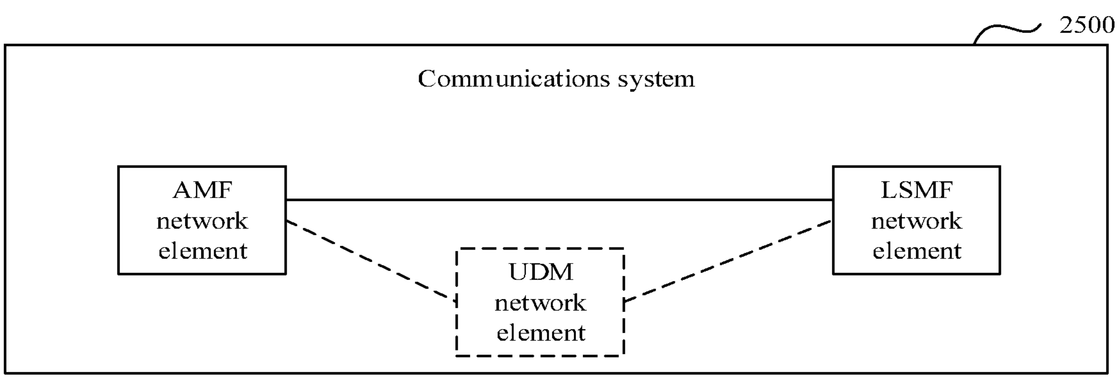
FIG. 24 is a schematic structural diagram of a communications system according to an embodiment of this application.

FIG. 24 is a schematic structural diagram of a communications system according to an embodiment of this application. Further, the communications system 2400 includes an AMF network element and an LSMF network element. Optionally, the communications system 2400 further includes a UDM network element.

The AMF network element, the LSMF network element, and the UDM network element are separately configured to implement functions of the related network elements in FIG. 4 to FIG. 14A to FIG. 14D. For details, refer to related descriptions in the method embodiments. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a compact disc (CD) ROM (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that the computer or the other programmable device performs a series of operations and steps, to generate computer-implemented processing. Therefore, the instructions executed on the computer or the other programmable device provide steps for implementing a specific function in one or more processes in the flowcharts and/or in one or more blocks in the block diagrams.

Definitely, a person skilled in the art may make various modifications and variations to this application without departing from the scope of this application. This application is intended to cover these modifications and variations of this application provided that the modifications and variations fall within the scope of protection defined by the claims in this application and equivalent technologies of the claims.

What is claimed is:

1. A local area network (LAN) communication management method implemented by an access and mobility management function network element, wherein the LAN communication management method comprises:

obtaining registration area information of a terminal, a LAN identifier (ID) of the terminal, and service area information corresponding to the LAN ID, wherein the registration area information indicates a registration area in which the terminal can establish a connection to a network, wherein the service area information indicates a service area providing a LAN service for a group member in a LAN group identified by the LAN ID, and wherein obtaining the registration area, the LAN ID, and the service area information comprises either:

receiving, from a unified data management network element, a first subscription data update notification comprising the LAN ID and a second ID of the terminal; obtaining, based on the second ID, the registration area information; sending, to a LAN service management function network element, a first request message carrying the LAN ID, wherein the first request message requests to obtain the service area information; and receiving, from the LAN service management function network element, a first response message carrying the service area information;

receiving, from the terminal, a first registration request message carrying the second ID of the terminal; sending, to the unified data management network element, a first subscription data request message carrying the second ID; receiving, from the unified data management network element, a first subscription data response message-carrying the LAN ID; generating the registration area information; sending, to the LAN service management function network element, a second request message carrying the LAN ID, wherein the second request message requests to obtain the service area information; and receiving, from the LAN service management function network element, a second response message carrying the service area information;

receiving, from the unified data management network element, a second subscription data update notification comprising the LAN ID, the service area information, and the second ID of the terminal; obtaining, based on the second ID, the registration area information; and obtaining, from the second subscription data update notification, the LAN ID and the service area information; or receiving, from the terminal, a second registration request message carrying the second ID of the terminal; sending, to the unified data management network element, a second subscription data request message carrying the second ID; receiving, from the unified data management network element, a second subscription data response message carrying the LAN ID and the service area information; generating the registration area information; and obtaining, from the second subscription data response message, the LAN ID and the service area information;

determining, based on the registration area information and the service area information, an intersection area of the registration area and the service area as LAN communication area information of the terminal; and sending, to the terminal, LAN information of the terminal via a first configuration update message, a first registration response message, a second configuration update message, or a second registration response message, wherein the LAN information comprises the LAN ID and the LAN communication area information.

2. The LAN communication management method of claim 1, wherein the unified data management is a control plane function.

3. The LAN communication management method of claim 1, wherein the terminal is a user terminal.

4. The LAN communication management method of claim 1, wherein the unified data management includes the LAN service management function.

5. The LAN communication management method of claim 1, wherein the unified data management is an independent network element from the LAN service management function.

6. The LAN communication management method of claim 1, wherein before sending the second subscription data request message, the LAN communication management method further comprises obtaining, from the second registration request message, LAN indication information of the terminal prompting the terminal to use a LAN service indicated by the LAN ID.

7. The LAN communication management method of claim 1, wherein the LAN service management function is a control plane function.

8. The LAN communication management method of claim 1, further comprising determining the intersection area of the registration area and the service area.

9. The LAN communication management method of claim 8, wherein the access and mobility management function network element is responsible for maintaining status of the terminal, managing reachability of the terminal, forwarding a mobility management non-access-stratum (MM NAS) message, and forwarding a session management (SM) N2 message.

10. The LAN communication management method of claim 1, wherein before sending the second subscription data request message, the LAN communication management method further comprises obtaining, from the unified data management network element, LAN subscription information of the terminal that prompts the terminal to use a LAN service indicated by the LAN ID.

11. A local area network (LAN) communication management apparatus comprising:

a memory configured to store program instructions; and a processor coupled to the memory, wherein the program instructions cause the processor to be configured to:

obtain registration area information of a terminal, a LAN identifier (ID) of the terminal, and service area information corresponding to the LAN ID, wherein the registration area information indicates a registration area in which the terminal can establish a connection to a network, wherein the service area information indicates a service area providing a LAN service for a group member in a LAN group identified by the LAN ID, and wherein obtaining the registration area, the LAN ID, and the service area information comprises either:

receiving, from a unified data management network element, a first subscription data update notification comprising the LAN ID and a second ID of the terminal; obtaining, based on the second ID, the registration area information; sending, to a LAN service management function network element, a first request message carrying the LAN ID, wherein the first request message requests to obtain the service area information; and receiving, from the LAN service management function network element, a first response message carrying the service area information;

receiving, from the terminal, a first registration request message carrying the second ID of the terminal; sending, to the unified data management network element, a first subscription data request message carrying the second ID; receiving, from the unified data management network element, a first subscription data response message carrying the LAN ID; generating the registration area information; sending, to the LAN service management function network element, a second request message carrying the LAN ID, wherein the second request message requests to obtain the service area information; and receiving, from the LAN service management function network element, a second response message carrying the service area information;

receiving, from the unified data management network element, a second subscription data update notification comprising the LAN ID, the service area information, and the second ID of the terminal; obtaining, based on the second ID, the registration area information; and obtaining, from the second subscription data update notification, the LAN ID and the service area information; or receiving, from the terminal, a second registration request message carrying the second ID of the terminal; sending, to the unified data management network element, a second subscription data request message carrying the second ID; receiving, from the unified data management network element, a second subscription data response message carrying the LAN ID and the service area information; generating the registration area information; and obtaining, from the second subscription data response message, the LAN ID and the service area information;

determine, based on the registration area information and the service area information, an intersection area of the registration area and the service area as LAN communication area information of the terminal; and send, to the terminal, LAN information of the terminal, wherein the LAN information comprises the LAN ID and the LAN communication area information.

12. The LAN communication management apparatus of claim 11, wherein the unified data management is a control plane function.

13. The LAN communication management apparatus of claim 11, wherein the terminal is a user terminal.

14. The LAN communication management apparatus of claim 11, wherein the unified data management includes the LAN service management function.

15. The LAN communication management apparatus of claim 11, wherein the unified data management is an independent network element from the LAN service management function.

16. The LAN communication management apparatus of claim 11, wherein before sending the second subscription data request message, the program instructions further cause the processor to be configured to either:

obtain LAN indication information of the terminal from the second registration request message; or obtain LAN subscription information from the unified data management network element, wherein either the LAN indication information or the LAN subscription information prompts the terminal to use a LAN service indicated by the LAN ID.

* * * * *